United States Patent
Bellman et al.

(10) Patent No.: US 11,520,082 B2
(45) Date of Patent: Dec. 6, 2022

(54) HYBRID GRADIENT-INTERFERENCE HARDCOATINGS

(71) Applicant: Corning Incorporated, Corning, NY (US)

(72) Inventors: Robert Alan Bellman, Ithaca, NY (US); Shandon Dee Hart, Elmira, NY (US); Karl William Koch, III, Elmira, NY (US); Carlo Anthony Kosik Williams, Painted Post, NY (US); Charles Andrew Paulson, Painted Post, NY (US); James Joseph Price, Corning, NY (US)

(73) Assignee: Corning Incorporated, Corning, NY (US)

( * ) Notice: Subject to any disclaimer, the term of this patent is extended or adjusted under 35 U.S.C. 154(b) by 342 days.

(21) Appl. No.: 16/643,368

(22) PCT Filed: Aug. 31, 2018

(86) PCT No.: PCT/US2018/049165
§ 371 (c)(1),
(2) Date: Feb. 28, 2020

(87) PCT Pub. No.: WO2019/046762
PCT Pub. Date: Mar. 7, 2019

(65) Prior Publication Data
US 2020/0192002 A1 Jun. 18, 2020

Related U.S. Application Data

(60) Provisional application No. 62/552,604, filed on Aug. 31, 2017.

(51) Int. Cl.
*G02B 1/14* (2015.01)
*G02B 5/08* (2006.01)
*G02C 7/02* (2006.01)

(52) U.S. Cl.
CPC ............. *G02B 1/14* (2015.01); *G02B 5/0883* (2013.01); *G02C 7/02* (2013.01)

(58) Field of Classification Search
CPC ........ G02B 1/14; G02B 5/0883; G02B 5/289; G02C 7/02; C03C 2217/734; C03C 17/3435
See application file for complete search history.

(56) References Cited

U.S. PATENT DOCUMENTS

| 4,995,684 A | 2/1991 | Tustison et al. |
| 5,234,748 A | 8/1993 | Demiryont et al. |

(Continued)

FOREIGN PATENT DOCUMENTS

| CN | 105408774 A | 3/2016 |
| CN | 105874356 A | 8/2016 |

(Continued)

OTHER PUBLICATIONS

Chinese Patent Application No. 201880067906.1, Office Action dated May 12, 2021, 12 pages (7 pages of Original Document and 5 pages of English Translation), Chinese Patent Office.

(Continued)

*Primary Examiner* — Robert E. Tallman
(74) *Attorney, Agent, or Firm* — William J. Tucker

(57) ABSTRACT

Durable and scratch resistant articles including an optical coating with a gradient. An article comprises: a substrate; and an optical coating having a thickness and a first gradient portion. A refractive index of the optical coating varies along a thickness of the optical coating. The difference between the maximum refractive index of the first gradient portion and the minimum refractive index of the first gradient portion is 0.1 or greater. The absolute value of the slope of the refractive index of the first gradient portion is 0.1/nm or less everywhere along the thickness of the first gradient (Continued)

portion. The article exhibits an average single-surface reflectance of 15% to 98% over the wavelength range 400 nm-700 nm. The article also exhibits a maximum hardness in the range from about 10 GPa to about 30 GPa.

20 Claims, 39 Drawing Sheets

(56) References Cited

U.S. PATENT DOCUMENTS

| | | | |
|---|---|---|---|
| 5,928,713 | A | 7/1999 | Haaland et al. |
| 7,903,338 | B1 | 3/2011 | Wach |
| 8,287,994 | B2 | 10/2012 | Fukawa et al. |
| 8,312,739 | B2 | 11/2012 | Lee et al. |
| 8,561,429 | B2 | 10/2013 | Allan et al. |
| 9,079,802 | B2 | 7/2015 | Bellman et al. |
| 9,335,444 | B2 | 5/2016 | Hart et al. |
| 9,359,261 | B2 | 6/2016 | Bellman et al. |
| 9,703,011 | B2 | 7/2017 | Adib et al. |
| 10,162,084 | B2 | 12/2018 | Hart et al. |
| 2005/0137084 | A1 | 6/2005 | Krisko et al. |
| 2007/0285776 | A1 | 12/2007 | Nakamura et al. |
| 2013/0029118 | A1 | 1/2013 | Kishi et al. |
| 2014/0085729 | A1 | 3/2014 | Uchiyama et al. |
| 2014/0113083 | A1 | 4/2014 | Lee et al. |
| 2014/0170308 | A1 | 6/2014 | Kalyankar et al. |
| 2014/0272298 | A1 | 9/2014 | Memering et al. |
| 2014/0334006 | A1 | 11/2014 | Adib et al. |
| 2014/0377522 | A1 | 12/2014 | Koch, III et al. |
| 2015/0132551 | A1 | 5/2015 | Cao et al. |
| 2015/0321455 | A1 | 11/2015 | Asano et al. |
| 2015/0322270 | A1 | 11/2015 | Amin et al. |
| 2015/0323705 | A1 | 11/2015 | Hart et al. |
| 2015/0355380 | A1 | 12/2015 | Apitz et al. |
| 2016/0004350 | A1 | 1/2016 | Zilbauer |
| 2017/0160438 | A1 | 6/2017 | Sonoda et al. |
| 2017/0242162 | A1 | 8/2017 | Shen et al. |
| 2018/0024274 | A1 | 1/2018 | Rogers et al. |
| 2018/0029929 | A1 | 2/2018 | Paulson |
| 2018/0275318 | A1 | 9/2018 | Amin et al. |
| 2019/0121000 | A1 | 4/2019 | Trottier-Lapointe et al. |
| 2019/0337841 | A1 | 11/2019 | Hart et al. |

FOREIGN PATENT DOCUMENTS

| | | |
|---|---|---|
| CN | 106772708 A | 5/2017 |
| CN | 107076874 A | 8/2017 |
| DE | 102014108058 A1 | 12/2015 |
| TW | 201516448 A | 5/2015 |
| TW | 201520585 A | 6/2015 |
| TW | 201602623 A | 1/2016 |
| WO | 2014/182639 A1 | 11/2014 |
| WO | 2016/018490 A1 | 2/2016 |
| WO | 2016/138195 A1 | 9/2016 |
| WO | 2016/171627 A1 | 10/2016 |

OTHER PUBLICATIONS

Fischer-Cripps; "A Critical Review of Analysis and Interpretation of Nanoindentation Test Data"; Surface & Coating Technology, 200, pp. 4153-4165 (2006).

Hay et al; "Continuous Stiffness Measurement During Instrumented Indentation Testing"; Experimental Techniques, 34, 3 pp. 86-94 (2010).

International Search Report and Written Opinion of the International Searching Authority; PCT/US2018/049165; dated Jan. 28, 2019; 15 Pages; European Patent Office.

Kittel; "Introduction to Solid State Physics"; 7th Edition, John Wiley & Sons, Inc., NY (1996) pp. 611-627.

Oliver et al; "An Improved Technique for Determining Hardness and Elastic Modulus Using Load and Displacement Sensing Indentation Experiments"; J. Mater. Res. vol. 7, No. 6 (1992) pp. 1564-1583.

Oliver et al; "Measurement of Hardness and Elastic Modulus by Instrument Indentation: Advances in Understanding and Refinements to Methodology"; J. Mater. Res. vol. 19, No. 1, (2004) pp. 3-20.

Shackelford; "Introduction of Materials Science for Engineers"; Sixth Edition, Pearson Prentice Hall, New Jersey, (2005) pp. 404-418.

Smart and Moore; "Solid State Chemistry: An Introduction"; Chapman & Hall University and Professional Division , London, 1992 pp. 136-151.

Southwell; "Coating Design Using Very Thin High-And Low-Index Layers," Applied Optics, vol. 24, Issue 4, pp. 457, (1985).

International Search Report and Written Opinion of the International Searching Authority; PCT/US2018/048977; dated Jan. 30, 2019; 15 Pages; European Patent Office.

HYBRID GRADIENT-INTERFERENCE HARDCOATINGS

CROSS-REFERENCE TO RELATED APPLICATIONS

This application claims the benefit of priority under 35 U.S.C. § 371 to International Patent Application No. PCT/US2018/049165, filed Aug. 31, 2018, which claims the benefit of priority under 35 U.S.C. § 119 of U.S. Provisional Application Ser. No. 62/552,604, filed on Aug. 31, 2017, the contents of both of which are relied upon and incorporated herein by reference in their entirety.

BACKGROUND

The disclosure relates to durable and scratch resistant articles and methods for making the same, and more particularly to articles with an optical coating exhibiting abrasion resistance and scratch resistance. The optical coatings have a gradient portion, yet nevertheless exhibit optical characteristics of multi-layer interference stacks.

Known multi-layer interference stacks are susceptible to wear or abrasion. Such abrasion can compromise any optical performance improvements achieved by the multi-layer interference stack. For example, optical filters are often made from multilayer coatings having differing refractive indices and made from optically transparent dielectric material (e.g., oxides, nitrides, and fluorides). Most of the typical oxides used for such optical filters are wide band-gap materials, which do not have the requisite mechanical properties, such as hardness, for use in mobile devices, architectural articles, transportation articles or appliance articles. Nitrides and diamond-like coatings may exhibit high hardness values but such materials do not exhibit the transmittance needed for such applications.

Abrasion damage can include reciprocating sliding contact from counter face objects (e.g., fingers). In addition, abrasion damage can generate heat, which can degrade chemical bonds in the film materials and cause flaking and other types of damage to the cover glass. Since abrasion damage is often experienced over a longer term than the single events that cause scratches, the coating materials experiencing abrasion damage can also oxidize, which further degrades the durability of the coating.

Known multi-layer interference stacks are also susceptible to scratch damage and, often, even more susceptible to scratch damage than the underlying substrates on which such coatings are disposed. In some instances, a significant portion of such scratch damage includes microductile scratches, which typically include a single groove in a material having extended length and with depths in the range from about 100 nm to about 500 nm. Microductile scratches may be accompanied by other types of visible damage, such as sub-surface cracking, fictive cracking, chipping and/or wear. Evidence suggests that a majority of such scratches and other visible damage is caused by sharp contact that occurs in a single contact event. Once a significant scratch appears, the appearance of the article is degraded since the scratch causes an increase in light scattering, which may cause significant reduction in optical properties. Single event scratch damage can be contrasted with abrasion damage. Single event scratch damage is not caused by multiple contact events, such as reciprocating sliding contact from hard counter face objects (e.g., sand, gravel and sandpaper), nor does it typically generate heat, which can degrade chemical bonds in the film materials and cause flaking and other types of damage. In addition, single event scratching typically does not cause oxidization or involve the same conditions that cause abrasion damage and therefore, the solutions often utilized to prevent abrasion damage may not also prevent scratches. Moreover, known scratch and abrasion damage solutions often compromise the optical properties.

In multi-layer interference stacks having sharp interfaces between the multiple layers of the stack, such interfaces may be a weak point in the ability of the stack to resist mechanical damage.

Accordingly, there is a need for new optical coatings, and methods for their manufacture, which are abrasion resistant, scratch resistant and have improved optical performance, and have improved mechanical performance relative to multi-layer interference stacks.

SUMMARY

The present disclosure describes embodiments directed to durable and scratch resistant articles that include an optical coating that includes a gradient portion.

In some embodiments, an article comprises: a substrate comprising a first major surface; and an optical coating disposed over the first major surface. The optical coating comprises: a second major surface opposite the first major surface; a thickness in a direction normal to the second major surface; and a first gradient portion. A refractive index of the optical coating varies along a thickness of the optical coating between the first major surface and the second major surface. The difference between the maximum refractive index of the first gradient portion and the minimum refractive index of the first gradient portion is 0.1 or greater. The absolute value of the slope of the refractive index of the first gradient portion is 0.1/nm or less everywhere along the thickness of the first gradient portion. The article exhibits an average single-surface reflectance of 15% to 98% over the wavelength range 400 nm-700 nm, measured at the second major surface. The article also exhibits a maximum hardness in the range from about 10 GPa to about 30 GPa, wherein maximum hardness is measured on the second major surface by indenting the second major surface with a Berkovich indenter to form an indent comprising an indentation depth of about 100 nm or more from the surface of the second major surface. Refractive index "slope" is measured along the thickness direction over a refractive index change of 0.04.

In some embodiments, for any of the embodiments described herein, the difference between the maximum refractive index of the first gradient portion and the minimum refractive index of the first gradient portion is 0.3 or greater.

In some embodiments, for any of the embodiments described herein, the article exhibits an average transmittance of 5% to 90%, measured at the second major surface.

In some embodiments, for any of the embodiments described herein, everywhere along the thickness of the first gradient portion, the absolute value of the slope of the refractive index of the optical coating is 0.02/nm or less, or 0.012/nm or less.

In some embodiments, for any of the embodiments described herein, everywhere along the thickness of the first gradient portion, the absolute value of the slope of the refractive index of the optical coating is 0.001/nm or greater, or 0.005/nm or greater.

In some embodiments, for any of the embodiments described herein, the optical coating further comprises a high hardness portion. The thickness of the high hardness portion is 200 nm or more, or 1000 nm or more. The average index of refraction in the high hardness portion is 1.6 or more. The maximum hardness of the high hardness portion is 10 GPa or more, wherein maximum hardness is measured by indenting the thick high hardness portion with a Berkovich indenter to form an indent comprising an indentation depth of about 100 nm or more.

In some embodiments, for any of the embodiments described herein, for 95% or more of the thickness of the high hardness portion, the difference between the maximum refractive index of the high hardness portion and the minimum refractive index of the high hardness portion is 0.05 or less.

In some embodiments, for any of the embodiments described herein, everywhere along the thickness of the high hardness portion, the difference between the maximum refractive index of the high hardness portion and the minimum refractive index of the high hardness portion is 0.05 or less.

In some embodiments, for any of the embodiments described herein, in the embodiments of any of the paragraphs in the summary section, the optical coating comprises, in order, along the direction of the thickness from the second major surface toward the first major surface: the first gradient portion; and the high hardness portion in contact with the first gradient portion. Where the high hardness portion contacts the first gradient portion, the difference between the refractive index of the high hardness portion and the maximum refractive index of the first gradient portion is 0.05 or less.

In some embodiments, for any of the embodiments described herein, the optical coating further comprises a second gradient portion disposed between the high hardness portion and the substrate. The second gradient portion is in contact with the high hardness portion. The difference between the maximum refractive index of the second gradient portion and the minimum refractive index of the second gradient portion is 0.05 or greater. Everywhere along the thickness of the second gradient portion, the absolute value of the slope of the refractive index of the optical coating is 0.1/nm or less.

In some embodiments, for any of the embodiments described herein, the refractive index of the first gradient portion monotonically increases along the thickness in a direction moving away from the second major surface. The optical coating further comprises a multilayer interference stack comprising discrete layers disposed between the high hardness portion and the substrate.

In some embodiments, for any of the embodiments described herein, the refractive index of the first gradient portion monotonically increases along the thickness in a direction moving away from the second major surface. The optical coating further comprises a second gradient portion that oscillates across the thickness of the gradient portion as a function of distance from the substrate.

In some embodiments, for any of the embodiments described herein, the optical coating comprises, in order, along the direction of the thickness from the second major surface toward the first major surface: a multilayer interference stack comprising discrete layers; the high hardness portion in contact with the multilayer interference stack; and the first gradient portion in contact with the high hardness portion. The high hardness portion contacts the first gradient portion. The difference between the refractive index of the high hardness portion and the maximum refractive index of the first gradient portion is 0.05 or less. The refractive index of the first gradient portion monotonically decreases along the thickness in a direction moving away from the second major surface.

In some embodiments, for any of the embodiments described herein, the optical coating consists only of the first gradient portion, the high hardness portion, and the multilayer interference stack. The optical coating is in direct contact with the substrate, and wherein the second major surface is an outer surface.

In some embodiments, for any of the embodiments described herein, the optical coating consists only of the first gradient portion, the high hardness portion, and the second gradient portion. The optical coating is in direct contact with the substrate, and wherein the second major surface is an outer surface.

In some embodiments, for any of the embodiments described herein, the absolute value of the slope of the refractive index of the optical coating is 0.1/nm or less everywhere in the optical coating.

In some embodiments, for any of the embodiments described herein, the article exhibits a single side reflected color range for all viewing angles from 0 to 60 degrees, measured at the second major surface, that comprises all a* points comprising values of 5 or less.

In some embodiments, for any of the embodiments described herein, the article exhibits a single side reflected color range for all viewing angles from 0 to 60 degrees, measured at the second major surface, that comprises all b* points comprising values of 5 or less.

In some embodiments, for any of the embodiments described herein, the article exhibits a single side reflected color range for all viewing angles from 0 to 60 degrees, measured at the second major surface, that comprises all a* points and all b* points comprising values of 5 or less.

In some embodiments, for any of the embodiments described herein, the article exhibits a single side reflected color range for all viewing angles from 0 to 90 degrees, measured at the second major surface, that comprises all a* points and all b* points comprising absolute values of 10 or less.

In some embodiments, for any of the embodiments described herein, the article exhibits a single side reflected color range for all viewing angles from 0 to 10 degrees, measured at the second major surface, that comprises at least one a* point or b* point comprising values of 20 or greater.

In some embodiments, for any of the embodiments described herein, the article exhibits a maximum visible reflectance between 30% to 80%.

In some embodiments, for any of the embodiments described herein, the article exhibits an average photopic reflectance between 15% to 50%.

In some embodiments, for any of the embodiments described herein, the optical coating is disposed directly on the first major surface of the substrate.

In some embodiments, for any of the embodiments described herein, the article exhibits an average transmittance or average reflectance comprising an average oscillation amplitude of 20 percentage points or less, over the optical wavelength regime.

In some embodiments, for any of the embodiments described herein, the optical coating comprises a thickness in the range from about 0.5 μm to about 3 μm.

In some embodiments, for any of the embodiments described herein, the cumulative thickness of any parts of the optical coating between the high hardness portion and the second major surface comprising a RI of 1.6 or less is 200 nm or less.

In some embodiments, for any of the embodiments described herein, the article comprises a maximum hardness in the range from about 12 GPa to about 30 Gpa, or about 16 Gpa to about 30 Gpa, wherein maximum hardness is measured on the second major surface by indenting the second major surface with a Berkovich indenter to form an indent comprising an indentation depth of about 100 nm or more from the surface of the second major surface.

In some embodiments, for any of the embodiments described herein, the optical coating comprises a compositional gradient, the compositional gradient comprising at least two of Si, Al, N, and O.

In some embodiments, for any of the embodiments described herein, the optical coating comprises a gradient selected from at least one of a porosity gradient, a density gradient and an elastic modulus gradient.

In some embodiments, for any of the embodiments described herein, the article further comprises a first optional layer in contact with the first major surface, and a second optional layer in contact with the second major surface.

In some embodiments, for any of the embodiments described herein, the article is a sunglass lens.

In some embodiments, for any of the embodiments described herein, the article is a scratch resistant mirror.

In some embodiments, for any of the embodiments described herein, the article is a lens incorporated into glasses.

In some embodiments, for any of the embodiments described herein, the article is a portion of a housing or cover substrate of a consumer electronic product, the consumer electronic product comprising: a housing having a front surface, a back surface and side surfaces; electrical components provided at least partially within the housing, the electrical components including at least a controller, a memory, and a display, the display being provided at or adjacent the front surface of the housing; and a cover substrate disposed over the display.

In some embodiments, for any of the embodiments described herein, a method of forming an article comprises: obtaining a substrate comprising a first major surface and comprising an amorphous substrate or a crystalline substrate; disposing an optical coating on the first major surface, the optical coating comprising a second major surface opposite the first major surface and a thickness in a direction normal to the second major surface; and creating a refractive index gradient along at least a first gradient portion of the thickness of the optical coating. A refractive index of the optical coating varies along a thickness of the optical coating between the first major surface and the second major surface. The difference between the maximum refractive index of the first gradient portion and the minimum refractive index of the first gradient portion is 0.1 or greater. The absolute value of the slope of the refractive index of the first gradient portion is 0.1/nm or less everywhere along the thickness of the first gradient portion. The article exhibits an average single-surface reflectance of 15% to 98% over the wavelength range 400 nm-700 nm, measured at the second major surface. The article also exhibits a maximum hardness in the range from about 10 GPa to about 30 GPa, wherein maximum hardness is measured on the second major surface by indenting the second major surface with a Berkovich indenter to form an indent comprising an indentation depth of about 100 nm or more from the surface of the second major surface. Refractive index "slope" is measured along the thickness direction over a refractive index change of 0.04.

In some embodiments, for any of the embodiments described herein, creating a refractive index gradient comprises varying along the thickness of the optical coating at least one of the composition and the porosity of the optical coating.

In some embodiments, for any of the embodiments described herein, the optical coating is disposed on the first major surface by a physical vapor deposition sputter process.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
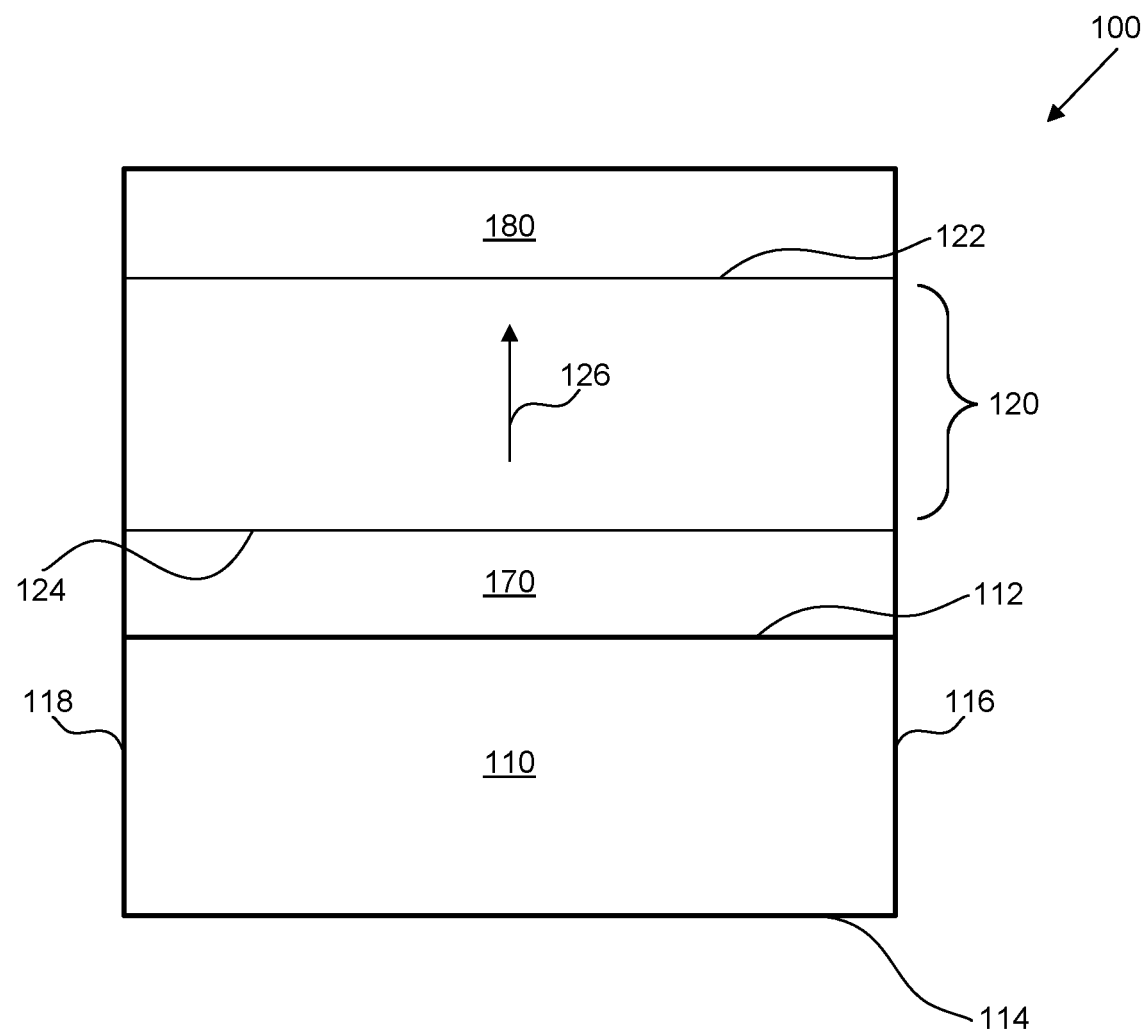
FIG. 1 is a side view of an article, according to one or more embodiments.

Reference will now be made in detail to various embodiments, examples of which are illustrated in the accompanying drawings.

For some applications, specific optical properties including particular reflectance and optionally transmittance properties may be desired in a hardcoating that also provides high hardness and scratch resistance. These applications may include eyeglasses, exterior side of sunglasses, RF transparent backings or housings of smartphones and similar devices, smartphone covers, smartwatches, heads-up display systems, automotive windows, mirrors, display covers, touch screens, and display surfaces, architectural glass and surfaces, and other decorative, optical, display, or protective applications.

Existing hardcoatings include both "discrete layer" multilayer designs employing optical interference effects, as well as "gradient" designs that employ a gradual change in refractive index. The previous discrete layer designs are typically characterized by abrupt changes in refractive index across an interface, such as a change in refractive index of 0.2 or more, and in some cases 0.4 or more, across an interface or transition zone that is less than 2 nm, less than 1 nm, or even less than 0.5 nm in thickness.

Discrete layers may be more prone to certain mechanical failure modes such as delamination, chipping, or flaking of layers due to low adhesion energy, stresses, or atomic/molecular bond disruption between dissimilar materials across abrupt interfaces. Improved mechanical performance levels have been observed under some test conditions for "gradient" films that employ gradual changes in composition (resulting in gradual changes in refractive index). Compositional grading is believe to improve cohesion and adhesion with the coating layer structure, leading to improved scratch and damage resistance under some conditions. Sub-wavelength features and interference effects normally associated with discrete layers are typically needed to control reflectance and transmittance spectra with precision for materials systems having a lowest index of about 1.45 (e.g. $SiO_2$) being used in air.

Gradient Portions

In some embodiments, a gradient approach, optionally combined with an interference layer approach, is used to create optical hardcoats. It is believed that the presence of one or more gradient portions can provide enhanced scratch and damage resistance under some conditions. In some preferred embodiments, the materials forming the gradient portions (and optionally, all portions of the optical coating) are fully dense, that is they are non-porous or have a porosity or void volume that is less than 10%, less than 5%, or even less than 1% of the total volume of said portions.

The refractive index of the materials described herein typically correlates with mechanical properties of the materials, such as the hardness of the materials. So, an abrupt change in refractive index means an abrupt change in hardness, and may also result in an abrupt change in stress, thermal expansion, atomic bond arrangement, and other factors which can affect mechanical performance. It is believed that an abrupt interface between two materials having a significantly different refractive index may be a weak point in the ability of an optical coating to resist mechanical damage. But, multi-layer interference stacks rely on such abrupt changes to obtain desired optical properties.

In contrast to abrupt interfaces, a compositionally graded interface or "gradient portion" may be used to transition between different refractive indices. A gradient portion is believed to impart mechanical robustness, including scratch and damage resistance, when compared to the alternative of an abrupt interface. A gradient portion is characterized by gradual changes in refractive index. For example, some or all of the refractive index transitions in the coating layer structure may be characterized by an absolute (positive or negative) value of refractive index 'slope' of 0.1/nm or less (meaning less than 0.1 refractive index change per nm of coating thickness), 0.05/nm or less (or less than about 0.5 per 10 nm), 0.02/nm or less (or less than 0.2 per 10 nm), 0.016/nm or less, 0.012/nm or less, or even 0.01/nm or less (less than about 0.1 per 10 nm).

In some embodiments, the refractive index slope of a gradient portion is 0.001 or more, 0.002 or more, or 0.005 or more.

As used herein, a refractive index "slope" may be used to describe how quickly refractive index changes as a function of position along the thickness of a film Refractive index slope may be calculated by dividing a change in refractive index by the distance over which that change occurs. In an optical coating, refractive index is typically constant in directions perpendicular to the direction of the coating thickness, and the refractive index slope is measured relative to distance changes in the direction of the coating thickness, e.g., thickness direction 126 of FIG. 1.

A refractive index gradient may be implemented as a continuous change in refractive index, or as a series of small steps in refractive index. For sufficiently small step sizes, the optical and mechanical properties are expected to be the same as those of a smooth gradient having no steps in refractive index. But, a small step in refractive index may have a locally high refractive index slope, if the slope is measured over a sufficiently small distance interval that includes a refractive index step, while excluding much of the distance between steps. To avoid such anomalies from locally measuring slope over a small distance interval at the exact position of a small step in refractive index, refractive index slopes as described herein are measured and calculated over a discrete refractive index interval. Unless otherwise specified, the refractive index slopes discussed herein are measured and calculated over a refractive index interval of 0.04. In other words, the refractive index slope is 0.04 divided by the distance over which the refractive index changes by 0.04. This methodology causes the distance between steps in refractive index to be considered when calculating a refractive index slope where the step sizes are 0.04 or less. In some embodiments, the refractive index interval over which a refractive index slope is calculated may be 0.02, 0.03, 0.04, 0.05 or 0.06.

Where the refractive index slope is zero or near zero over a relatively large distance, the methodology for calculating refractive index slope described above may not work, because there is no refractive index interval of 0.04. So, where there is no refractive index interval of 0.04 over a distance of 100 nm or greater, the refractive index slope may be calculated over a distance interval of 100 nm. In other words, the refractive index slope in this case is the change in refractive index (that is less than 0.04) that occurs over 100 nm, divided by 100 nm.

A gradient portion may have a refractive index that increases, decreases, or oscillates across the thickness of the gradient portion as a function of distance from the substrate. Such an increase or decrease in refractive index may be monotonic.

In some embodiments, in order for the gradient portion to have a significant effect on the optical properties of an article, the difference between the maximum refractive index of the first gradient portion and the minimum refractive index of the first gradient portion should be 0.05 or greater, 0.1 or greater, 0.3 or greater, or 0.4 or greater. In some embodiments, the endpoints of a monotonic change in refractive index forming a single gradient portion or multiple gradient portions may comprise at least one refractive index endpoint above 1.65, above 1.7, above 1.8, or even above 1.9, with another refractive index endpoint below 1.6, below 1.55, or even below 1.5.

Thick High Hardness Portion

In some embodiments, an optical coating comprises a thick high hardness portion in addition to a gradient portion. In these cases, the scratch resistance may be enhanced by the thick (e.g. 200 nm-5000 nm thick) high hardness portion. In some embodiments, the thickness of soft material above the thick high hardness portion is limited. For example, 300 nm or less, 200 nm or less or even 100 nm or less of lower-hardness or low-refractive-index material (e.g. $SiO_2$) may be above the thick hard layer (i.e. disposed on the outside-facing or user surface) of the hardcoated article. The amount of lower-hardness or low-refractive-index material above the thick hard layer may be zero, or may be 1 nm or more.

So long as the refractive index and hardness criteria described herein are met, the thick high hardness portion need not be truly a single material or a single layer. For example, the thick hard layer can comprise many thin layers or nanolayers, such as in a "superlattice" structure, or other hard layer structures comprising multiple materials, compositions, or structural layers or gradients. Without being limited by theory, in a superlattice structure, a stack of sufficiently thin layers of different materials may result in a unique microstructure such that the superlattice structure has optical and mechanical properties similar to a thick layer of a single material, with a hardness exceeding that of any of the materials in the individual thin layers. Exemplary structures are disclosed in WO2016/138195, which is incorporated by reference in its entirety.

The thick high hardness portion may have an average refractive index of 1.6 or more, 1.7 or more, or 1.8 or more. These refractive indices generally correspond to high hardness material selections. The high hardness portion may have an indentation hardness of 10 GPa or greater, 12 GPa or greater, 14 GPa or greater, GPa or greater, 18 GPa or greater, or 20 GPa or greater, or between 10 and 30 GPa.

The thick high hardness portion may have a physical thickness of 200 nm, 300 nm, 400 nm, 500 nm, 600 nm, 700 nm, 800 nm, 900 nm, 1000 nm, 1200 nm, 1400 nm, 1600 nm, 1800 nm, 2000 nm, 2500 nm, 3000 nm, 3500 nm, 4000 nm, 4500 nm, 5000 nm, 10000 nm, and all ranges and sub-ranges therebetween.

The thick high hardness layer may have a maximum hardness, as measured by the Berkovich Indenter Hardness Test, of about 10 GPa or greater, about 12 GPa or greater, about 15 GPa or greater, about 18 GPa or greater, or about 20 GPa or greater. The thick high hardness portion may be deposited as a single layer in order to characterize hardness.

In some embodiments, a thin soft layer may be incorporated into the thick high hardness portion. For example, 95% or more of the thickness of the high hardness portion, the maximum refractive index and the minimum refractive index may be within 0.05 of each other. But, for 5% of the thickness of the high hardness portion may have a lower refractive index. In this case, this lower refractive index (and correspondingly softer material) may be buried sufficiently deep in the optical coating that its impact on overall structural properties is not too great. But, it is preferred to avoid such a softer material in the thick high hardness portion. For example, the maximum refractive index and the minimum refractive index may be within 0.05 of each other everywhere within the thick high hardness portion.

In some embodiments, the thick high hardness portion may have a relatively constant (and high) refractive index. For example, the maximum refractive index and the minimum refractive index may be within 0.05 of each other for 95% of the thickness of the thick high hardness portion, or everywhere within the thick high hardness portion. In some embodiments, the refractive index in the thick high hardness portion may have a gradient, and that the maximum refractive index and the minimum refractive index may differ by more than 0.05 in the thick high hardness portion.

Limited or No Abrupt Interfaces in the Hardcoat

In some embodiments, in addition to incorporating a gradient portion and a high hardness portion, the optical coating has limited or no abrupt interfaces. An abrupt interface occurs where there is an abrupt change in refractive index over a short distance. It is believed that such abrupt interfaces may be a weak point that may degrade mechanical properties. Abrupt interfaces may be avoided, for example, by using gradient portions and thick high hardness portions in the optical coating instead of multi-layer interference stacks, and by index matching at the boundary between different portions in the optical coating.

In some embodiments, abrupt interfaces may be present, but any abrupt interfaces are buried beneath a thick high hardness portion. A gradient portion may be present above the thick high hardness portion. It is believed that the thick high hardness portion protects any underlying layers from mechanical damage, such that the presence of abrupt interfaces beneath the thick high hardness portion may have little or no deleterious effects on mechanical properties.

In some embodiments, abrupt interfaces are avoided altogether in the optical coating. The optical coating consists of only gradient portions, thick high hardness portions, and optionally thin (e.g. <200 nm) low-refractive index portions having constant index. It is believed that the lack of abrupt interfaces enhances mechanical properties. For example, everywhere in the optical coating, the absolute value of the slope of the refractive index of the optical coating may be 0.1/nm or less, 0.05/nm or less, 0.02/nm or less, 0.016/nm or less, 0.012/nm or less, or even 0.01/nm or less.

In some embodiments, abrupt interfaces are avoided at interfaces between gradient portions and/or thick high hardness portions. For example, the difference in refractive index at such an interface when moving across the interface from one portion to another may be 0.05 or less, 0.04 or less, 0.03 or less, 0.02 or less, 0.01 or less, or 0.005 or less.

Reflectance

In some embodiments, an optical hardcoat using a gradient approach nevertheless employs optical interference effects to generate optical coating having optical properties such as reflectance normally associated with multilayer interference stacks, even in the absence of abrupt interfaces in the optical coating.

Specifically, one or more surfaces of the hardcoated articles or one or more interfaces of the hardcoating may have an average reflectance of 15% to 99% over the wavelength range 400 nm-700 nm, measured at the second major surface. The average reflectance may be 15%, 20%, 25%, 30%, 35%, 40%, 45%, 50%, 55%, 60%, 65%, 70%, 75%, 80%, 85%, 90%, 95%, 98%, 99% and all ranges and sub-ranges therebetween. These reflectance values may represent the single-surface article reflectance at 550 nm wavelength, a reflectance average from 500-600 nm wavelength, a reflectance average from 450-650 nm, a reflectance average from 420-680 nm, a reflectance average from 400-700 nm, or a photopic average reflectance. Unless otherwise specified, reflectances described herein are average reflectance over the wavelength range 400 nm-700 nm reflectances. These same reflectance values listed above may also represent a maximum reflectance in the visible range from 400-700 nm, rather than an average reflectance.

In some embodiments, for any of the embodiments described herein, the article exhibits a maximum visible reflectance between 30% to 80%. In some embodiments, for any of the embodiments described herein, the article exhibits an average photopic reflectance between 15% to 50%.

Surprisingly, these reflectance may be achieved using hardcoats that incorporate a gradient portion. More surprisingly, these reflectance may be achieved using hardcoats that do not have any abrupt interfaces, i.e., where the entire hardcoat is one or more gradient portions, thick high hardness portions, or thin (e.g. <200 nm) low-refractive index portions having full density and low or no porosity. These low reflectance values are surprising because, for hardcoatings, multi-layer interference stacks having abrupt interfaces are typically used to generate reflectances in this range.

As used herein, the term "transmittance" is defined as the percentage of incident optical power within a given wavelength range transmitted through a material (e.g., the article, the substrate or the optical film or portions thereof). The term "reflectance" is similarly defined as the percentage of incident optical power within a given wavelength range that is reflected from a material (e.g., the article, the substrate, or the optical film or portions thereof). Transmittance and reflectance are measured using a specific linewidth. In one or more embodiments, the spectral resolution of the characterization of the transmittance and reflectance is less than 5 nm or 0.02 eV. Unless otherwise specified, reflectance and transmittance are measured at a near-normal incidence.

Transmittance

In some embodiments, an optical hardcoat using a gradient approach nevertheless employs optical interference effects to generate specific reflectance and transmittance properties in an article. The single surface reflectance described above may be obtained along with specific transmittance, even in the absence of abrupt interfaces in the optical coating.

Specifically, the hardcoated articles may have a total article average transmittance of 1%, 5%, 10%, 15%, 20%, 25%, 30%, 35%, 40%, 45%, 50%, 55%, 60%, 65%, 70%, 75%, 80%, 85%, 90%, and all ranges and sub-ranges therebetween, said values being applicable to one or more of the optical wavelength ranges specified for reflectance above. Unless otherwise specified, transmittances described herein are average transmittance over the wavelength range 400 nm-700 nm.

Surprisingly, these transmittances and reflectances may be achieved using hardcoats that incorporate a gradient portion. More surprisingly, these transmittances and reflectance may be achieved using hardcoats that do not have any abrupt interfaces, i.e., where the entire hardcoat is one or more gradient portions, thick high hardness portions, or thin low-refractive index portions. These reflectance and transmittance properties in combination with high hardness and/or scratch resistance are surprising because multi-layer interference stacks having abrupt interfaces are typically used to generate such a combination.

Overall Optical Coating Thickness

The physical thickness of optical coating 120 may be in the range from about 0.1 µm to about 5 µm. In some instances, the physical thickness of the optical coating 120 may be in the range from about 0.01 µm to about 0.9 µm, from about 0.01 µm to about 0.8 µm, from about 0.01 µm to about 0.7 µm, from about 0.01 µm to about 0.6 µm, from about 0.01 µm to about 0.5 µm, from about 0.01 µm to about 0.4 µm, from about 0.01 µm to about 0.3 µm, from about 0.01 µm to about 0.2 µm, from about 0.01 µm to about 0.1 µm, from about 0.02 µm to about 1 µm, from about 0.03 µm to about 1 µm, from about 0.04 µm to about 1 µm, from about 0.05 µm to about 1 µm, from about 0.06 µm to about 1 µm, from about 0.07 µm to about 1 µm, from about 0.08 µm to about 1 µm, from about 0.09 µm to about 1 µm, from about 0.1 µm to about 1 µm, from about 0.1 µm to about 2 µm, from about 0.1 µm to about 3 µm, from about 0.1 µm to about 4 µm, from about 0.1 µm to about 5 µm, from about 0.2 µm to about 1 µm, from about 0.2 µm to about 2 µm, from about 0.2 µm to about 3 µm, from about 0.2 µm to about 4 µm, from about 0.2 µm to about 5 µm, from about 0.3 µm to about 5 µm, from about 0.4 µm to about 5 µm, from about 0.5 µm to about 10 µm, from about 0.6 µm to about 3 µm, from about 0.7 µm to about 2 µm, from about 0.8 µm to about 1 µm, or from about 0.9 µm to about 1 µm, and all ranges and sub-ranges therebetween. Other thicknesses may be suitable as well.

Materials and Processes for Hardcoating

In some embodiments, the coating structure may include hard oxide, nitride, or oxynitride layers, optionally in combination with metallic layers. Preferred hardcoating materials include AlNx, SiNx, SiOxNy, AlOxNy, SiuAlvOxNy, SiO2, Al2O3, and compositional mixtures thereof having intermediate values of refractive index and hardness representing the combined/mixed properties of these materials.

In some embodiments, metal mode sputtering may be used to deposit a hardcoating. In metal mode sputtering, samples are affixed to a moving surface which sequentially passes by a metal sputtering source as step one, and subsequently by a plasma source as step two. The plasma source can contain oxygen and nitrogen. Steps one and two are repeated many times in order to deposit a thick film that consists of metal layers that are reacted with oxygen or nitrogen to form hard oxide, nitride, or oxynitride layers.

During the metal mode sputtering process, when the samples are in front of the metal source they are coated with a thin layer of metal. The thickness of metal that is deposited during one pass in front of the metal source depends on the metal deposition metal rate and the length of time that the samples spend in front of the metal source. When the samples then move to the plasma source position, the thin layer of metal is reacted with the plasma to form a thin film of metal nitride and/or metal oxide. The extent, or completeness, of the chemical reaction to form the metal nitrides or oxides depends on the chemical activity of reactive nitrogen and oxygen species, the chemical activity of the metal surface, and the length of time that the samples spend in front of the plasma source.

For example, samples can be mounted on a cylindrical drum where the axis of the drum is oriented vertically. The diameter of the drum and the rotation rate (sometimes measured in revolutions per minute) determine the velocity with which the samples move over metal and plasma sources. The cylindrical drum is contained in a vacuum chamber which contains a sputtering source (metal source) and an Inductively Coupled Plasma (ICP) source. The cylinder is rotated about its axis in order to move the samples past the metal and plasma sources in a sequential and repeating pattern.

The sputtering source rate is determined by processing parameters including the flows of gasses, the pressure of the chamber, the distance separating the samples from the magnetron sources, the powers applied to the sputtering sources, the shape and size of the sputtering sources, and other features. The chemical activities for the plasma constituents can be quantified via actinometry or electrical probing. These measurements can quantify the plasma densities, the electronic potentials and the ion and electron temperature distributions. However, these can be laborious measurements, and are often not performed. Rather, the ICP plasma is often described by the coil size, the power to the coil, and the flows of gasses to the area of the coil.

The films described herein were deposited by metal mode sputtering using a deposition chamber that was manufactured by OptoRun (a company). The drum diameter was about 1650 millimeters and the rotation rate was 80 rpm. The chamber pressure was about 2 millitorr. We used dual rotatable cylindrical magnetron targets having a length of about 850 millimeters and a diameter of about 180 millimeters. The sputtering surface of the targets consisted of Silicon and/or Aluminum. The magnets of the magnetron produced a magnetic field strength of about 500 gauss at the surface of the target. The power was applied to the magnetron pair in alternating current (AC) mode, being supplied by a Huttinger (a company) power supply operating in mid-frequency mode. During one half of an AC cycle of the mid-frequency mode, one magnetron cylinder is powered as the cathode (negative charge) while the other magnetron cylinder is powered as an anode (positive charge). The throw distance from the magnetron surface to the surfaces of the samples was about 100 millimeters. The reactor used four planar spiral pancake coils for the ICP, located at the corners of a square array. Each of the four coils consisted of about 2 turns of an about 12 mm diameter copper coil, and had a diameter of about 400 millimeters. The coils were custom fabricated by OptoRun (a company).

The SiN and SiON processes that were used for the data of this application used the set of conditions specified in the table below.

TABLE 1

| $SiN_x$ - single layer Start-up: | |
|---|---|
| ramp up time | 60 s |
| Magnetron pairs 2, 3, 4 Ar flow: | 140 sccm each |
| Power, magnetron pair 2 (Si) | 0 kW to Si |
| ICP power | 0.5 -> 4 kW |
| ICP flow Ar | 80 sccm |
| ICP flow O2 | 150 sccm |
| ICP flow N2 | 0 sccm |
| Deposition: | |
| Dep time | 2600 s |
| Magnetron paris 2, 3, 4 Ar flow: | 140 sccm each |
| Power, magnetron pair 2 (Si) | 9 kW to Si |
| ICP power | 4 kW |
| ICP flow Ar | 80 sccm |
| ICP flow O2 | 0 sccm |
| ICP flow N2 | 150 sccm |
| $SiO_xN_y$ - single layer Start-up: | |
| ramp up time | 60 s |
| Magnetron pairs 2, 3, 4 Ar flow: | 140 sccm each |
| Power, magnetron pair 2 (Si) | 0 kW to Si |
| ICP power | 0.5 -> 4 kW |
| ICP flow Ar | 80 sccm |
| ICP flow O2 | 150 sccm |
| ICP flow N2 | 0 sccm |
| Deposition: | |
| Dep time | 2600 s |
| Magnetron paris 2, 3, 4 Ar flow: | 140 sccm each |
| Power, magnetron pair 2 (Si) | 9 kW to Si |
| ICP power | 4 kW |
| ICP flow Ar | 80 sccm |
| ICP flow O2 | 20 sccm |
| ICP flow N2 | 150 sccm |

Other processes can produce SiNx and SiOxNy, where the material produced by those other processes may have the properties that are claimed in this application. Other processes that can make SiNx and SiOxNy films include reactive sputtering, evaporative technologies such as electron beam evaporation, Chemical Vapor Deposition (CVD), Plasma Enhanced Chemical Vapor Deposition (PECVD), Atomic Layer Deposition (ALD), plating technologies such as electroplating, and wet chemical deposition technologies such as sol-gel.

Sputtering process conditions for high-hardness SiNx, SiOxNy, and SiuAlvOxNy were found to deliver hardness and refractive index values substantially identical to high-hardness AlOxNy, further described in U.S. Pat. No. 9,335,444, which is incorporated by reference in its entirety. These high-hardness materials are characterized by a measured single-layer film hardness of >16, >18, >20, or from 16 GPa to 25 GPa for single-layer films of 500-5000 nm thickness on glass substrates (where the glass substrate has a hardness of ~7 GPa). These high-hardness materials are also generally characterized by refractive index (n) values (measured at 550 nm) of about 1.85-2.1, and complex refractive index (absorption coefficient, k) values less than about 1 e-2, less than 5 e-3, less than 1 e-3, or even less than 5 e-4 as measured at 400 nm wavelength. K is measured at 400 nm for greater sensitivity, while n is typically reported at 550 nm. Generally speaking, all of these high-hardness materials can be fabricated by reactive sputtering, metal-mode reactive sputtering, and PECVD at process temperatures below 400 C or even below 300 C.

It has been found that "AlON," "SiON", and "SiAlON" based compositions are substantially interchangeable in the optical designs disclosed here, when properly tuned to achieve the desired combinations of hardness, refractive index, film stress, and low optical absorption. A preferred thin film deposition process is reactive or metal-mode sputtering, though other processes such as PECVD are also avenues for fabricating the coatings of the present disclosure. For the purposes of this disclosure, single and multi-layer films of AlOxNy, SiOxNy, and SiuAlvOxNy may be fabricated by reactive and metal-mode sputtering, and their hardness and optical properties tuned to achieve the desired ranges. Suitable fabrication processes are described, for example, in U.S. Pat. No. 9,335,444, which is incorporated by reference in its entirety. The measured optical properties of these coatings were used in thin-film design simulations to generate the modeled examples of the present disclosure.

The optical layers (which may be hard layers or softer layers) may also include additional materials known in the thin film art such as $SiO_2$, $Al_2O_3$, $TiO_2$, $Nb_2O_5$, $Ta_2O_5$, $HfO_2$, others known in the art, and mixtures, layered structures, and combinations thereof.

Applications

In some embodiments, applications include display covers, touchscreens, smartphone housing components such as cover elements or backings (e.g. hardcoated glass or glass ceramics), exterior of sunglasses, and scratch-resistant mirrors.

Different substrates may be used for different applications. The modeled examples herein use Corning glass code 5318, available from Corning Incorporated, Corning, N.Y. It should be understood that alternate substrates can also be used as substrates for these coating designs. Non-limiting examples include clear non-absorbing glass such as Gorilla glass, partially absorbing ophthalmic glasses such as Corning Grey 17 (glass code 82524), or glass ceramics such as chemically strengthened black glass ceramic. The first-surface reflectance and reflected color values remain substantially the same with these different choices of substrate (while the transmission values will be largely changed by the choice of substrate). In the case of black glass-ceramic substrates, the total article transmission can be less than 10% or less than 1%. In the case of clear non-absorbing substrates, the transmittance will be approximately 100-% Reflectance of coating ($1^{st}$ surface), or 100-4-% Reflectance of coating (the latter case accounting for a 4% Reflectance from the rear, uncoated surface of the clear glass substrate).

Absorbing and Metal Layers

In some embodiments, hardcoating designs described herein can be combined with metallic layers or absorbing layers. Absorbing layers may be particularly useful in sunglasses applications where it is desirable to minimize the reflectance on the user side of the coated article. In these cases, it may be preferable to locate absorbing material on the user side of the hardcoating, such as an absorbing glass substrate facing the user's eyes, and the reflective or colored hardcoatings on the external-facing surface of the article for both reflectance and scratch resistance towards the external environment. In these cases incorporating a one-sided absorbing article structure, the reflectance from the two sides of the article can vary due to the absorber. In these cases, unless otherwise specified, the reflectance values quoted here will apply to the environment-facing surface, the hardcoated surface, or the surface having a low level of absorption between the environment and the hardcoating/reflection layers. In some embodiments, an absorbing layer may be located between a hardcoating and a substrate. In some embodiments, it may be desirable to exclude metals from the stack, as in the examples described below, to maximize adhesion and scratch resistance.

Positioning of Optical Coatings on Specific Articles

In some embodiments, as both sides of eyeglasses or sunglasses can be subject to abrasion, especially during cleaning, it may be desirable to place a scratch-resistant coating on both sides of an eyeglass or sunglasses lens. In the case of an absorbing sunglass or eyeglass lens, it will often be desirable to place a higher-reflectance scratch-resistant coating on the external surface of the sunglass lens, and a low-reflectance or anti-reflection scratch-resistant coating on the interior (user eye facing) surface of the sunglass lens. For example, a coating on the exterior (front) surface of the lens may have an average reflectance as described herein. The interior (back) surface of the lens may have a hardcoating with a photopic average reflectance below 2% using any suitable optical coating. Suitable examples are described in U.S. Pat. No. 9,335,444, which is incorporated by reference in its entirety. WO2016018490 and WO2014182639 are incorporated by reference in their entireties.

In some embodiments, where a scratch-resistant coating is placed on both sides of an eyeglass or sunglasses lens, high hardness and scratch resistance is imparted to both surfaces. In these cases it may be preferred to place a low-reflectance coating (e.g. <4% photopic average reflectance) on the interior surface of the sunglass and a high-reflecting coating (e.g. >6% photopic average reflectance on the exterior surface. In this situation, the order of elements would be 1) user's eye; 2) Low-reflectance coating; 3) absorbing glass substrate; 4) High-reflectance coating; 5) sun or ambient environment. The Low-reflectance coating may be, for example, any suitable optical coating. Suitable examples are described in U.S. Pat. No. 9,335,444, which is incorporated by reference in its entirety. The high-reflectance coating may be, for example, coatings described herein.

In an eyeglasses application, as opposed to sunglasses, it may be preferred to utilize a low-reflectance scratch-resistant coating on both sides of a clear (non-absorbing glass substrate). In other cases it will be more cost-effective to use a single scratch resistant coating, most likely on the exterior facing surface of the eyeglasses or sunglasses.

In some embodiments, coatings described herein may also be useful in automotive glass applications, e.g. side windows or sunroofs or lamp covers. The coatings can provide a low-reflectance scratch-resistant coating having high scratch and weathering resistance.

In display cover and touchscreen applications, it will typically be preferred to place the optical hardcoating on the user-facing/exposed surface of the display or screen, though in some such applications it may be desirable to place the coatings on both sides of a display cover, or optionally to have two different coatings on two sides of a display cover. For example, a low-cost, low-hardness anti-reflective coating may be placed on the back side of a display cover, which may be protected from scratching due to its position, while a high-hardness anti-reflective coating such as the embodiments of the present disclosure may be placed on the front, user-facing side of the display cover.

Parameters

Parameters that may be considered and specified based on the disclosure herein include the following:

Hardness of coated article, coated surface.

Fraction of softer (typically lower refractive index) material in the coating stack.

Total amount (thickness) of softer material in the coating stack.

Total amount (thickness) of softer material on the exposed (away from substrate) side of the thickest high hardness (high index) layer.

Maximum reflectance in the visible range.

Average reflectance in the visible range (e.g. photopic average reflectance.

Transmittance in the visible range (with or without combination with absorbing materials or substrates).

Reflected color and color shift with optical angle of incidence.

Transmitted color and color shift with optical angle of incidence.

Article Structure

Referring to FIG. 1, the article 100 according to one or more embodiments may include a substrate 110, and an optical coating 120 disposed on the substrate. The substrate 110 includes opposing major surfaces 112, 114 and opposing minor surfaces 116, 118. The optical coating 120 is shown in FIG. 1 as being disposed on major surface 112; however, the optical coating 120 may be disposed on major surface 114 and/or one or both of the opposing minor surfaces, in addition to or instead of being disposed on major surface 112. The optical coating 120 forms an outer surface 122. Surface 112 may also be referred to herein as a "first major surface," and surface 122 may be referred to herein as a "second major surface."

As illustrated, optical coating 120 includes opposing major surfaces 122, 124 parallel to opposing major surfaces 112, 114, and perpendicular to a thickness direction 126 of optical coating 120.

The thickness of the optical coating 120 may be about 1 μm or greater while still providing an article that exhibits the optical performance described herein. In some examples, the optical coating 120 thickness may be in the range from about 1 μm to about 20 μm (e.g., from about 1 μm to about 10 μm, or from about 1 μm to about 5 μm). Thickness of the thin film elements (e.g., scratch-resistant layer, layers of the optical film, etc.) was measured by scanning electron microscope (SEM) of a cross-section, by transmission electron microscope (TEM), or by optical ellipsometry (e.g., by an n & k analyzer), or by thin film reflectometry. For multiple layer elements (e.g., layers of the optical film stack), thickness measurements by SEM or TEM are preferred. Unless otherwise specified, ellipsometry is used to measure thickness.

Article 100 may also include 1 or more optional layers 170, 180. For example, optional layer 170 may be an adhesion layer, a crack-mitigating layer, and optional layer 180 may be an easy to clean layer. Optional layers 170 and 180 are optional, and need not be included in article 100. While optional layers 170, 180 are omitted from figures other than FIG. 1, they may optionally be present in the embodiments of such other figures.

As used herein, the term "layer" may include a single layer or may include one or more sub-layers. Such sub-layers may be in direct contact with one another. The sub-layers may be formed from the same material or two or more different materials. In one or more alternative embodiments, such sub-layers may have intervening layers of different materials disposed therebetween. In one or more embodiments a layer may include one or more contiguous and uninterrupted layers and/or one or more discontinuous and interrupted layers (i.e., a layer having different materials formed adjacent to one another). A layer or sub-layers may be formed by any known method in the art, including discrete deposition or continuous deposition processes. In one or more embodiments, the layer may be formed using only continuous deposition processes, or, alternatively, only discrete deposition processes.

As used herein, the term "dispose" includes coating, depositing and/or forming a material onto a surface using any known method in the art. The disposed material may constitute a layer, as defined herein. The phrase "disposed on" includes the instance of forming a material onto a surface such that the material is in direct contact with the surface and also includes the instance where the material is formed on a surface, with one or more intervening material(s) is between the disposed material and the surface. The intervening material(s) may constitute a layer, as defined herein.

Figure 2:
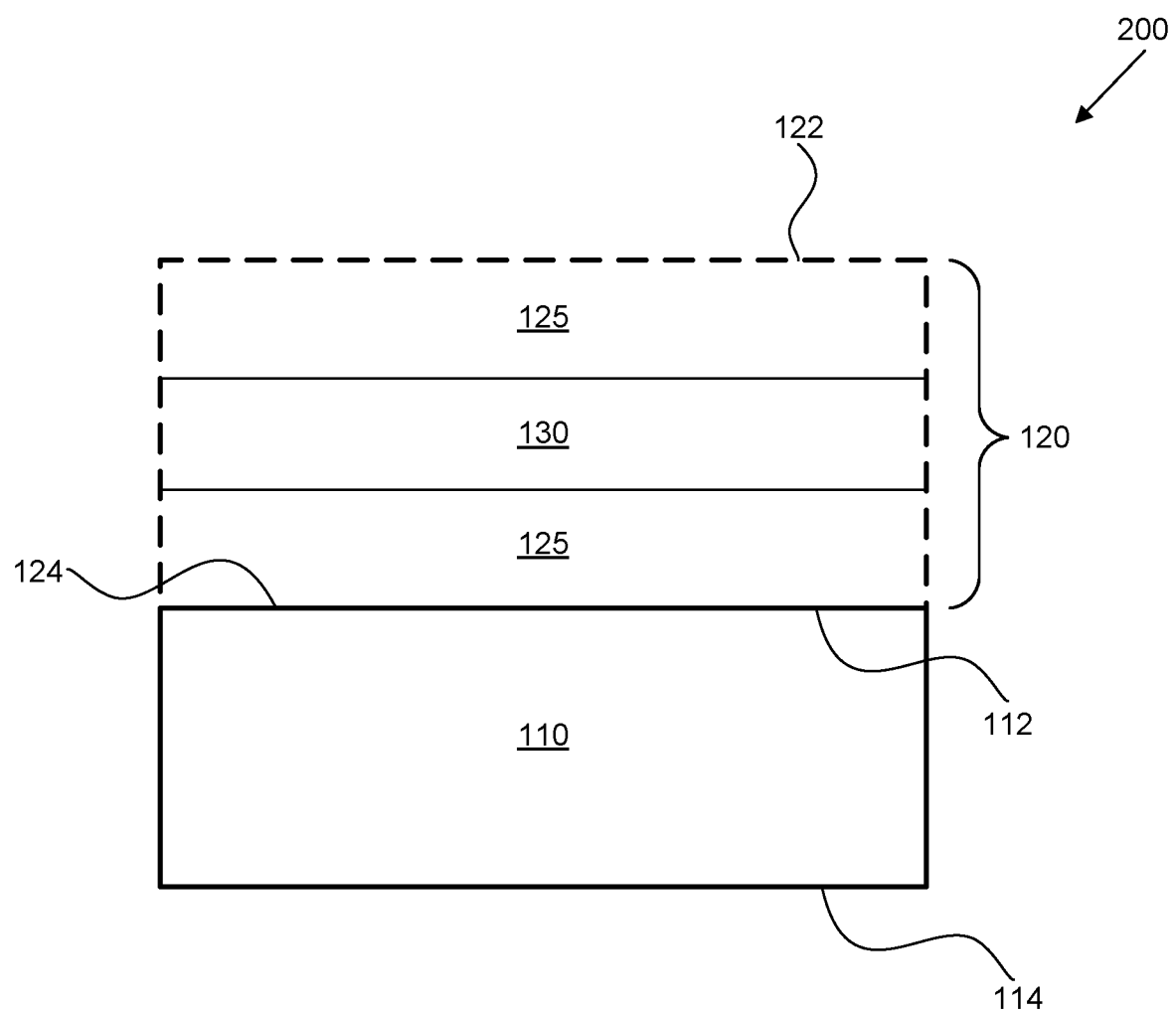
FIG. 2 is a side view of an article, according to one or more embodiments.

As shown in FIG. 2, article 200 includes an optical coating 120 which includes a first gradient portion 130. FIG. 2 illustrates a general embodiment in which optical coating may or may not include additional layers 125. Additional layers 125 may be gradient portions, thick high hardness portions, multi-layer interference stacks, or other optical coating components. There may be more or less additional layers 125 than are illustrated in FIG. 2. First gradient portion 130 may be located anywhere in optical coating 120, including touching one or both of opposing major surfaces 122, 124.

Figure 3:
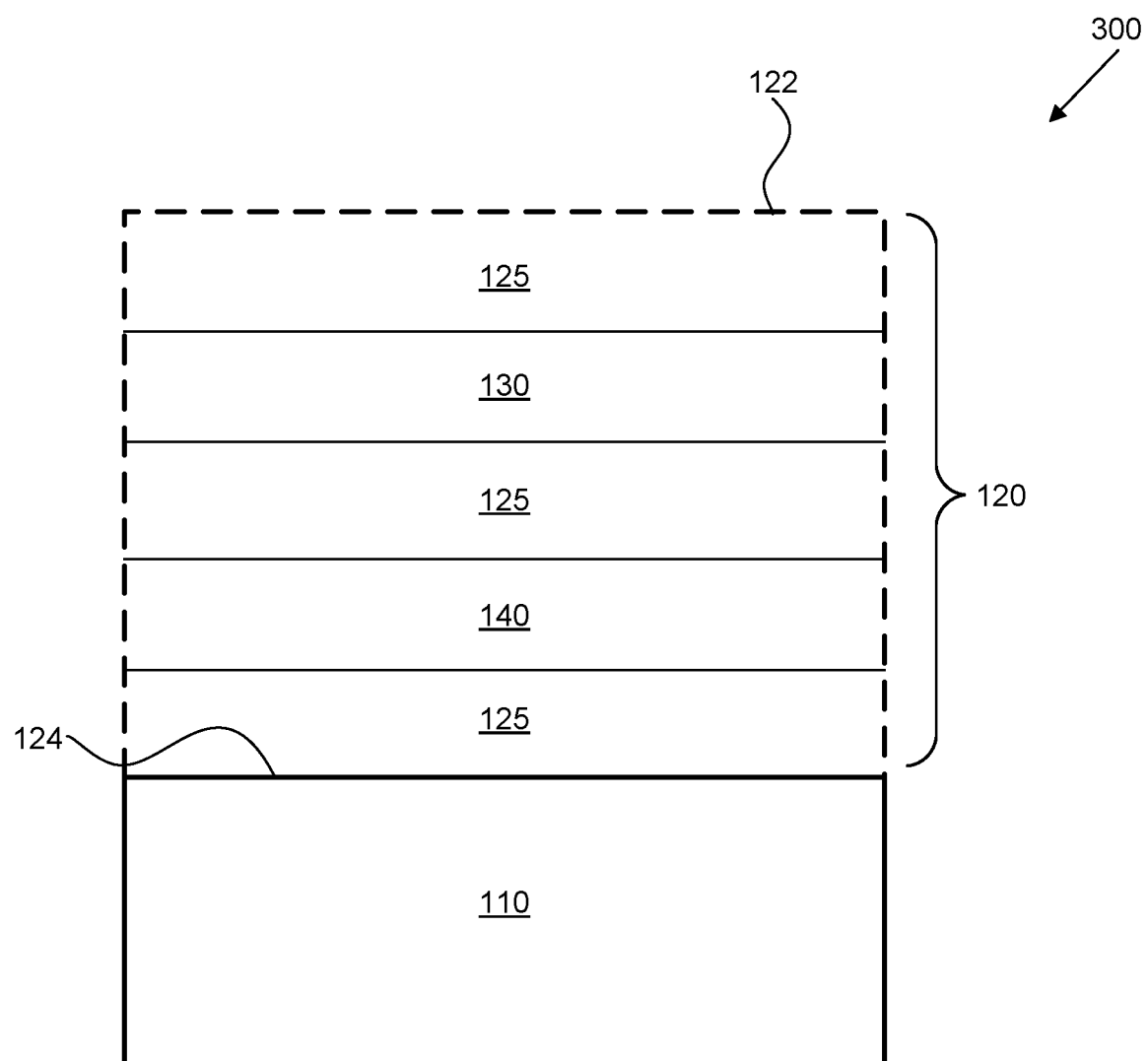
FIG. 3 is a side view of an article, according to one or more embodiments.

As shown in FIG. 3, article 300 includes an optical coating 120 that includes both a first gradient portion 130 and a thick high hardness portion 140. As with FIG. 2, FIG. 3 illustrates additional layers 125 that may or may not be present, and that may be the same type of layers described with respect to additional layers 125 of FIG. 2. Each of first gradient portion 130 and thick high hardness portion 140 may be located anywhere in optical coating 120, including touching one of opposing major surfaces 122, 124.

Figure 4:
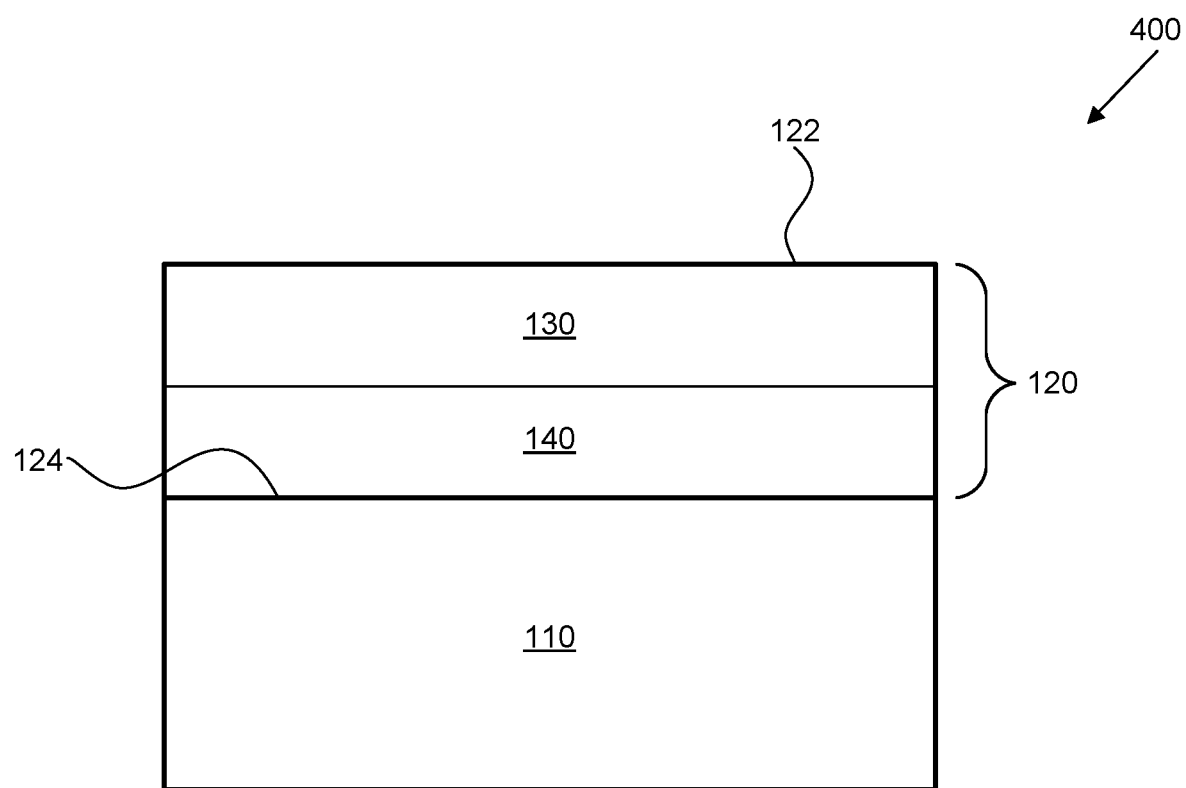
FIG. 4 is a side view of an article, according to one or more embodiments.

FIG. 4 illustrates an article 400, a specific embodiment in which optical coating 120 consists of thick high hardness portion 140 and first gradient portion 130 stacked in that order over substrate 110, without intervening layers, and without any additional layers 125 in optical coating 120.

Figure 5:
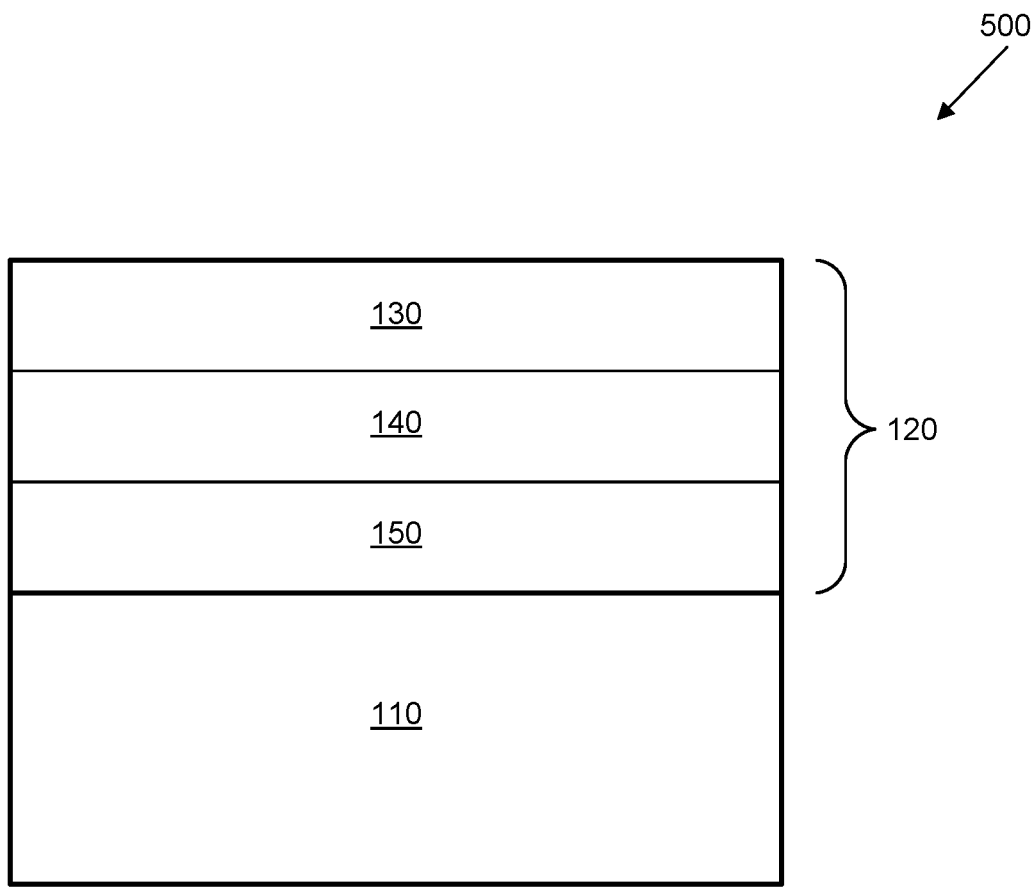
FIG. 5 is a side view of an article, according to one or more embodiments.

FIG. 5 illustrates an article 500, a specific embodiment in which optical coating 120 consists of second gradient portion 150, thick high hardness portion 140 and first gradient portion 130 stacked in that order over substrate 110, without intervening layers, and without any additional layers 125 in optical coating 120. In some embodiments, the structure of FIG. 5 may have a refractive index that monotonically increases along the thickness in a direction moving away from surface 122 toward surface 112. In some embodiments, the refractive index of the second gradient portion monotonically decreases in the same direction. As used herein, "monotonically increases" means that the refractive index goes up or remains the same as a function of distance, but does not decrease. As used herein, "monotonically decreases" means that the refractive index goes down or remains the same as a function of distance, but does not increase. Examples 1-3 each include a gradient portion that is an example of the monotonic functions described in this paragraph.

Multi-Layer Interference Stacks

Figure 6:
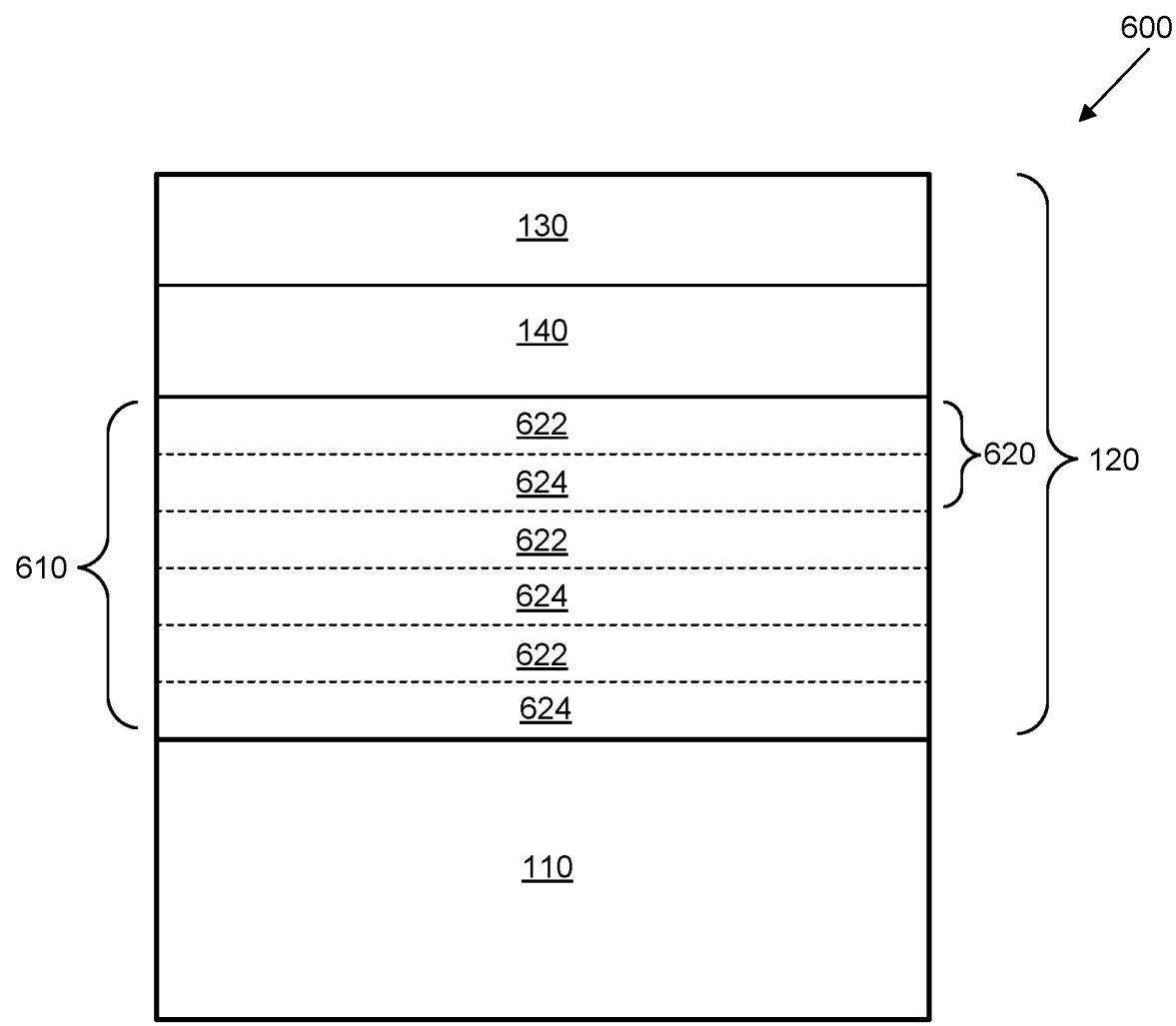
FIG. 6 is a side view of an article, according to one or more embodiments.

In some embodiments, additional layers 125 may comprise one or more multi-layer interference stacks. FIG. 6 illustrates an exemplary article 600 that includes a multi-layer interference stack 610. In the embodiment of FIG. 6, optical coating 120 consists of multi-layer interference stack 610, thick high hardness portion 140 and first gradient portion 130 stacked in that order over substrate 110. In one or more embodiments, the multi-layer interference stack 610 may include a period 620 comprising two or more layers. In one or more embodiments, the two or more layers may be characterized as having different refractive indices from each another. In some embodiments, the period 620 includes a first low RI layer 622 and a second high RI layer 624. The difference in the refractive index of the first low RI layer and the second high RI layer may be about 0.01 or greater, 0.05 or greater, 0.1 or greater or even 0.2 or greater.

As shown in FIG. 6, the multi-layer interference stack 610 may include a plurality of periods 620. A single period includes include a first low RI layer 622 and a second high RI layer 624, such that when a plurality of periods are provided, the first low RI layer 622 (designated for illustration as "L") and the second high RI layer 624 (designated for illustration as "H") alternate in the following sequence of layers: L/H/L/H or H/L/H/L, such that the first low RI layer and the second high RI layer appear to alternate along the physical thickness of the multi-layer interference stack 610. In the example in FIG. 6, the multi-layer interference stack 610 includes three periods. In some embodiments, the multi-layer interference stack 610 may include up to 25 periods. For example, the multi-layer interference stack 610 may include from about 2 to about 20 periods, from about 2 to about 15 periods, from about 2 to about 10 periods, from about 2 to about 12 periods, from about 3 to about 8 periods, from about 3 to about 6 periods.

A multi-layer interference stack may include other layers as well, such as layers having high or low refractive indices different from those of first low RI layer 622 and second high RI layer 624, or layers having a medium index of refraction. As used herein, the terms "low RI", "high RI" and "medium RI" refer to the relative values for the RI to another (e.g., low RI<medium RI<high RI). In one or more embodiments, the term "low RI" when used with the first low RI layer or with the third layer, includes a range from about 1.3 to about 1.6. In one or more embodiments, the term "high RI" when used with the second high RI layer or with the third layer, includes a range from about 1.6 to about 2.5 (e.g., about 1.85 or greater). In some embodiments, the term "medium RI" when used with the third layer, includes a range from about 1.55 to about 1.8. In some instances, the ranges for low RI, high RI and medium RI may overlap; however, in most instances, the layers of a particular multi-layer interference stack 610 have the general relationship regarding RI of: low RI<medium RI<high RI.

Exemplary materials suitable for use in the multi-layer interference stack 610 include: $SiO_2$, $Al_2O_3$, $GeO_2$, SiO, $AlOxNy$, AlN, SiNx, $SiO_xN_y$, $Si_uAl_vO_xN_y$, $Ta_2O_5$, $Nb_2O_5$, $TiO_2$, $ZrO_2$, TiN, MgO, $MgF_2$, $BaF_2$, $CaF_2$, $SnO_2$, $HfO_2$, $Y_2O_3$, $MoO_3$, $DyF_3$, $YbF_3$, $YF_3$, and $CeF_3$, polymers, fluoropolymers, plasma-polymerized polymers, siloxane polymers, silsesquioxanes, polyimides, fluorinated polyimides, polyetherimide, polyethersulfone, polyphenylsulfone, polycarbonate, polyethylene terephthalate, polyethylene naphthalate, acrylic polymers, urethane polymers, polymethylmethacrylate, other materials cited below as suitable for use in a scratch-resistant layer, and other materials known in the art. Some examples of suitable materials for use in the first low RI layer include $SiO_2$, $Al_2O_3$, $GeO_2$, SiO, $AlO_xN_y$, $SiO_xN_y$, $Si_uAl_vO_xN_y$, MgO, $MgAl_2O_4$, $MgF_2$, $BaF_2$, $CaF_2$, $DyF_3$, $YbF_3$, $YF_3$, and $CeF_3$. The nitrogen content of the materials for use in the first low RI layer may be minimized (e.g., in materials such as $Al_2O_3$ and $MgAl_2O_4$, or for example, the SiOxNy used to form a low-index material will typically have a lower nitrogen content than an SiOxNy used to form a high-index material). Some examples of suitable materials for use in the second high RI layer include $Si_uAl_vO_xN_y$, $Ta_2O_5$, $Nb_2O_5$, AlN, $Si_3N_4$, $AlO_xN_y$, $SiO_xN_y$, $HfO_2$, $TiO_2$, $ZrO_2$, $Y_2O_3$, $Al_2O_3$, $MoO_3$ and diamond-like carbon. The oxygen content of the materials for the second high RI layer and/or the scratch-resistant layer may be minimized, especially in SiNx or AlNx materials. $AlO_xN_y$ materials may be considered to be oxygen-doped AlNx, that is they may have an AlNx crystal structure (e.g. wurtzite) and need not have an AlON crystal structure. Exemplary preferred $AlO_xN_y$ high RI materials may comprise from about 0 atom % to about 20 atom % oxygen, or from about 5 atom % to about 15 atom % oxygen, while including 30 atom % to about 50 atom % nitrogen. Exemplary preferred $Si_uAl_vO_xN_y$ high RI materials may comprise from about 10 atom % to about 30 atom % or from about 15 atom % to about 25 atom % silicon, from about 20 atom % to about 40 atom % or from about 25 atom % to about 35 atom % aluminum, from about 0 atom % to about 20 atom % or from about 1 atom % to about 20 atom % oxygen, and from about 30 atom % to about 50 atom % nitrogen. Exemplary preferred $SiO_xN_y$ high RI materials may comprise from about 30 atom % to about 60 atom % or from about 40 atom % to about 50 atom % silicon, from about 0 atom % to about 25 atom % or from about 1 atom % to about 25 atom % or from about 6 atom % to about 18 atom % oxygen, and from about 30 atom % to about 60 atom % nitrogen. Exemplary preferred $SiN_x$ high RI materials may comprise from about 30 atom % to about 60 atom % or from about 40 atom % to about 50 atom % silicon, and from about 30 atom % to about 70 atom % nitrogen. The foregoing materials may be hydrogenated up to about 30% by weight. The hardness of the second high RI layer and/or the scratch-resistant layer may be characterized specifically. In some embodiments, the maximum hardness of the second high RI layer and/or the scratch-resistant layer, as measured by the Berkovich Indenter Hardness Test, may be about 10 GPa or greater, about 12 GPa or greater, about 15 GPa or greater, about 18 GPa or greater, or about 20 GPa or greater. In some cases, the second high RI layer material may be deposited as a single layer and may be characterized as a scratch resistant layer, and this single layer may have a thickness from about 500 nm to about 2000 nm for repeatable hardness determination.

The physical thickness of a multi-layer interference stack 610 may be in the range from about 100 nm to 1000 nm. In some instances, the physical thickness of the multi-layer interference stack 610 may 100 nm, 200 nm, 300 nm, 400 nm, 500 nm, 600 nm, 700 nm, 800 nm, 900 nm, 1000 nm, and all ranges and sub-ranges therebetween. In some embodiments, a multi-level interference stack 610 positioned between a substrate 110 and a thick high hardness portion, as illustrated in FIG. 6, for example, preferably has a thickness of 100 to 500 nm. In some embodiments, a multi-level interference stack positioned above substrate 110 preferably has a thickness of 100 to 1000 nm.

In some embodiments, any multi-layer interference stack 610 present in optical coating 120 is positioned beneath a thick high hardness portion 140, i.e., between thick high hardness portion 140 and substrate 110. Without being bound by theory, the thick high RI layer having a high hardness effectively shields the layers underneath (or between the thick RI layer and the substrate), such that the effect of mechanical weakness caused by abrupt interfaces in multi-layer interference stack 610 on the properties of article 600 are reduced.

Positioning and Thickness of Soft Material

In some embodiments, the thickness of any soft material in optical coating 120 may be minimized and/or positioned in certain ways.

In embodiments it may be useful to quantify the amount or thickness of low-refractive-index (also called low-index) material in the coating design. Low-index materials (generally defined as having refractive index below about 1.6) are typically also lower-hardness materials. Without being bound by theory, the low RI material is typically also a lower-hardness material, owing to the nature of atomic bonding and electron densities that simultaneously affect refractive index and hardness. Thus it is desirable to minimize the amount of low-index material in the coating design, but some amount of low-index material is typically desired to efficiently tailor reflection and color targets. The thickness and the fraction of low-index material (which in embodiments is understood to be a lower-hardness material) is denoted in the design descriptions in terms of absolute thickness and fraction of total coating thickness. It can be useful to quantify both the total amount of low-index material in the entire coating, as well as the amount of low-index material that is above the thickest high-hardness layer in the coating design. The thickest high-hardness layer in the coating design protects the layers underneath it from scratch and damage, meaning that the low-index layers above the thickest high-hardness layer are most susceptible to scratch and other types of damage. As noted above, the thickest high-hardness layer need not be a single monolithic material, but can form a superlattice or other layered structure including multiple layers or material, provided that the thick high-hardness layer forms or monolithic or 'composite' region with a maximum hardness that is higher than the maximum hardness of the entire coating stack.

In some embodiments, the total thickness of "soft" material (e.g. SiO2 or mixed materials having a refractive index below about 1.6) above a thick high hardness portion is preferably limited to less than about 200 nm, less than about 150 nm, less than 120 nm, or even less than 100 nm. Such minimization of soft material above a thick hard layer may result in a high article hardness and high scratch resistance. The article hardness may be greater than 10 GPa, greater than 12 GPa, greater than 14 GPa, or greater than 16 GPa at indentation depths from 100 to 500 nm, as measured using a Berkovich nanoindentation test.

In some embodiments, the amount of low RI material in the optical coating may be minimized. Expressed as a fraction of physical thickness of the optical coating 120, the low RI material may comprise less than about 60%, less than about 50%, less than about 40%, less than about 30%, less than about 20%, less than about 10%, or less than about 5% of the physical thickness of the optical coating. The low RI material may comprise more than zero % or more than 1% of the physical thickness of the optical coating. Alternately or additionally, the amount of low RI material may be quantified as the sum of the physical thicknesses of all low RI material disposed above the thickest high RI layer in the optical coating (i.e. on the side opposite the substrate, the user side or the air side). Without being bound by theory, the thick high RI layer having a high hardness effectively shields the layers underneath (or between the thick RI layer and the substrate) from many or most scratches. Accordingly, the layers disposed above the thickest high RI layer may have an outsized effect on scratch resistance of the overall article. This is especially relevant when the thickest high RI layer has a physical thickness that is greater than about 400 nm and has a maximum hardness greater than about 12 GPa as measured by the Berkovich Indenter Hardness Test. The amount of low RI material disposed on the thickest high RI layer (i.e. on the side opposite the substrate, the user side or the air side) may have a thickness less than or equal to about 300 nm, less than or equal to about 200 nm, less than or equal to about 150 nm, less than or equal to about 120 nm, less than or equal to about 110 nm, 100 nm, 90 nm, 80 nm, 70 nm, 60 nm, 50 nm, 40 nm, 30 nm, 25 nm, 20 nm, 15 nm, or less than or equal to about 12 nm. The amount of low RI material disposed on the thickest high RI layer (i.e. on the side opposite the substrate, the user side or the air side) may have a thickness greater than or equal to about 0 nm or 1 nm.

Optional Layers

Some embodiments, may include optional layers, such as optional layers 170 and 180. The top-most air-side layer, such as optional layer 180, may comprise a low-friction coating, an oleophobic coating, or an easy-to-clean coating. Exemplary low-friction layers may include a silane, a fluorosilane, or diamond-like carbon, such materials (or one or more layers of the optical coating) may exhibit a coefficient of friction less than 0.4, less than 0.3, less than 0.2, or even less than 0.1.

In one or more embodiments, optional layer 180 may include an easy-to-clean coating. An example of a suitable an easy-to-clean coating is described in U.S. patent application Ser. No. 13/690,904, entitled "PROCESS FOR MAKING OF GLASS ARTICLES WITH OPTICAL AND EASY-TO-CLEAN COATINGS," filed on Nov. 30, 2012, published as US20140113083A1, which is incorporated herein in its entirety by reference. The easy-to-clean coating may have a thickness in the range from about 5 nm to about 50 nm and may include known materials such as fluorinated silanes. In some embodiments, the easy-to-clean coating may have a thickness in the range from about 1 nm to about 40 nm, from about 1 nm to about 30 nm, from about 1 nm to about 25 nm, from about 1 nm to about 20 nm, from about 1 nm to about 15 nm, from about 1 nm to about 10 nm, from about 5 nm to about 50 nm, from about 10 nm to about 50 nm, from about 15 nm to about 50 nm, from about 7 nm to about 20 nm, from about 7 nm to about 15 nm, from about 7 nm to about 12 nm or from about 7 nm to about 10 nm, and all ranges and sub-ranges therebetween.

Measuring Hardness

Hardness and Young's modulus values of thin film coatings and articles as described herein are determined using widely accepted nanoindentation practices. See: Fischer-Cripps, A. C., Critical Review of Analysis and Interpretation of Nanoindentation Test Data, Surface & Coatings Technology, 200, 4153-4165 (2006) (hereinafter "Fischer-Cripps"); and Hay, J., Agee, P, and Herbert, E., Continuous Stiffness measurement During Instrumented Indentation Testing, Experimental Techniques, 34 (3) 86-94 (2010) (hereinafter "Hay"). For coatings, it is typical to measure hardness and modulus as a function of indentation depth. So long as the coating is of sufficient thickness, it is then possible to isolate the properties of the coating from the resulting response profiles. It should be recognized that if the coatings are too thin (for example, less than ~500 nm), it may not be possible to completely isolate the coating properties as they can be influenced from the proximity of the substrate which may have different mechanical properties. See Hay. The methods used to report the properties herein are representative of the coatings themselves. The process is to measure hardness and modulus versus indentation depth out to depths approaching 1000 nm. In the case of hard coatings on a softer glass, the response curves will reveal maximum levels of hardness and modulus at relatively small indentation depths (less than or equal to about 200 nm). At deeper indentation depths both hardness and modulus will gradual diminish as the response is influenced by the softer glass substrate. In this case the coating hardness and modulus are taken be those associated with the regions exhibiting the maximum hardness and modulus. In the case of soft coatings on a harder glass substrate, the coating properties will be indicated by lowest hardness and modulus levels that occur at relatively small indentation depths. At deeper indentation depths, the hardness and modulus will gradually increase due to the influence of the harder glass. These profiles of hardness and modulus versus depth can be obtained using either the traditional Oliver and Pharr approach (as described in Fischer-Cripps) or by the more efficient continuous stiffness approach (see Hay). The elastic modulus and hardness values reported herein for such thin films were measured using nanoindentation methods, as described above, with a Berkovich diamond indenter tip.

The optical coating 120 and the article 100 may be described in terms of a hardness measured by a Berkovich Indenter Hardness Test. As used herein, the "Berkovich Indenter Hardness Test" includes measuring the hardness of a material on a surface thereof by indenting the surface with a diamond Berkovich indenter. The Berkovich Indenter Hardness Test includes indenting major surface 122 of the article or the surface of the optical coating 120 (or the surface of any one or more of the layers in the multi-layer interference stack) with the diamond Berkovich indenter to form an indent to an indentation depth in the range from about 50 nm to about 1000 nm (or the entire thickness of the multi-layer interference stack or layer, whichever is less) and measuring the maximum hardness from this indentation along the entire indentation depth range or a segment of this indentation depth (e.g., in the range from about 100 nm to about 600 nm), generally using the methods set forth in Oliver, W. C.; Pharr, G. M. An improved technique for determining hardness and elastic modulus using load and displacement sensing indentation experiments. *J. Mater. Res.*, Vol. 7, No. 6, 1992, 1564-1583; and Oliver, W. C.; Pharr, G. M. Measurement of Hardness and Elastic Modulus by Instrument Indentation: Advances in Understanding and Refinements to Methodology. *J. Mater. Res.*, Vol. 19, No. 1, 2004, 3-20. As used herein, hardness refers to a maximum hardness, and not an average hardness. Unless otherwise specified, hardness values provided herein refer to values measured by the Berkovich Indenter Hardness Test.

Typically, in nanoindentation measurement methods (such as by using a Berkovich indenter) of a coating that is harder than the underlying substrate, the measured hardness may appear to increase initially due to development of the plastic zone at shallow indentation depths and then increases and reaches a maximum value or plateau at deeper indentation depths. Thereafter, hardness begins to decrease at even deeper indentation depths due to the effect of the underlying substrate. Where a substrate having an increased hardness compared to the coating is utilized, the same effect can be seen; however, the hardness increases at deeper indentation depths due to the effect of the underlying substrate.

The indentation depth range and the hardness values at certain indentation depth range(s) can be selected to identify a particular hardness response of the optical film structures and layers thereof, described herein, without the effect of the underlying substrate. When measuring hardness of the optical film structure (when disposed on a substrate) with a Berkovich indenter, the region of permanent deformation (plastic zone) of a material is associated with the hardness of the material. During indentation, an elastic stress field extends well beyond this region of permanent deformation. As indentation depth increases, the apparent hardness and modulus are influenced by stress field interactions with the underlying substrate. The substrate influence on hardness occurs at deeper indentation depths (i.e., typically at depths greater than about 10% of the optical film structure or layer thickness). Moreover, a further complication is that the hardness response requires a certain minimum load to develop full plasticity during the indentation process. Prior to that certain minimum load, the hardness shows a generally increasing trend.

At small indentation depths (which also may be characterized as small loads) (e.g., up to about 50 nm), the apparent hardness of a material appears to increase dramatically versus indentation depth. This small indentation depth regime does not represent a true metric of hardness but instead, reflects the development of the aforementioned plastic zone, which is related to the finite radius of curvature of the indenter. At intermediate indentation depths, the apparent hardness approaches maximum levels. At deeper indentation depths, the influence of the substrate becomes more pronounced as the indentation depths increase. Hardness may begin to drop dramatically once the indentation depth exceeds about 30% of the optical film structure thickness or the layer thickness.

In some embodiments, the optical coating 120 may exhibit a hardness of about 10 GPa or greater, or about 11 GPa or greater, or about 12 GPa or greater (e.g., 14 GPa or greater, 16 GPa or greater, 18 GPa or greater, 20 GPa or greater). The hardness of the optical coating 120 may be up to about 20 GPa, 30 GPa, or 50 GPa. The article 100, including the optical coating 120 and any additional coatings, as described herein, exhibit a hardness of about 10 GPa or greater, or 11 GPa or greater, or about 12 GPa or greater (e.g., 14 GPa or greater, 16 GPa or greater, 18 GPa or greater, 20 GPa or greater), and about 50 GPa or less, for example about 40 GPa or less, or about 30 GPa or less, as measured on the outer surface 22, by a Berkovich Indenter Hardness Test. The hardness of the optical coating 120 may be up to about 20 GPa, 30 GPa, or 50 GPa. Such measured hardness values may be exhibited by the optical coating 120 and/or the article 100 along an indentation depth of about 50 nm or greater or about 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm). In one or more embodiments, the article exhibits a hardness that is greater than the hardness of the substrate (which can be measured on the opposite surface from the outer surface).

The optical coating 120 may have at least one layer having a hardness (as measured on the surface of such layer, e.g., surface of thick high hardness portion 140, of about 12 GPa or greater, about 13 GPa or greater, about 14 GPa or greater, about 15 GPa or greater, about 16 GPa or greater, about 17 GPa or greater, about 18 GPa or greater, about 19 GPa or greater, about 20 GPa or greater, about 22 GPa or greater, about 23 GPa or greater, about 24 GPa or greater, about 25 GPa or greater, about 26 GPa or greater, or about 27 GPa or greater (up to about 50 GPa), as measured by the Berkovich Indenter Hardness Test. The hardness of such layer may be in the range from about 18 GPa to about 21 GPa, as measured by the Berkovich Indenter Hardness Test. Such measured hardness values may be exhibited by the at least one layer along an indentation depth of about 50 nm or greater or 100 nm or greater (e.g., from about 100 nm to about 300 nm, from about 100 nm to about 400 nm, from about 100 nm to about 500 nm, from about 100 nm to about 600 nm, from about 200 nm to about 300 nm, from about 200 nm to about 400 nm, from about 200 nm to about 500 nm, or from about 200 nm to about 600 nm).

In one or more embodiments, the optical coating 120 or individual layers within the optical coating may exhibit an elastic modulus of about 75 GPa or greater, about 80 GPa or greater or about 85 GPa or greater, as measured on the outer surface 122, by indenting that surface with a Berkovitch indenter. The optical coating 120 or individual layers within the optical coating may exhibit an elastic modulus of about 500 GPa or less. These modulus values may represent a modulus measured very close to the outer surface, e.g. at indentation depths of 0 nm to about 50 nm, or it may represent a modulus measured at deeper indentation depths, e.g. from about 50 nm to about 1000 nm.

In some embodiments, the article comprises a maximum hardness in the ranges described herein for the optical coating. For example, in some embodiments, the article comprises a maximum hardness in the range from about 12 GPa to about 30 Gpa, or about 16 Gpa to about 30 Gpa, wherein maximum hardness is measured on the second major surface by indenting the second major surface with a Berkovich indenter to form an indent comprising an indentation depth of about 100 nm or more from the surface of the second major surface.

Chemical Nomenclature

As used herein, the "$AlO_xN_y$," "$SiO_xN_y$," and "$Si_uAl_xO_yN_z$" materials in the disclosure include various aluminum oxynitride, silicon oxynitride and silicon aluminum oxynitride materials, as understood by those with ordinary skill in the field of the disclosure, described according to certain numerical values and ranges for the subscripts, "u," "x," "y," and "z". That is, it is common to describe solids with "whole number formula" descriptions, such as $Al_2O_3$. It is also common to describe solids using an equivalent "atomic fraction formula" description such as $Al_{0.4}O_{0.6}$, which is equivalent to $Al_2O_3$. In the atomic fraction formula, the sum of all atoms in the formula is 0.4+0.6=1, and the atomic fractions of Al and O in the formula are 0.4 and 0.6 respectively. Atomic fraction descriptions are described in many general textbooks and atomic fraction descriptions are often used to describe alloys. See, for example: (i) Charles Kittel, Introduction to Solid State Physics, seventh edition, John Wiley & Sons, Inc., NY, 1996, pp. 611-627; (ii) Smart and Moore, Solid State Chemistry, An introduction, Chapman & Hall University and Professional Division, London, 1992, pp. 136-151; and (iii) James F. Shackelford, Introduction to Materials Science for Engineers, Sixth Edition, Pearson Prentice Hall, New Jersey, 2005, pp. 404-418.

Again referring to the "$AlO_xN_y$," "$SiO_xN_y$," and "$Si_uAl_xO_yN_z$" materials in the disclosure, the subscripts allow those with ordinary skill in the art to reference these materials as a class of materials without specifying particular subscript values. To speak generally about an alloy, such as aluminum oxide, without specifying the particular subscript values, we can speak of $Al_vO_x$. The description $Al_vO_x$ can represent either $Al_2O_3$ or $Al_{0.4}O_{0.6}$. If v+x were chosen to sum to 1 (i.e. v+x=1), then the formula would be an atomic fraction description. Similarly, more complicated mixtures can be described, such as $Si_uAl_vO_xN_y$, where again, if the sum u+v+x+y were equal to 1, we would have the atomic fractions description case.

Once again referring to the "$AlO_xN_y$," "$SiO_xN_y$," and "$Si_uAl_xO_yN_z$" materials in the disclosure, these notations allow those with ordinary skill in the art to readily make comparisons to these materials and others. That is, atomic fraction formulas are sometimes easier to use in comparisons. For instance; an example alloy consisting of $(Al_2O_3)_{0.3}(AlN)_{0.7}$ is closely equivalent to the formula descriptions $Al_{0.448}O_{0.31}N_{0.241}$ and also $Al_{367}O_{254}N_{198}$. Another example alloy consisting of $(Al_2O_3)_{0.4}(AlN)_{0.6}$ is closely equivalent to the formula descriptions $Al_{0.438}O_{0.375}N_{0.188}$ and $Al_{37}O_{32}N_{16}$. The atomic fraction formulas $Al_{0.448}O_{0.31}N_{0.241}$ and $Al_{0.438}O_{0.375}N_{0.188}$ are relatively easy to compare to one another. For instance, Al decreased in atomic fraction by 0.01, O increased in atomic fraction by 0.065 and N decreased in atomic fraction by 0.053. It takes more detailed calculation and consideration to compare the whole number formula descriptions $Al_{367}O_{254}N_{198}$ and $Al_{37}O_{32}N_{16}$. Therefore, it is sometimes preferable to use atomic fraction formula descriptions of solids. Nonetheless, the use of $Al_vO_xN_y$ is general since it captures any alloy containing Al, O and N atoms.

As understood by those with ordinary skill in the field of the disclosure with regard to any of the foregoing materials (e.g., AlN) for the optical film 120, each of the subscripts, "u," "x," "y," and "z," can vary from 0 to 1, the sum of the subscripts will be less than or equal to one, and the balance of the composition is the first element in the material (e.g., Si or Al). In addition, those with ordinary skill in the field can recognize that "$Si_uAl_xO_yN_z$" can be configured such that "u" equals zero and the material can be described as "$AlO_xN_y$". Still further, the foregoing compositions for the optical film 120 exclude a combination of subscripts that would result in a pure elemental form (e.g., pure silicon, pure aluminum metal, oxygen gas, etc.). Finally, those with ordinary skill in the art will also recognize that the foregoing compositions may include other elements not expressly denoted (e.g., hydrogen), which can result in non-stoichiometric compositions (e.g., $SiN_x$ vs. $Si_3N_4$). Accordingly, the foregoing materials for the optical film can be indicative of the available space within a $SiO_2$—$Al_2O_3$—$SiN_x$—AlN or a $SiO_2$—$Al_2O_3$—$Si_3N_4$—AlN phase diagram, depending on the values of the subscripts in the foregoing composition representations.

Colors and Color Shift with Angle

In some cases the optical coating may be designed to have a relatively neutral (grey or silver) color and a relatively small change in color with angle of light incidence.

Specifically, the hardcoated articles may exhibit a single-surface reflected color range for all viewing angles from 0 to 60 degrees that comprises all a* and all b* points having absolute values of 20 or less, 10 or less, 8 or less, 5 or less, 4 or less, 3 or less, or even 2 or less across all viewing angles.

Further, the hardcoated articles may have a two-surface transmitted color range for all viewing angles from 0 to 90 degrees that comprises all a* and all b* points having absolute values of 2 or less, 1 or less, 0.5 or less, 0.4 or less, 0.3 or less, or even 0.2 or less across all viewing angles.

In alternate cases, the coating may be designed to have a relatively high color (e.g. blue, purple, red, green, gold, orange, and combinations thereof), to maintain a certain color over a range of viewing angles, or to shift color within controlled color quadrants with changing viewing angles.

In the case of high-color coatings, the coatings may have an a* or b* value above 20 for at least one viewing angle or a range of viewing angles. In combination, the color may be constrained to remain substantially within one, two, or three color quadrants on an a*, b* color chart over the range of viewing angles from zero to 60 or from zero to 90 degrees. Different colors generated by these hardcoatings may span the entire color palette from red, orange, gold (yellow), green, blue, to purple. In some cases the colors may shift with angle across multiple colors. In other cases the color will be bounded in a certain range in a* and b* with angle of incidence. A "high color" coating, may still preferably have a restriction on its color with viewing angle in some embodiments. For example, a 'green' coating may have a* less than 5 or less than 1 for all viewing angles from 0 to 90 degrees. A 'blue' or 'blue-green' coating may have b* less than 5 or less than 1 for all viewing angles from 0 to 90 degrees. A 'red' or 'orange' or 'purple' coating may have a* greater than −5 or greater than −1 for all viewing angles from 0 to 90 degrees. A 'gold' coating may have b* greater than −5 or greater than −1 for all viewing angles from 0 to 90 degrees. These constraints can be combined with one another to create a designed color in a high-color coating, for example a "blue-green" coating may combine the constraints of b* less than 5 and a* less than 5 for all viewing angles. A "red-gold" coating may combine the constraints of b* greater than −5 and a* greater than −5 for all viewing angles.

Even where a specific range of viewing angles is described, in some embodiments, the ranges for a* and b* described herein may be for different ranges of viewing angles, such as 0 to 10 degrees, 0 to 60 degrees, or 0 to 90 degrees. Other color combinations and constraints are possible.

The reflectance and color values described above are most suited for certain applications, for example the surface of sunglass lenses facing away from a user, scratch-resistant mirrors, or protective covers through which a display is not viewed, e.g., the housing of an electronic device (smartwatches, smartphones, automotive displays, etc.) having high scratch resistance and specified reflectance.

Optical interference between reflected waves from the optical coating 120/air interface and the optical coating 120/substrate 110 interface can lead to spectral reflectance and/or transmittance oscillations that create apparent color in the article 100. The color may be more pronounced in reflection. The angular color shifts in reflection with viewing angle due to a shift in the spectral reflectance oscillations with incident illumination angle. Angular color shifts in transmittance with viewing angle are also due to the same shift in the spectral transmittance oscillation with incident illumination angle. The observed color and angular color shifts with incident illumination angle are often distracting or objectionable to device users, particularly under illumination with sharp spectral features such as fluorescent lighting and some LED lighting. Angular color shifts in transmission may also play a factor in color shift in reflection and vice versa. Factors in angular color shifts in transmission and/or reflection may also include angular color shifts due to viewing angle or angular color shifts away from a certain white point that may be caused by material absorption (somewhat independent of angle) defined by a particular illuminant or test system.

As used herein, a "near normal" incidence angle means an incidence angle that is 10 degrees or less from normal incidence. "Near normal" includes normal. When a transmission or reflection criteria is described as occurring at a "near normal" angle, the criteria is met if the specified transmission or reflection criteria occurs at any near normal angle. In many cases, optical properties such as reflectance, transmission and color shift due to a multi-layer interference stack do not vary much as a function of angle at near normal angles. So, "near normal" incidence and "normal" incidence are, for practical purposes, the same. In addition, some measurement techniques do not work well at exactly normal incident angles, so properties at normal incident angles are often estimated based on measurements at near normal angles. All occurrences of "normal" incidence herein should be read as including "near normal."

The oscillations may be described in terms of amplitude. As used herein, the term "amplitude" includes the peak-to-valley change in reflectance or transmittance. The phrase "average amplitude" includes the peak-to-valley change in reflectance or transmittance averaged over several oscillation cycles or wavelength sub-ranges within the optical wavelength regime. As used herein, unless otherwise specified, the "optical wavelength regime" includes the wavelength range from about 400 nm to about 700 nm (and more specifically from about 450 nm to about 650 nm). In some embodiments, the article exhibits an average transmittance or average reflectance comprising an average oscillation amplitude of 10 percentage points or less, 8 percentage points or less, 6 percentage points or less, 4 percentage points or less, 2 percentage points or less, or 1 percentage point or less, over the optical wavelength regime.

One aspect of this disclosure pertains to an article that exhibits color or colorlessness properties in reflectance and/or transmittance even when viewed at different incident illumination angles under an illuminant. As used herein, the phrase "color shift" (angular or reference point) refers to the change in both a* and b*, under the CIE L*, a*, b* colorimetry system in reflectance and/or transmittance. This color shift is commonly referred to as C*, and is not affected by any changes in L*. For example, angular color shift C* may be determined using the following Equation (1):

$$\sqrt{((a^*_2-a^*_1)^2+(b^*_2-b^*_1)^2)},$$

with $a^*_1$, and $b^*_1$ representing the a* and b* coordinates of the article when viewed at incidence reference illumination angle (which may include normal incidence) and $a^*_2$, and $b^*_2$ representing the a* and b* coordinates of the article when viewed at an incident illumination angle, provided that the incident illumination angle is different from the reference illumination angle and in some cases differs from the reference illumination angle by about 1 degree or more, for example, about 2 degrees or about 5 degrees. In some instances, a specified angular color shift in reflectance and/or transmittance is exhibited by the article when viewed at various incident illumination angles from a reference illumination angle, under an illuminant. The illuminant can include standard illuminants as determined by the CIE, including A illuminants (representing tungsten-filament lighting), B illuminants (daylight simulating illuminants), C illuminants (daylight simulating illuminants), D series illuminants (representing natural daylight), and F series illuminants (representing various types of fluorescent lighting). Unless otherwise specified, color and color shift are exhibited under a D65 illuminant.

The reference illumination angle may include normal incidence (i.e., from about 0 degrees to about 10 degrees), or 5 degrees from normal incidence, 10 degrees from normal incidence, 15 degrees from normal incidence, 20 degrees from normal incidence, 25 degrees from normal incidence, 30 degrees from normal incidence, 35 degrees from normal incidence, 40 degrees from normal incidence, 45 degrees from normal incidence, 50 degrees from normal incidence, 55 degrees from normal incidence, or 60 degrees from normal incidence, provided the difference between the incident illumination angle and the reference illumination angle is about 1 degree or more, for example, about 2 degrees or about 5 degrees. The incident illumination angle may be, with respect to the reference illumination angle, in the range from about 5 degrees to about 80 degrees, from about 5 degrees to about 70 degrees, from about 5 degrees to about 65 degrees, from about 5 degrees to about 60 degrees, from about 5 degrees to about 55 degrees, from about 5 degrees to about 50 degrees, from about 5 degrees to about 45 degrees, from about 5 degrees to about 40 degrees, from about 5 degrees to about 35 degrees, from about 5 degrees to about 30 degrees, from about 5 degrees to about 25 degrees, from about 5 degrees to about 20 degrees, from about 5 degrees to about 15 degrees, and all ranges and sub-ranges therebetween, away from the reference illumination angle. The article may exhibit the angular color shifts in reflectance and/or transmittance described herein at and along all the incident illumination angles in the range from about 0 degrees to about 60 degrees, or about 0 degrees to about 90 degrees.

In some embodiments, the angular color shift may be measured at all angles between a reference illumination angle (e.g., normal incidence) and an incident illumination angle in the range from 0 degrees to about 60 degrees, or about 0 degrees to about 90 degrees.

In one or more embodiments, the reference point for measuring color shift may be the origin (0, 0) in the CIE L*, a*, b* colorimetry system (or the color coordinates a*=0, b*=0), or the transmittance or reflectance color coordinates of the substrate. Unless otherwise specified, the reference point is the color coordinates a*=0, b*=0. It should be understood that unless otherwise noted, the L* coordinate of the articles described herein does not affect color shift calculated as described herein. Where the reference point color shift of the article is defined with respect to the substrate, the transmittance color coordinates of the article are compared to the transmittance color coordinates of the substrate and the reflectance color coordinates of the article are compared to the reflectance color coordinates of the substrate.

Where the reference point is the color coordinates a*=0, b*=0, the reference point color shift is calculated by Equation (2).

reference point color shift=$\sqrt{((a^*_{article})^2 (b^*_{article})^2)}$

Where the reference point is the color coordinates of the substrate, the reference point color shift is calculated by Equation (4).

reference point color shift=$\sqrt{((a^*_{article}-a^*_{substrate})^2+(b^*_{article}-b^*_{substrate})^2)}$ In some embodiments, the article may exhibit a transmittance color (or transmittance color coordinates) and a reflectance color (or reflectance color coordinates) such that the reference point color shift is as specified when the reference point is any one of the color coordinates of the substrate, and the color coordinates a*=0, b*=0.

In some embodiments, the article exhibits a specified a* value in transmittance (at the outer surface and the opposite bare surface) at incident illumination angles in the range from about 0 degrees to about 60 degrees under illuminants D65, A, and F2. In some embodiments, the article exhibits a specified b* value in transmittance (at the outer surface and the opposite bare surface) at incident illumination angles in the range from about 0 degrees to about 60 degrees under illuminants D65, A, and F2.

In some embodiments, the article exhibits a specified a* value in reflectance (at only the outer surface) at incident illumination angles in the range from about 0 degrees to about 60 degrees under illuminants D65, A, and F2. In some embodiments, the article exhibits a specified b* value in reflectance (at only the outer surface) at incident illumination angles in the range from about 0 degrees to about 60 degrees under illuminants D65, A, and F2.

A maximum reflectance color shift values represent the lowest color point value measured in a specified range of angles, subtracted from the highest color point value measured at any angle in the same range. The values may represent a maximum change in a* value ($a^*_{highest}-a^*_{lowest}$), a maximum change in b* value ($b^*_{highest}-b^*_{lowest}$), a maximum change in both a* and b* values, or a maximum change in the quantity $\sqrt{((a^*_{highest}-a^*_{lowest})^2+(b^*_{highest}-b^*_{lowest})^2)}$. Unless otherwise specified, maximum reflectance color shift refers to a maximum change in this quantity.

Photopic Average Reflectance and Transmittance

In some embodiments, the article of one or more embodiments, or the outer surface 122 of one or more articles, may exhibit a specified average visible photopic average reflectance and/or average visible photopic average transmittance over the optical wavelength regime. These photopic reflectance values may be exhibited at incident illumination angles in the range from about 0° to about 20°, from about 0° to about 40° or from about 0° to about 60°. Unless otherwise specified, the average photopic average reflectance or transmittance is measured at an incident illumination angle in the range from about 0 degrees to about 10 degrees. As used herein, photopic average reflectance mimics the response of the human eye by weighting the reflectance versus wavelength spectrum according to the human eye's sensitivity. Photopic average reflectance is defined as the luminance, or tristimulus Y value of reflected light, according to CIE color space conventions. The average photopic average reflectance is defined in Equation (4) as the spectral reflectance, R(λ) multiplied by the illuminant spectrum, I(λ) and the CIE's color matching function $\bar{y}(\lambda)$, related to the eye's spectral response:

$$\langle R_p \rangle = \int_{380\,nm}^{720\,nm} R(\lambda) \times I(\lambda) \times \bar{y}(\lambda) d\lambda$$

Similarly, average reflectance and transmittance, unless otherwise specified, are measured at an incident illumination angle in the range from about 0 degrees to about 10 degrees.

In some embodiments, the article exhibits a specified single-side average photopic reflectance, measured at normal or near-normal incidence (e.g. 0-10 degrees) on the outer surface only.

Substrate

The substrate 110 may include an inorganic material and may include an amorphous substrate, a crystalline substrate or a combination thereof. The substrate 110 may be formed from man-made materials and/or naturally occurring materials (e.g., quartz and polymers). For example, in some instances, the substrate 110 may be characterized as organic and may specifically be polymeric. Examples of suitable polymers include, without limitation: thermoplastics including polystyrene (PS) (including styrene copolymers and blends), polycarbonate (PC) (including copolymers and blends), polyesters (including copolymers and blends, including polyethyleneterephthalate and polyethyleneterephthalate copolymers), polyolefins (PO) and cyclicpolyolefins (cyclic-PO), polyvinylchloride (PVC), acrylic polymers including polymethyl methacrylate (PMMA) (including copolymers and blends), thermoplastic urethanes (TPU), polyetherimide (PEI) and blends of these polymers with each other. Other exemplary polymers include epoxy, styrenic, phenolic, melamine, and silicone resins.

In some specific embodiments, the substrate 110 may specifically exclude polymeric, plastic and/or metal substrates. The substrate may be characterized as alkali-including substrates (i.e., the substrate includes one or more alkalis). In one or more embodiments, the substrate exhibits a refractive index in the range from about 1.45 to about 1.55. In specific embodiments, the substrate 110 may exhibit an average strain-to-failure at a surface on one or more opposing major surface that is 0.5% or greater, 0.6% or greater, 0.7% or greater, 0.8% or greater, 0.9% or greater, 1% or greater, 1.1% or greater, 1.2% or greater, 1.3% or greater, 1.4% or greater 1.5% or greater or even 2% or greater, as measured using ball-on-ring testing using 5 or more, samples. More samples may be used, within reason, as it is expected that a greater number of samples will lead to greater statistical consistency. In specific embodiments, the substrate 110 may exhibit an average strain-to-failure at its surface on one or more opposing major surface of about 1.2%, about 1.4%, about 1.6%, about 1.8%, about 2.2%, about 2.4%, about 2.6%, about 2.8%, or about 3% or greater.

Suitable substrates 110 may exhibit an elastic modulus (or Young's modulus) in the range from about 30 GPa to about 120 GPa. In some instances, the elastic modulus of the substrate may be in the range from about 30 GPa to about 110 GPa, from about 30 GPa to about 100 GPa, from about 30 GPa to about 90 GPa, from about 30 GPa to about 80 GPa, from about 30 GPa to about 70 GPa, from about 40 GPa to about 120 GPa, from about 50 GPa to about 120 GPa, from about 60 GPa to about 120 GPa, from about 70 GPa to about 120 GPa, and all ranges and sub-ranges therebetween.

In one or more embodiments, the amorphous substrate may include glass, which may be strengthened or non-strengthened. Examples of suitable glass include soda lime glass, alkali aluminosilicate glass, alkali containing borosilicate glass and alkali aluminoborosilicate glass. In some variants, the glass may be free of lithia. In one or more alternative embodiments, the substrate 110 may include crystalline substrates such as glass ceramic substrates (which may be strengthened or non-strengthened) or may include a single crystal structure, such as sapphire. In one or more specific embodiments, the substrate 110 includes an amorphous base (e.g., glass) and a crystalline cladding (e.g., sapphire layer, a polycrystalline alumina layer and/or or a spinel ($MgAl_2O_4$) layer).

The substrate 110 of one or more embodiments may have a hardness that is less than the hardness of the article (as measured by the Berkovich Indenter Hardness Test described herein). The hardness of the substrate is determined by the Berkovich Indenter Hardness Test, as described herein.

The substrate 110 may be substantially planar or sheet-like, although other embodiments may utilize a curved or otherwise shaped or sculpted substrate. The substrate 110 may be substantially optically clear, transparent and free from light scattering. In such embodiments, the substrate may exhibit an average light transmission over the optical wavelength regime of about 85% or greater, about 86% or greater, about 87% or greater, about 88% or greater, about 89% or greater, about 90% or greater, about 91% or greater or about 92% or greater. In one or more alternative embodiments, the substrate 110 may be opaque or exhibit an average light transmission over the optical wavelength regime of less than about 10%, less than about 9%, less than about 8%, less than about 7%, less than about 6%, less than about 5%, less than about 4%, less than about 3%, less than about 2%, less than about 1%, or less than about 0.5%. In some embodiments, these light reflectance and transmittance values may be a total reflectance or total transmittance (taking into account reflectance or transmittance on both major surfaces of the substrate) or may be observed on a single side of the substrate (i.e., on the outer surface 122 only, without taking into account the opposite surface). Unless otherwise specified, the average reflectance or transmittance is measured at an incident illumination angle of 0 degrees (however, such measurements may be provided at incident illumination angles of 45 degrees or 60 degrees). The substrate 110 may optionally exhibit a color, such as white, black, red, blue, green, yellow, orange etc.

Additionally or alternatively, the physical thickness of the substrate 110 may vary along one or more of its dimensions for aesthetic and/or functional reasons. For example, the edges of the substrate 110 may be thicker as compared to more central regions of the substrate 110. The length, width and physical thickness dimensions of the substrate 110 may also vary according to the application or use of the article 100.

The substrate 110 may be provided using a variety of different processes. For instance, where the substrate 110 includes an amorphous substrate such as glass, various forming methods can include float glass processes and down-draw processes such as fusion draw and slot draw.

Once formed, a substrate 110 may be strengthened to form a strengthened substrate. As used herein, the term "strengthened substrate" may refer to a substrate that has been chemically strengthened, for example through ion-exchange of larger ions for smaller ions in the surface of the substrate. However, other strengthening methods known in the art, such as thermal tempering, or utilizing a mismatch of the coefficient of thermal expansion between portions of the substrate to create compressive stress and central tension regions, may be utilized to form strengthened substrates.

Where the substrate is chemically strengthened by an ion exchange process, the ions in the surface layer of the substrate are replaced by—or exchanged with—larger ions having the same valence or oxidation state. Ion exchange processes are typically carried out by immersing a substrate in a molten salt bath containing the larger ions to be exchanged with the smaller ions in the substrate. It will be appreciated by those skilled in the art that parameters for the ion exchange process, including, but not limited to, bath composition and temperature, immersion time, the number of immersions of the substrate in a salt bath (or baths), use of multiple salt baths, additional steps such as annealing, washing, and the like, are generally determined by the composition of the substrate and the desired compressive stress (CS), depth of compressive stress layer (or depth of layer) of the substrate that result from the strengthening operation. By way of example, ion exchange of alkali metal-containing glass substrates may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion times range from about 15 minutes up to about 40 hours. However, temperatures and immersion times different from those described above may also be used.

In addition, non-limiting examples of ion exchange processes in which glass substrates are immersed in multiple ion exchange baths, with washing and/or annealing steps between immersions, are described in U.S. patent application Ser. No. 12/500,650, filed Jul. 10, 2009, by Douglas C.

Allan et al., entitled "Glass with Compressive Surface for Consumer Applications" and claiming priority from U.S. Provisional Patent Application No. 61/079,995, filed Jul. 11, 2008, in which glass substrates are strengthened by immersion in multiple, successive, ion exchange treatments in salt baths of different concentrations; and U.S. Pat. No. 8,312,739, by Christopher M. Lee et al., issued on Nov. 20, 2012, and entitled "Dual Stage Ion Exchange for Chemical Strengthening of Glass," and claiming priority from U.S. Provisional Patent Application No. 61/084,398, filed Jul. 29, 2008, in which glass substrates are strengthened by ion exchange in a first bath is diluted with an effluent ion, followed by immersion in a second bath having a smaller concentration of the effluent ion than the first bath. The contents of U.S. patent application Ser. No. 12/500,650 and U.S. Pat. No. 8,312,739 are incorporated herein by reference in their entirety.

Compressive stress (including surface CS) is measured by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured according to Procedure C (Glass Disc Method) described in ASTM standard C770-16, entitled "Standard Test Method for Measurement of Glass Stress-Optical Coefficient," the contents of which are incorporated herein by reference in their entirety. Maximum CT values are measured using a scattered light polariscope (SCALP) technique known in the art.

As used herein, DOC means the depth at which the stress in the chemically strengthened alkali aluminosilicate glass article described herein changes from compressive to tensile. DOC may be measured by FSM or a scattered light polariscope (SCALP) depending on the ion exchange treatment. Where the stress in the glass article is generated by exchanging potassium ions into the glass article, FSM is used to measure DOC. Where the stress is generated by exchanging sodium ions into the glass article, SCALP is used to measure DOC. Where the stress in the glass article is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass articles is measured by FSM.

In some embodiments, a strengthened substrate 110 can have a surface CS of 250 MPa or greater, 300 MPa or greater, e.g., 400 MPa or greater, 450 MPa or greater, 500 MPa or greater, 550 MPa or greater, 600 MPa or greater, 650 MPa or greater, 700 MPa or greater, 750 MPa or greater or 800 MPa or greater. The strengthened substrate may have a DOC of 10 μm or greater, 15 μm or greater, 20 μm or greater (e.g., 25 μm, 30 μm, 35 μm, 40 μm, 45 μm, 50 μm or greater) and/or a maximum CT of 10 MPa or greater, 20 MPa or greater, 30 MPa or greater, 40 MPa or greater (e.g., 42 MPa, 45 MPa, or 50 MPa or greater) but less than 100 MPa (e.g., 95, 90, 85, 80, 75, 70, 65, 60, 55 MPa or less). In one or more specific embodiments, the strengthened substrate has one or more of the following: a surface CS greater than 500 MPa, a DOC greater than 15 μm, and a maximum CT greater than 18 MPa.

Example glasses that may be used in the substrate may include alkali aluminosilicate glass compositions or alkali aluminoborosilicate glass compositions, though other glass compositions are contemplated. Such glass compositions are capable of being chemically strengthened by an ion exchange process. One example glass composition comprises $SiO_2$, $B_2O_3$ and $Na_2O$, where $(SiO_2+B_2O_3) \geq 66$ mol. %, and $Na_2O \geq 9$ mol. %. In some embodiments, the glass composition includes 6 wt % or more aluminum oxide. In further embodiments, the substrate includes a glass composition with one or more alkaline earth oxides, such that a content of alkaline earth oxides is 5 wt. % or more. Suitable glass compositions, in some embodiments, further comprise at least one of $K_2O$, MgO, and CaO. In some embodiments, the glass compositions used in the substrate can comprise 61-75 mol. % SiO2; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition suitable for the substrate comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $(Li_2O+Na_2O+K_2O) \leq 18$ mol. % and 2 mol. % $(MgO+CaO) \leq 7$ mol. %.

In some embodiments, an alkali aluminosilicate glass composition suitable for the substrate comprises alumina, at least one alkali metal and, in some embodiments, greater than 50 mol. % $SiO_2$, in other embodiments 58 mol. % or more $SiO_2$, and in still other embodiments 60 mol. % or more $SiO_2$, wherein the ratio $(Al_2O_3+B_2O_3)/\Sigma$modifiers (i.e., sum of modifiers) is greater than 1, where in the ratio the components are expressed in mol. % and the modifiers are alkali metal oxides. This glass composition, in particular embodiments, comprises: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $(Al_2O_3+B_2O_3)/\Sigma$modifiers (i.e., sum of modifiers) is greater than 1.

In some embodiments, the substrate may include an alkali aluminosilicate glass composition comprising: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $Na_2O-Al_2O_3 \leq 6$ mol. %; and 4 mol. % $\leq (Na_2O+K_2O)-Al_2O_3 \leq 10$ mol. %.

In some embodiments, the substrate may comprise an alkali aluminosilicate glass composition comprising: 2 mol % or more of $Al_2O_3$ and/or $ZrO_2$, or 4 mol % or more of $Al_2O_3$ and/or $ZrO_2$.

Where the substrate 110 includes a crystalline substrate, the substrate may include a single crystal, which may include $Al_2O_3$. Such single crystal substrates are referred to as sapphire. Other suitable materials for a crystalline substrate include polycrystalline alumina layer and/or spinel ($MgAl_2O_4$).

Optionally, the crystalline substrate 110 may include a glass ceramic substrate, which may be strengthened or non-strengthened. Examples of suitable glass ceramics may include $Li_2O$—$Al_2O_3$—$SiO_2$ system (i.e. LAS-System)

glass ceramics, MgO—Al$_2$O$_3$—SiO$_2$ system (i.e. MAS-System) glass ceramics, and/or glass ceramics that include a predominant crystal phase including β-quartz solid solution, β-spodumene ss, cordierite, and lithium disilicate. The glass ceramic substrates may be strengthened using the chemical strengthening processes disclosed herein. In one or more embodiments, MAS-System glass ceramic substrates may be strengthened in Li$_2$SO$_4$ molten salt, whereby an exchange of 2 Li$^+$ for Mg$^{2+}$ can occur.

The substrate 110 according to one or more embodiments can have a physical thickness ranging from about 100 μm to about 5 mm. Example substrate 110 physical thicknesses range from about 100 μm to about 500 μm (e.g., 100, 200, 300, 400 or 500 μm). Further example substrate 110 physical thicknesses range from about 500 μm to about 1000 μm (e.g., 500, 600, 700, 800, 900 or 1000 μm). The substrate 110 may have a physical thickness greater than about 1 mm (e.g., about 2, 3, 4, or 5 mm). In one or more specific embodiments, the substrate 110 may have a physical thickness of 2 mm or less or less than 1 mm. The substrate 110 may be acid polished or otherwise treated to remove or reduce the effect of surface flaws.

Methods

A second aspect of this disclosure pertains to a method for forming the articles described herein. In some embodiments, the method includes providing a substrate having a major surface in a coating chamber, forming a vacuum in the coating chamber, forming a durable optical coating as described herein on the major surface, optionally forming an additional coating comprising at least one of an easy-to-clean coating and a scratch resistant coating, on the optical coating, and removing the substrate from the coating chamber. In one or more embodiments, the optical coating and the additional coating are formed in either the same coating chamber or without breaking vacuum in separate coating chambers.

In one or more embodiments, the method may include loading the substrate on carriers which are then used to move the substrate in and out of different coating chambers, under load lock conditions so that a vacuum is preserved as the substrate is moved.

The optical coating 120 and/or other layers may be formed using various deposition methods such as vacuum deposition techniques, for example, chemical vapor deposition (e.g., plasma enhanced chemical vapor deposition (PECVD), low-pressure chemical vapor deposition, atmospheric pressure chemical vapor deposition, and plasma-enhanced atmospheric pressure chemical vapor deposition), physical vapor deposition (e.g., reactive or nonreactive sputtering, metal-mode reactive sputtering, or laser ablation), thermal or e-beam evaporation and/or atomic layer deposition. Liquid-based methods may also be used such as spraying, dipping, spin coating, or slot coating (for example, using sol-gel materials). Where vacuum deposition is utilized, inline processes may be used to form the optical coating 120 and/or other layers in one deposition run. In some instances, the vacuum deposition can be made by a linear PECVD source.

In some embodiments, the method may include controlling the thickness of the optical coating 120 and/or other layers so that it does not vary by more than about 4% along about 80% or more of the area of surface 122 or from the target thickness for each layer at any point along the substrate area. In some embodiments, the thickness of the optical coating 120 and/or other layers does not vary by more than about 4% along about 95% or more of the area of the outer surface 122.

In some embodiments, for any of the embodiments described herein, a method of forming an article comprises: obtaining a substrate comprising a first major surface and comprising an amorphous substrate or a crystalline substrate; disposing an optical coating on the first major surface, the optical coating comprising a second major surface opposite the first major surface and a thickness in a direction normal to the second major surface; and creating a refractive index gradient along at least a first gradient portion of the thickness of the optical coating. A refractive index of the optical coating varies along a thickness of the optical coating between the first major surface and the second major surface.

In some embodiments, for any of the embodiments described herein, creating a refractive index gradient comprises varying along the thickness of the optical coating at least one of the composition and the porosity of the optical coating. The composition and/or porosity may be varied stepwise or continuously by adjusting deposition parameters and conditions in a stepwise or continuous manner.

Examples of Specific Articles

Figure 35:
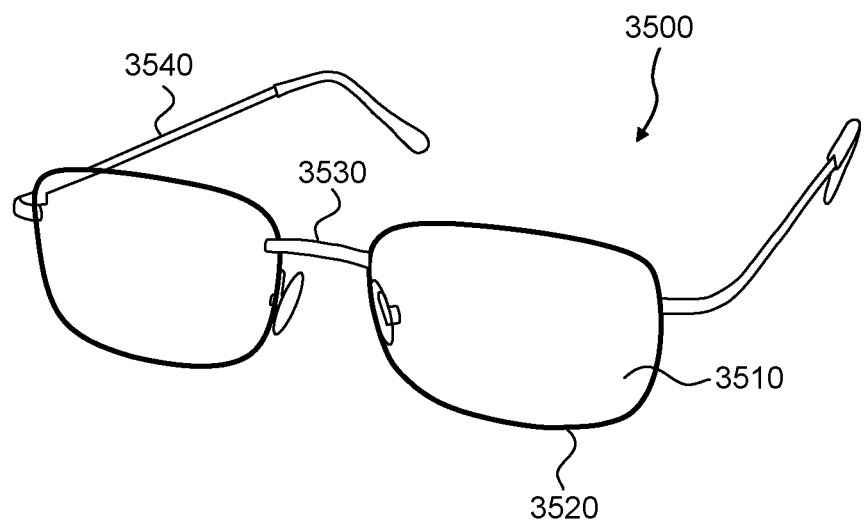
FIG. 35 shows an article (eyeglass lenses) according to one or more embodiments.

FIG. 35 shows glasses 3500 in accordance with some embodiments. Glasses 3500 include lenses 3510, frames 3520, a bridge 3530, and temples 3540. Any suitable glasses structure may be used. The specific structure of FIG. 35 is not intended to be limiting. For example, some glasses have a single continuous lens as opposed to two lenses separate by a bridge. And, for example, some sunglasses have different frame configurations, including half-frame and no-frame configurations. In some embodiments, a scratch resistant coating as described herein may be applied to the front surface of lenses 3510, i.e., the surface facing away from the wearer. Coatings may also be applied to the back surface of lenses 3510 as described herein.

Figure 36:
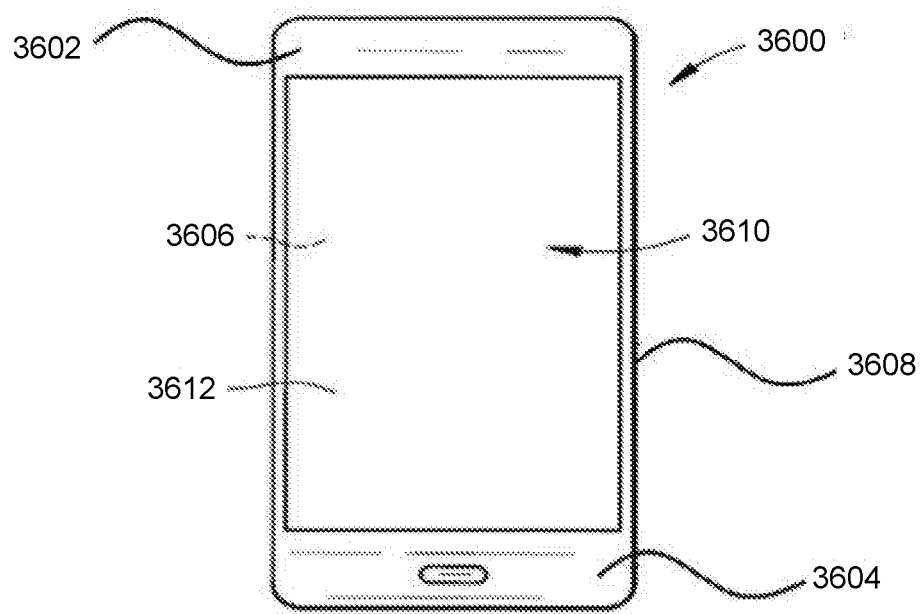
FIGS. 36 and 37 show an article (cover substrate for smart phone) according to one or more embodiments.
Figure 37:
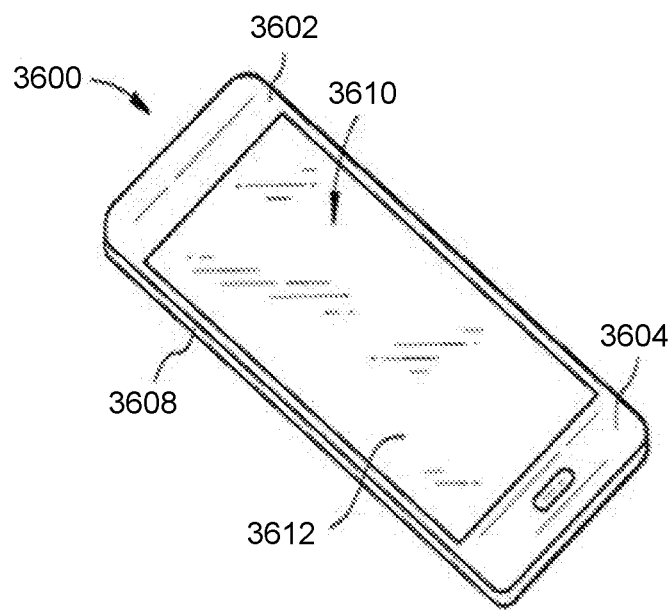

The glass articles disclosed herein may be incorporated into another article such as an article with a display (or display articles) (e.g., consumer electronics, including mobile phones, tablets, computers, navigation systems, wearable devices (e.g., watches) and the like), heads-up displays (e.g. coated glass designed to reflect certain wavelengths of light from an image projector, such as an LED or laser-based image projector, while transmitting other wavelengths), architectural articles, transportation articles (e.g., automotive, trains, aircraft, sea craft, etc.), appliance articles, or any article that may benefit from some transparency, scratch-resistance, abrasion resistance or a combination thereof. The transparency may include visible/optical transparency, or may include microwave/RF transparency (even if the article is opaque in the visible spectrum, such as for a black glass-ceramic). An exemplary article incorporating any of the glass articles disclosed herein is shown in FIGS. 36 and 37. Specifically, FIGS. 36 and 37 show a consumer electronic device 3600 including a housing 3602 having front 3604, back 3606, and side surfaces 3608; electrical components (not shown) that are at least partially inside or entirely within the housing and including at least a controller, a memory, and a display 3610 at or adjacent to the front surface of the housing; and a cover substrate 3612 at or over the front surface of the housing such that it is over the display. In some embodiments, the cover substrate 3612 may include any of the glass articles disclosed herein. In some embodiments, at least one of a portion of the housing or the cover substrate comprises the glass articles disclosed herein.

EXAMPLES

Various embodiments will be further clarified by the following examples.

It has been observed through a variety of scratching, indentation, and delamination experiments that gradient interfaces can provide improved resistance to mechanical damage, including delamination. It is expected that a gradient with a lower slope (slowest compositional change) will act the most like a bulk material and thus have the highest resistance to delamination. But, as explained further herein and illustrated by the examples and comparative examples, gradients with very low slope may not be able to achieve desired optical interference effects to generate desired reflectance and other optical properties with dense coating materials. The examples herein show that RI gradients with an appropriate slope can enhanced mechanical robustness, while still having refractive index changes that are rapid enough to provide desired optical interference effects. The most desirable embodiments will depend on application requirements. Some applications might require the highest mechanical performance while targeting a high reflectance and a specific color; other applications may allow a lower reflectance while targeting a neutral (silver) color; and so on.

Comparative Examples 1-2 and Modeled Examples 1-3 used modeling to demonstrate the reflectance and transmittance spectra of articles that included embodiments of the optical coating, as described herein. In Comparative Examples 1-2 and Modeled Examples 1-3, unless otherwise specified, the optical coating included layers of AlOxNy, $SiO_2$, and mixtures thereof. The substrate modeling parameters were based on a glass substrate commercially available from Corning® (Corning glass code 5318).

The refractive index dispersion curves for the coating materials used in the modeling were based on measured values. Single films of $SiO_2$ and $AlO_xN_y$ were formed by metal-mode rotary drum reactive sputtering on fusion-formed and ion-exchanged 5318 glass. The $AlO_xN_y$ fabricated and used in the modeled examples had a nominal composition of about 10-16 atomic % oxygen (~12 wt % oxygen), 32-40 atomic % nitrogen, and 48-54 atomic % aluminum. Refractive indices for these single films were measured using spectroscopic ellipsometry. The results of these measurements are shown in Table 2. Linear averages of the $SiO_2$ and $AlO_xN_y$ refractive indices were used for the intermediate index mixed materials in some of the Examples. In summary, these refractive indices were measured from experimentally fabricated materials, with the modeled examples using optically simulated coating designs based on the experimental refractive indices listed here. The modeled examples use a single refractive index value in their descriptive tables for convenience, which corresponds to a point selected from the dispersion curves at about 550 nm wavelength.

TABLE 2

Measured Refractive Indices of 5318 Glass Substrate, $SiO_2$ sputtered film, and $AlO_xN_y$ sputtered film

| Wavelength (nm) | n | k |
|---|---|---|
| 5318 Glass substrate | | |
| 380.8 | 1.5244 | 0 |
| 400.9 | 1.5214 | 0 |
| 421.0 | 1.5191 | 0 |
| 451.2 | 1.5160 | 0 |
| 471.2 | 1.5143 | 0 |
| 501.3 | 1.5126 | 0 |
| 521.4 | 1.5112 | 0 |
| 551.5 | 1.5100 | 0 |
| 571.5 | 1.5092 | 0 |
| 601.6 | 1.5083 | 0 |
| 621.7 | 1.5075 | 0 |
| 651.7 | 1.5063 | 0 |
| 671.8 | 1.5056 | 0 |
| 701.8 | 1.5045 | 0 |
| 719.8 | 1.5046 | 0 |
| SiO2 sputtered film | | |
| 375 | 1.49863 | 1.00E−05 |
| 400 | 1.4949 | 1.00E−05 |
| 425 | 1.49176 | 1.00E−05 |
| 450 | 1.4890 | 0 |
| 475 | 1.48663 | 0 |
| 500 | 1.4846 | 0 |
| 525 | 1.48274 | 0 |
| 550 | 1.4811 | 0 |
| 575 | 1.47973 | 0 |
| 600 | 1.4785 | 0 |
| 625 | 1.47735 | 0 |
| 650 | 1.4764 | 0 |
| 675 | 1.47546 | 0 |
| 700 | 1.4747 | 0 |
| 725 | 1.47392 | 0 |
| AlOxNy sputtered film | | |
| 375 | 2.0719 | 1.10E−04 |
| 400 | 2.0554 | 3.00E−05 |
| 425 | 2.0425 | 1.00E−05 |
| 450 | 2.0322 | 0 |
| 475 | 2.0238 | 0 |
| 500 | 2.0169 | 0 |
| 525 | 2.011 | 0 |
| 550 | 2.0061 | 0 |
| 575 | 2.0018 | 0 |
| 600 | 1.9981 | 0 |
| 625 | 1.9949 | 0 |
| 650 | 1.9921 | 0 |
| 675 | 1.9897 | 0 |
| 700 | 1.9875 | 0 |
| 725 | 1.9855 | 0 |

In the examples, thicknesses are physical thickness, not optical thicknesses. The structures of Examples 1 through 3 look similar to that of FIG. 5, FIG. 6, or FIG. 7, with the specific layers, layer compositions, and layer thicknesses provided in the examples. The structure of Example 2 is similar to FIG. 5, where one of the gradient portions has a refractive index that oscillates rather than monotonically increasing or decreasing throughout the gradient portion. But, the transitions between high and low refractive indices is not an abrupt interface, but rather meets the definition of gradient portion as defined herein.

In the examples, the outer surface may also be referred to as the "front" surface, and is the surface opposite the substrate. Single-sided reflectance and single-sided reflected color are measured on the front (coated) surface while removing the reflectance from the backside of the coated article, typically accomplished by optical coupling of the back surface to an absorbing substrate. Transmittance is measured for light passing through the front surface toward the substrate. For example, if the examples were used on the outward facing surface of eyeglasses, transmission through the outer or front surface would be what the wearer sees, and reflection from the outer or front surface would be what others see. The modeled examples were simulated using a CIE D65 illuminant and D65 detector.

Reflectance and transmittance plots for the modeled examples were calculated at 0 degrees (normal incidence), unless otherwise noted. In practice there is negligible change in optical performance from 0 to 10 degrees, meaning normal incidence and near-normal incidence can be considered functionally equivalent, as defined by this 0-10 degree angular range. Average polarization was used for all reflectance, transmittance, and color calculations.

In all of the examples of this disclosure, the thickness of the thickest hard layer (2000 nm in Example 1-3) can be varied to any value from 500 nm to 5000 nm without significantly changing the optical performance. Similarly, the thickest hard layer can be comprised of multiple sub-layers, for example <10 nm layers forming a 'superlattice', while maintaining a high hardness and similar effective optical performance.

In plots showing the structure of examples and comparative examples, the glass substrate is to the left. The thickness axis is centered with 0 marking the beginning of the thickest hard layer. The gradient portions of the coating are modeled as a series of discrete small steps in thickness and index. It should be recognized that continuous gradients with similar gradient slopes, or a gradient having different discrete step sizes but a similar overall slope, can be designed to have substantially the same optical performance.

Comparative Example 1

Table 3 shows the structure of Comparative Example 1. Comparative Example 1 has a discrete layered structure.

TABLE 3

Comparative Example 1, Structure

| Layer | Thickness (nm) | Refractive Index @550 nm |
|---|---|---|
| 5318 Glass | Substrate | 1.51 |
| AlOxNy | 8 | 2.006 |
| SiO2 | 52.4 | 1.481 |
| AlOxNy | 24.5 | 2.006 |
| SiO2 | 30.1 | 1.481 |
| AlOxNy | 42.6 | 2.006 |
| SiO2 | 8.9 | 1.481 |
| AlOxNy | 2000 | 2.006 |
| SiO2 | 15 | 1.481 |
| AlOxNy | 30 | 2.006 |
| SiO2 | 99 | 1.481 |
| Air | Medium | 1 |

Table 4 shows 1-side reflected color, 2-side transmitted color, photopic average reflectance, and photopic average transmittance for Comparative Example 1.

TABLE 4

Comp. Ex. 1 1st-surface Reflectance

| Incident Angle (deg) | Photopic Average % R (D65) | Reflected a* (D65) | Reflected b* (D65) |
|---|---|---|---|
| 0 | 1.475 | −1.683 | −2.108 |
| 6 | 1.470 | −1.675 | −2.098 |
| 10 | 1.463 | −1.659 | −2.080 |
| 20 | 1.444 | −1.522 | −2.005 |
| 30 | 1.489 | −1.137 | −1.845 |
| 40 | 1.777 | −0.456 | −1.421 |
| 50 | 2.763 | 0.272 | −0.747 |
| 60 | 5.637 | 0.666 | −0.120 |
| 70 | 13.653 | 0.665 | 0.189 |
| 80 | 35.987 | 0.391 | 0.173 |
| 90 | 100 | 0 | 0 |

Comp. Ex. 1 2-surface Transmittance

| Incident Angle (deg) | Photopic Average % T (D65) | Transmitted a* (D65) | Transmitted b* (D65) |
|---|---|---|---|
| 0 | 94.57 | 0.092 | 0.209 |
| 6 | 94.57 | 0.092 | 0.208 |
| 10 | 94.58 | 0.090 | 0.207 |
| 20 | 94.58 | 0.082 | 0.201 |
| 30 | 94.43 | 0.061 | 0.194 |
| 40 | 93.82 | 0.024 | 0.177 |
| 50 | 91.96 | −0.028 | 0.145 |
| 60 | 86.95 | −0.083 | 0.098 |
| 70 | 74.41 | −0.117 | 0.056 |
| 80 | 46.48 | −0.105 | 0.050 |
| 90 | 0 | 0 | 0 |

Figure 7:
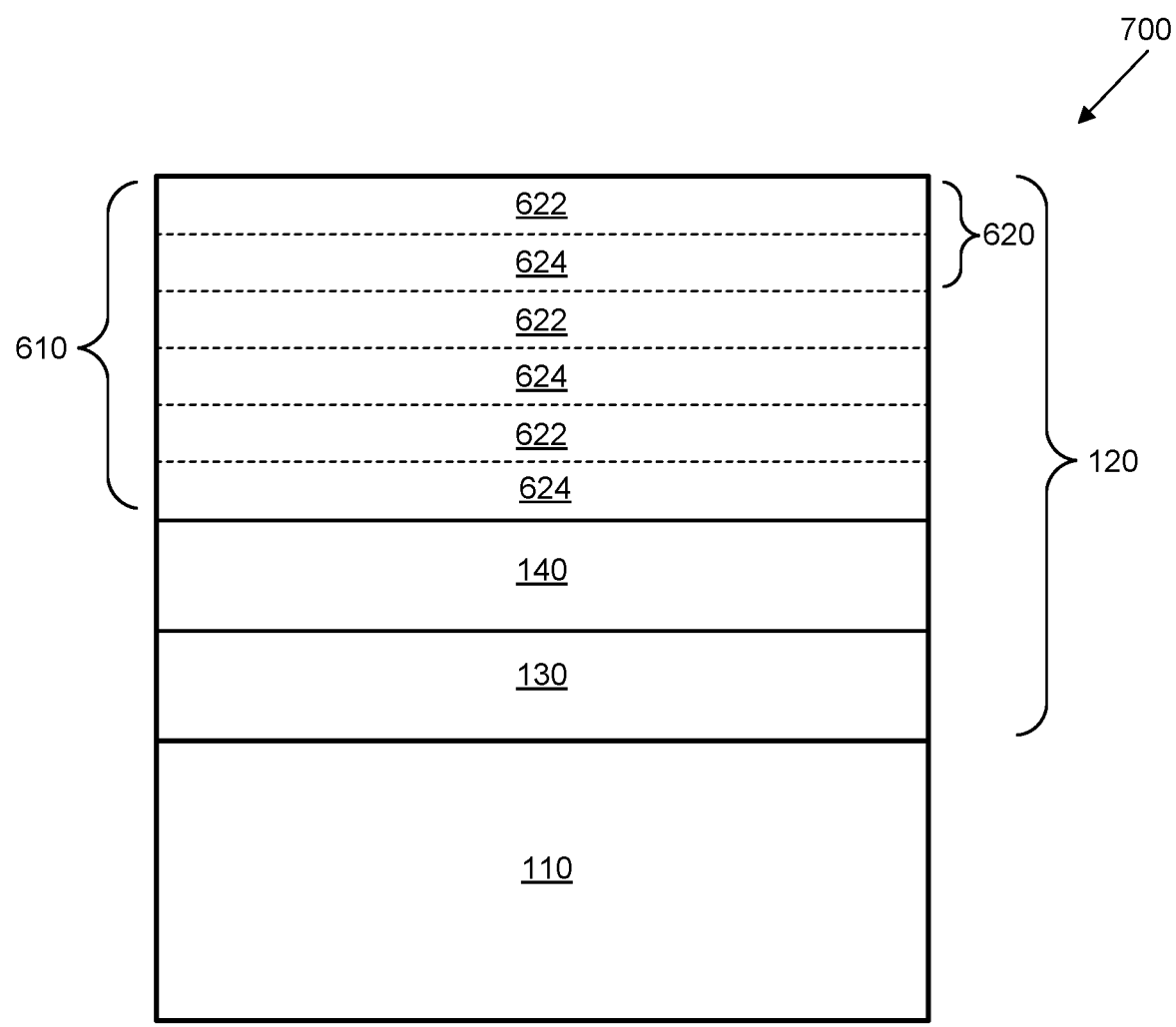
FIG. 7 is a side view of an article, according to one or more embodiments.
Figure 8:
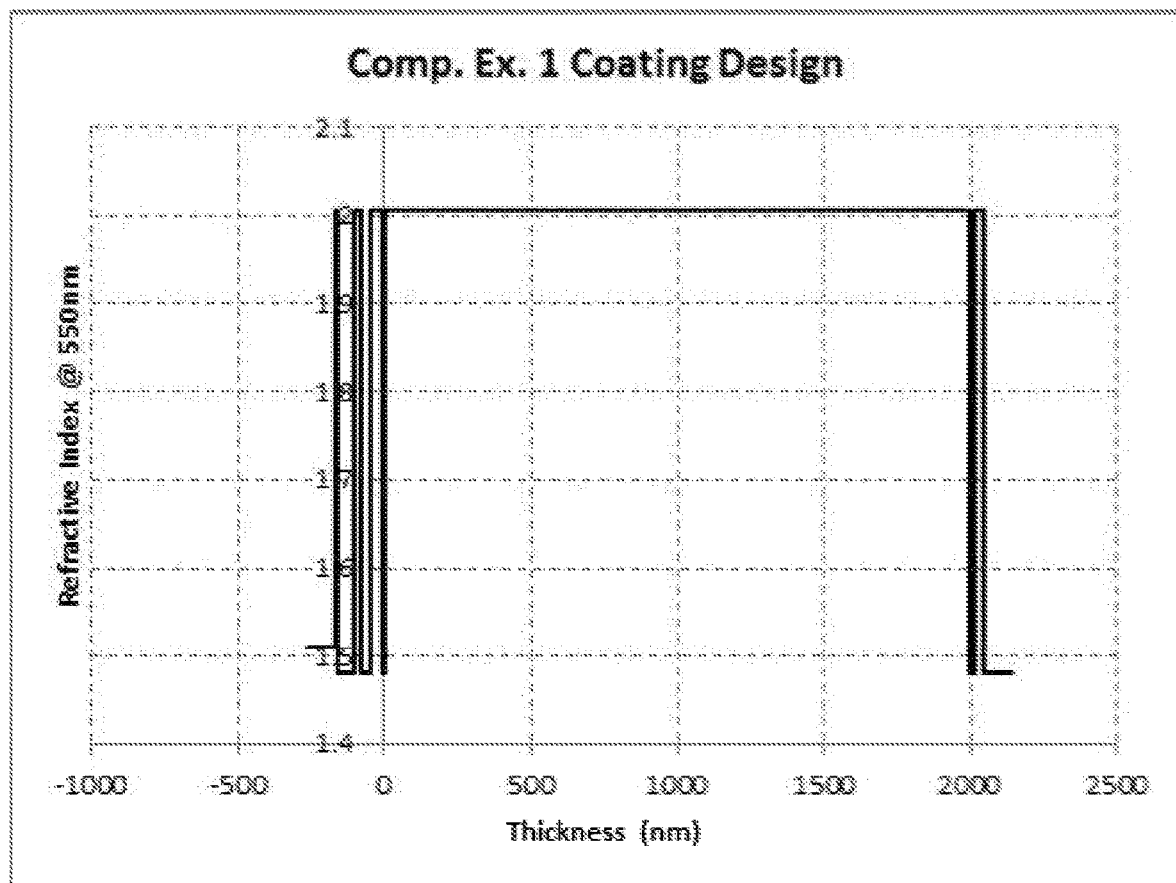
FIG. 8 shows a coating design for Comparative Example 1.
Figure 9:
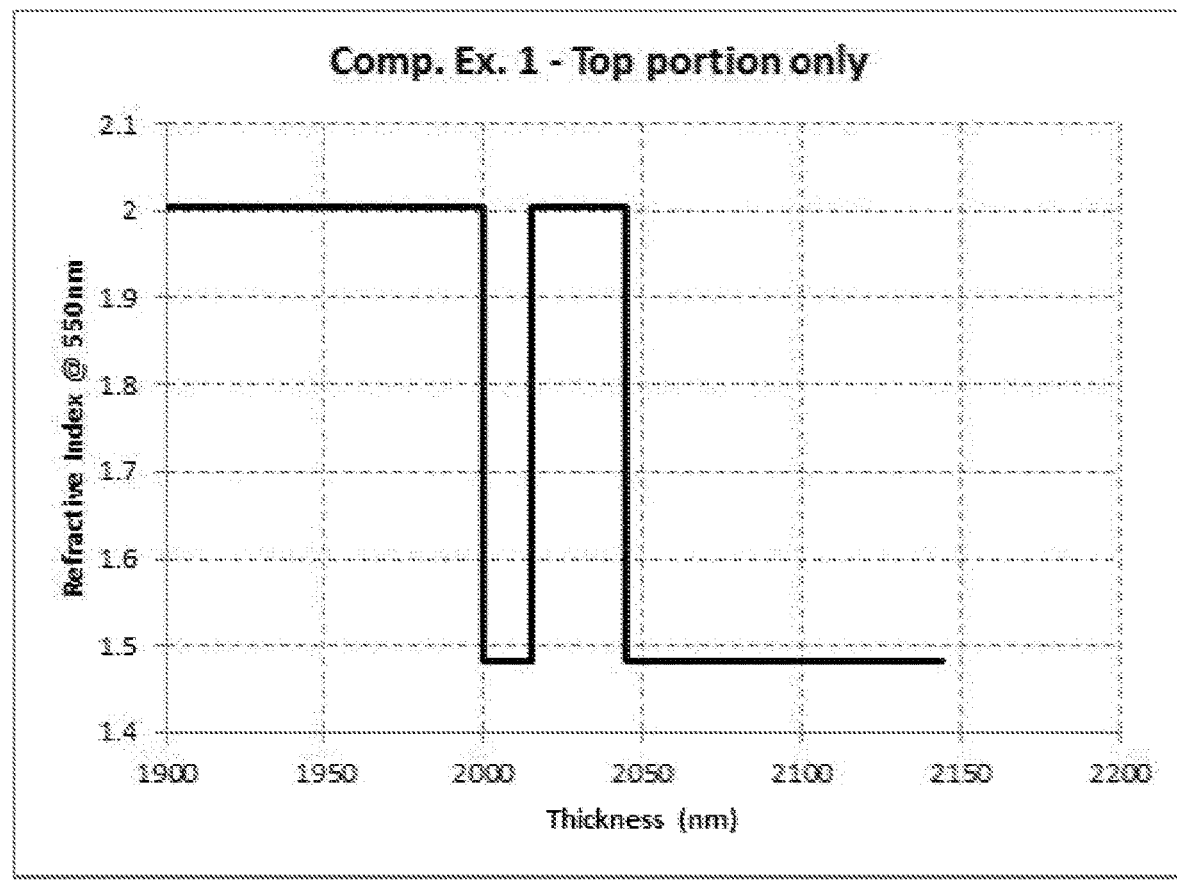
FIG. 9 shows a coating design for Comparative Example 1.
Figure 10:
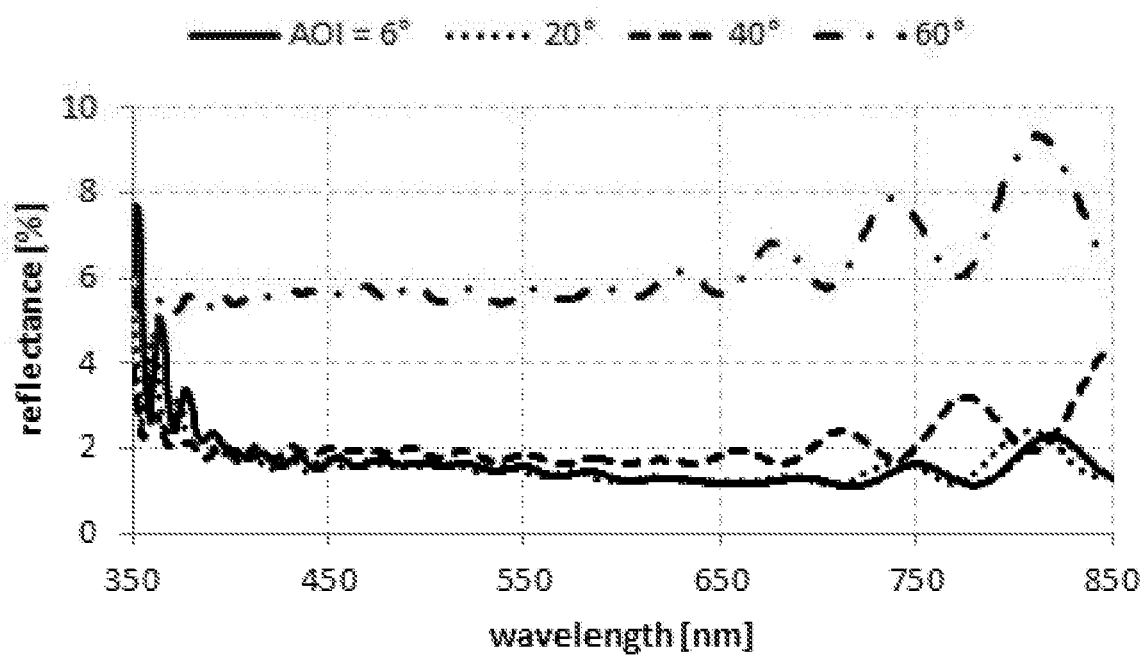
FIG. 10 shows reflectance spectra for Comparative Example 1.
Figure 11:
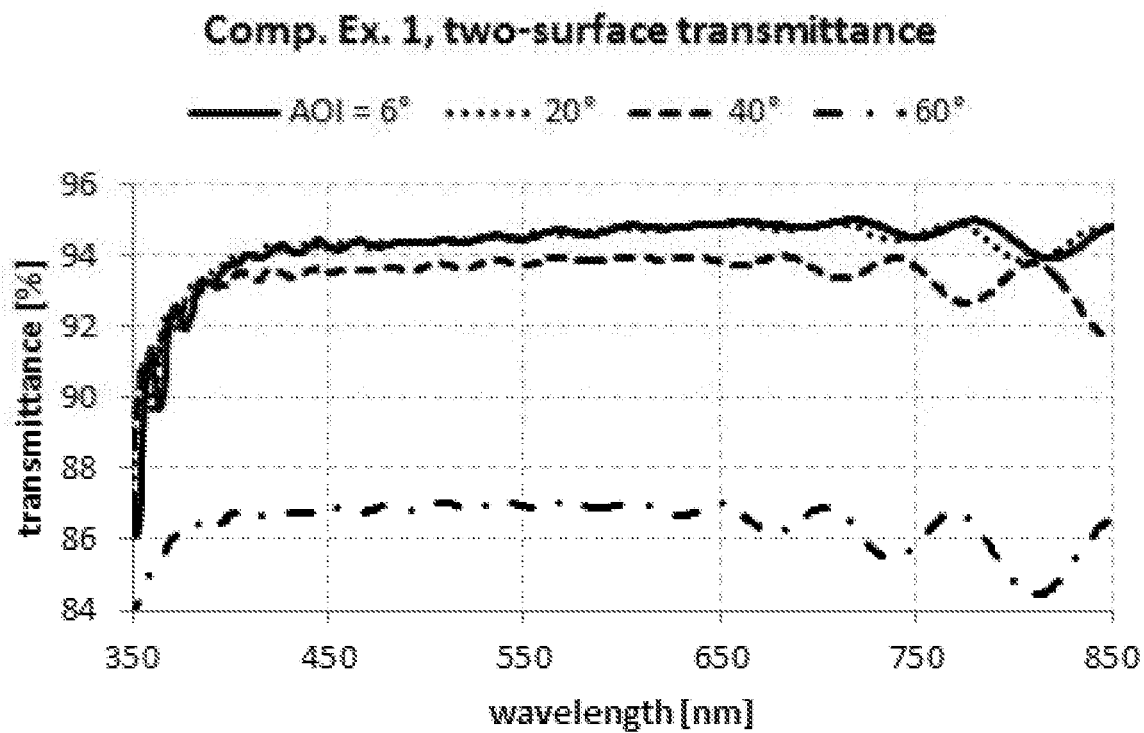
FIG. 11 shows transmittance spectra for Comparative Example 1.

FIG. 7 shows the coating design of Comparative Example 1 as a plot of Refractive Index vs. position. FIG. 8 shows detail for a part of the coating design of Comparative Example 1 as a plot of Refractive Index vs. position. FIG. 9 shows reflectance spectra for Comparative Example 1. FIG. 10 shows transmittance spectra for Comparative Example 1. FIG. 11 shows a plot of surface reflected D65 color vs. angle for Comparative Example 1. FIG. 9 and FIG. 10 are based on incident light passing right to left in FIG. 7.

Comparative Example 2

Table 5 shows the structure of Comparative Example 2. Comparative Example 2 has a simple gradient which resulted in a relatively high reflectance.

TABLE 5

Comparative Example 2, Structure

| Layer | Thickness (nm) | Refractive Index @550 nm |
|---|---|---|
| 5318 Glass | Substrate | 1.51 |
| Linear Gradient w/ RI slope of = +0.0008/nm | 640 | Graded from 1.51 to 2.006 in steps of 20 nm |
| AlOxNy | 2000 | 2.006 |
| Linear Gradient w/ RI slope of = −0.0043/nm | 125 | Graded from 2.006 to 1.481 in steps of 3.66 nm |
| Air | Medium | 1 |

Table 6 shows 1-side reflected color, 2-side transmitted color, photopic average reflectance, and photopic average transmittance for Comparative Example 2.

TABLE 6

Comp. Ex. 2, 1st-surface Reflectance

| Incident Angle (deg) | Photopic Average % R (D65) | Reflected a* (D65) | Reflected b* (D65) |
|---|---|---|---|
| 0 | 3.34 | 1.45 | −3.51 |
| 6 | 3.34 | 1.48 | −3.47 |
| 10 | 3.34 | 1.51 | −3.39 |
| 20 | 3.38 | 1.67 | −3.02 |
| 30 | 3.54 | 1.86 | −2.33 |
| 40 | 4.04 | 1.97 | −1.37 |

TABLE 6-continued

| | | | |
|---|---|---|---|
| 50 | 5.39 | 1.84 | −0.27 |
| 60 | 8.84 | 1.47 | 0.56 |
| 70 | 17.50 | 0.92 | 0.80 |
| 80 | 39.64 | 0.38 | 0.55 |
| 90 | 100 | 0 | 0 |

| Comp. Ex. 2, 2-surface Transmittance | | | |
|---|---|---|---|
| Incident Angle (deg) | Photopic Average % T (D65) | Transmitted a* (D65) | Transmitted b* (D65) |
| 0 | 92.85 | −0.15 | 0.46 |
| 6 | 92.85 | −0.15 | 0.45 |
| 10 | 92.85 | −0.16 | 0.44 |
| 20 | 92.79 | −0.18 | 0.41 |
| 30 | 92.56 | −0.20 | 0.34 |
| 40 | 91.83 | −0.23 | 0.24 |
| 50 | 89.83 | −0.24 | 0.12 |
| 60 | 84.75 | −0.24 | −0.02 |
| 70 | 72.43 | −0.19 | −0.12 |
| 80 | 45.26 | −0.11 | −0.16 |
| 90 | 0.00 | 0.00 | 0.00 |

Figure 12:
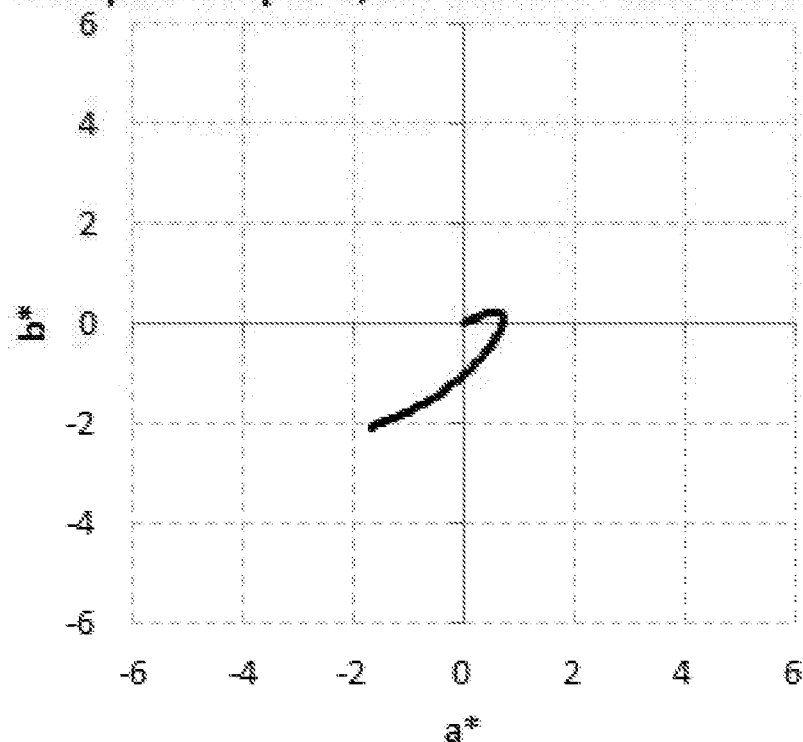
FIG. 12 shows a plot of surface reflected D65 color vs. angle for Comparative Example 1.
Figure 13:
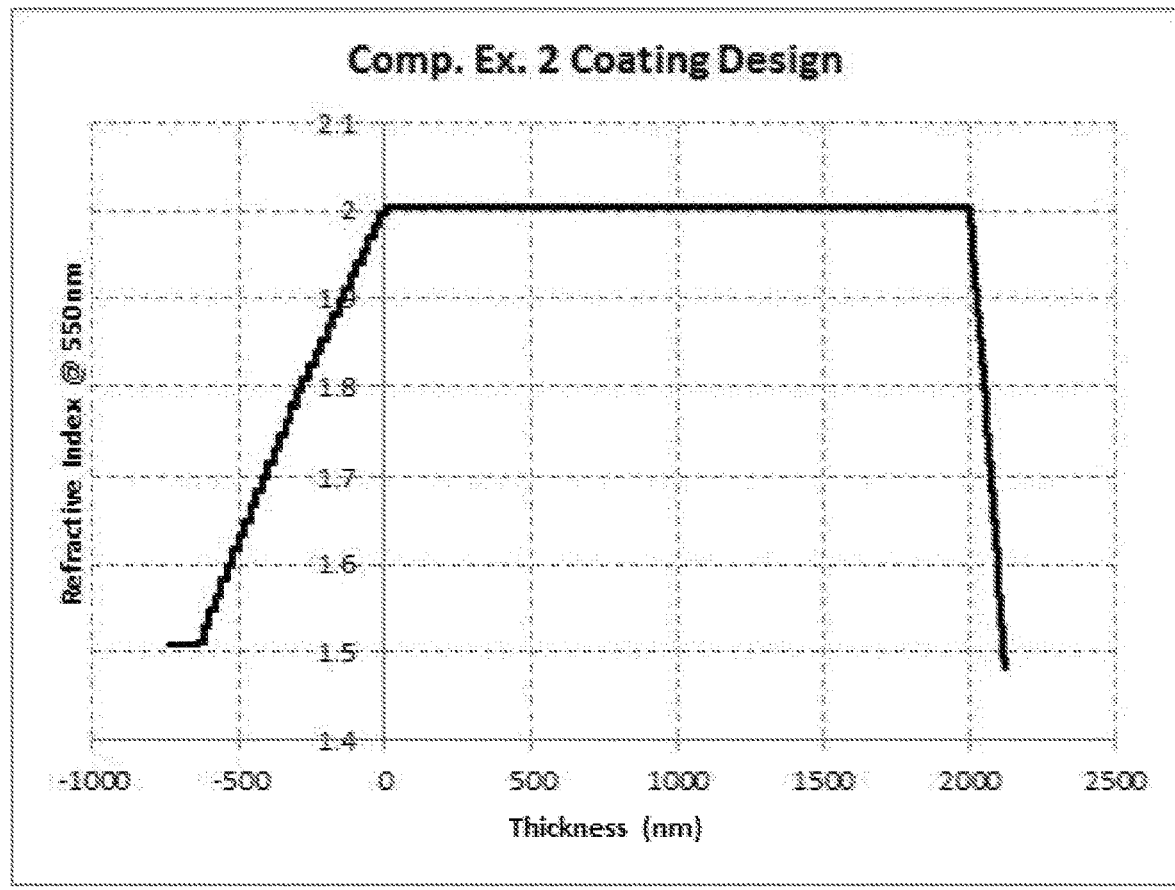
FIG. 13 shows a coating design for Comparative Example 2.
Figure 14:
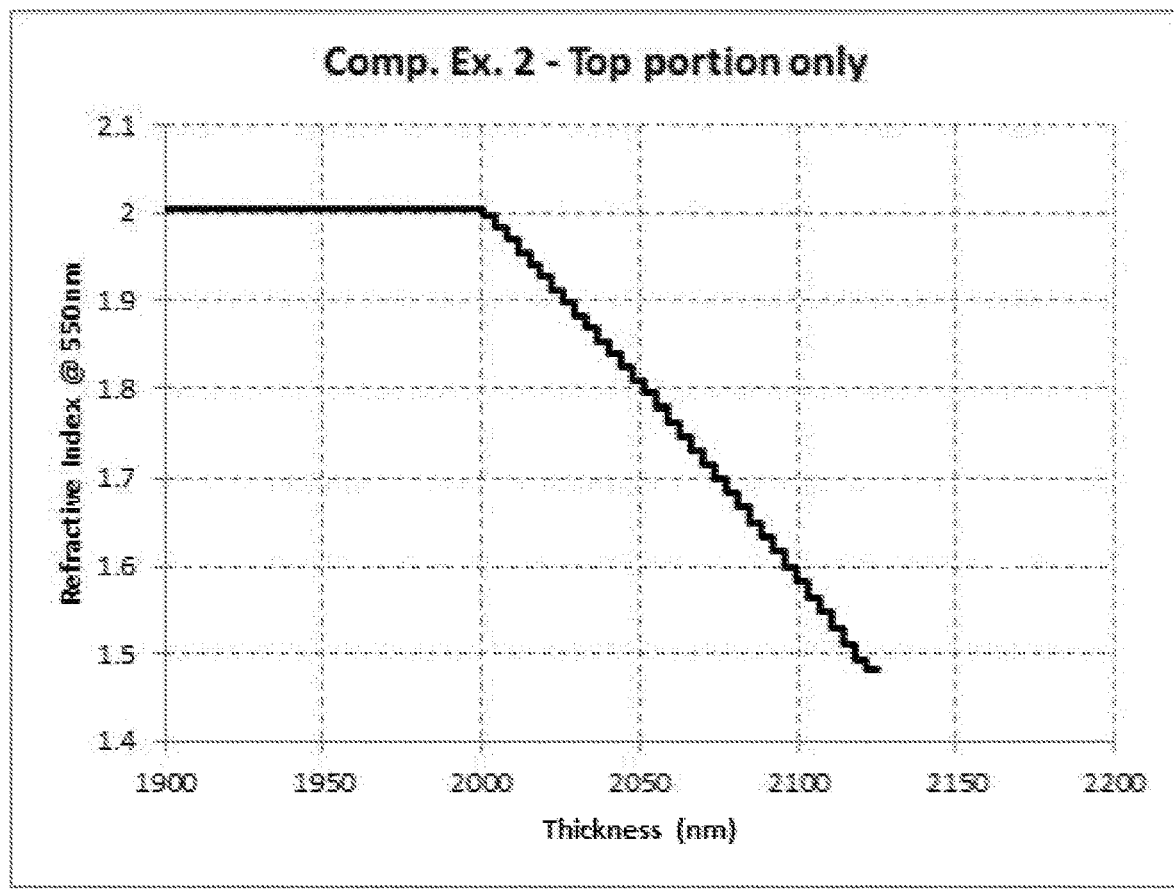
FIG. 14 shows a coating design for Comparative Example 2.
Figure 15:
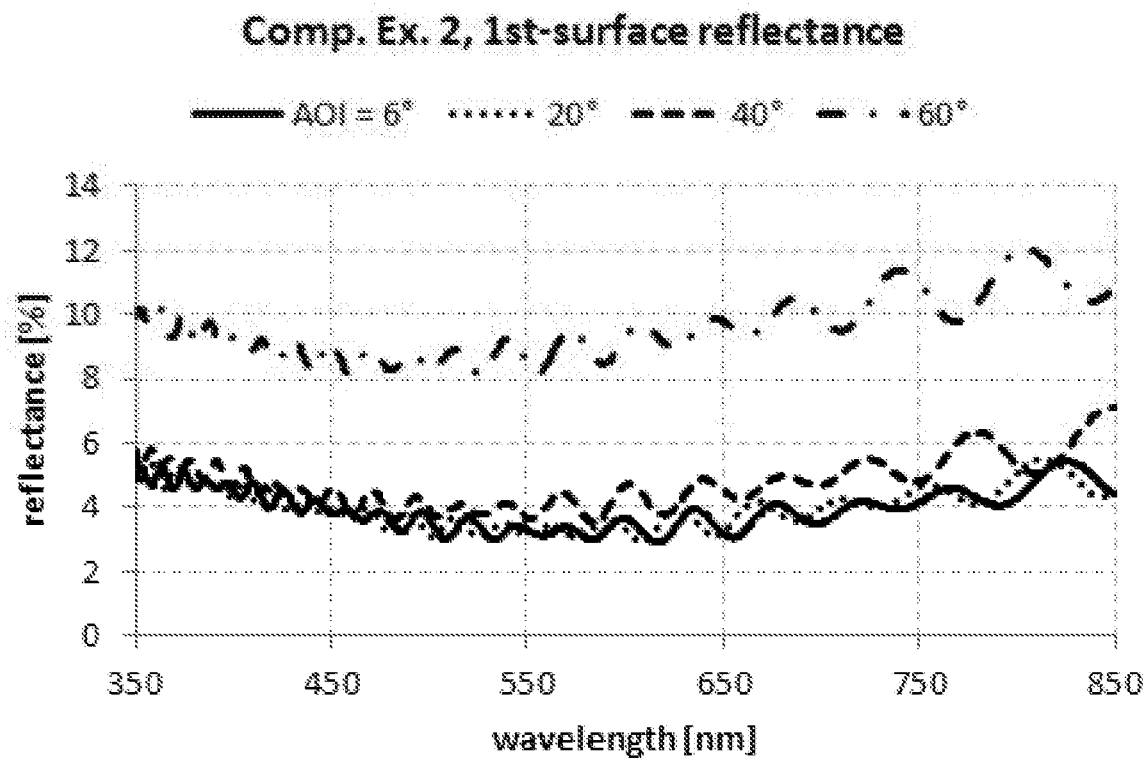
FIG. 15 shows reflectance spectra for Comparative Example 2.
Figure 16:
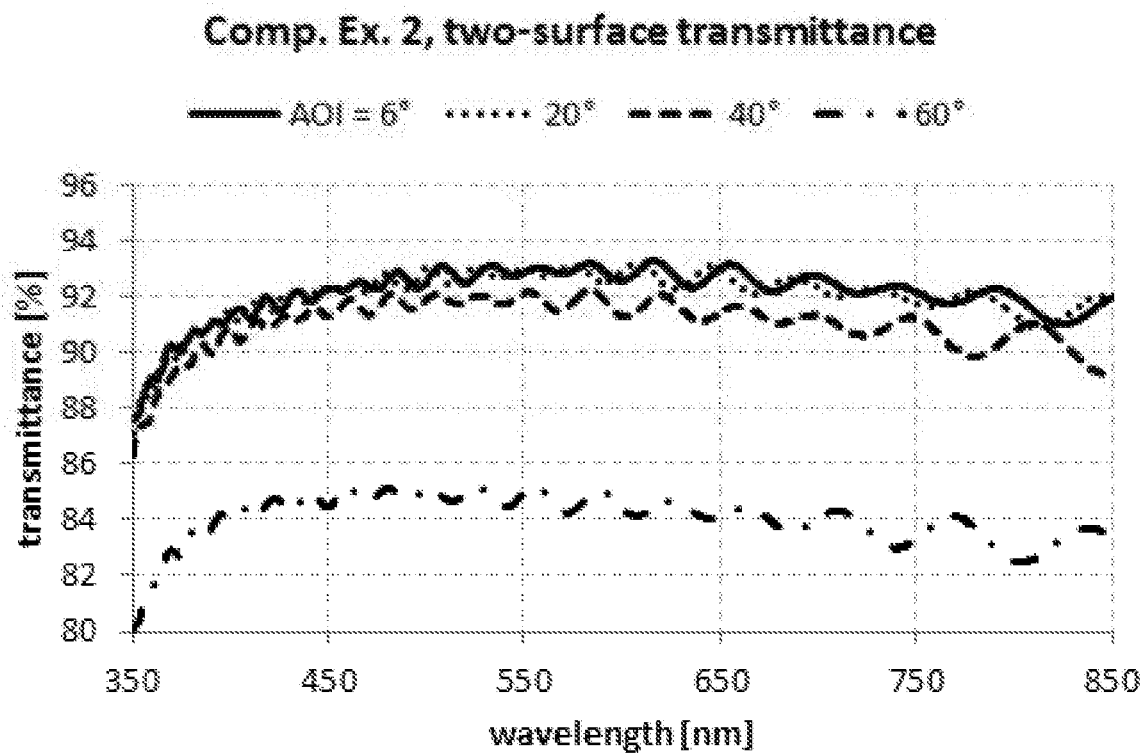
FIG. 16 shows transmittance spectra for Comparative Example 2.

FIG. 12 shows the coating design of Comparative Example 2 as a plot of Refractive Index vs. position. FIG. 13 shows detail for a part of the coating design of Comparative Example 2 as a plot of Refractive Index vs. position. FIG. 14 shows reflectance spectra for Comparative Example 2. FIG. 15 shows transmittance spectra for Comparative Example 2. FIG. 16 shows a plot of surface reflected D65 color vs. angle for Comparative Example 2. FIG. 14 and FIG. 15 are based on incident light passing right to left in FIG. 12.

Example 1

Figure 23:
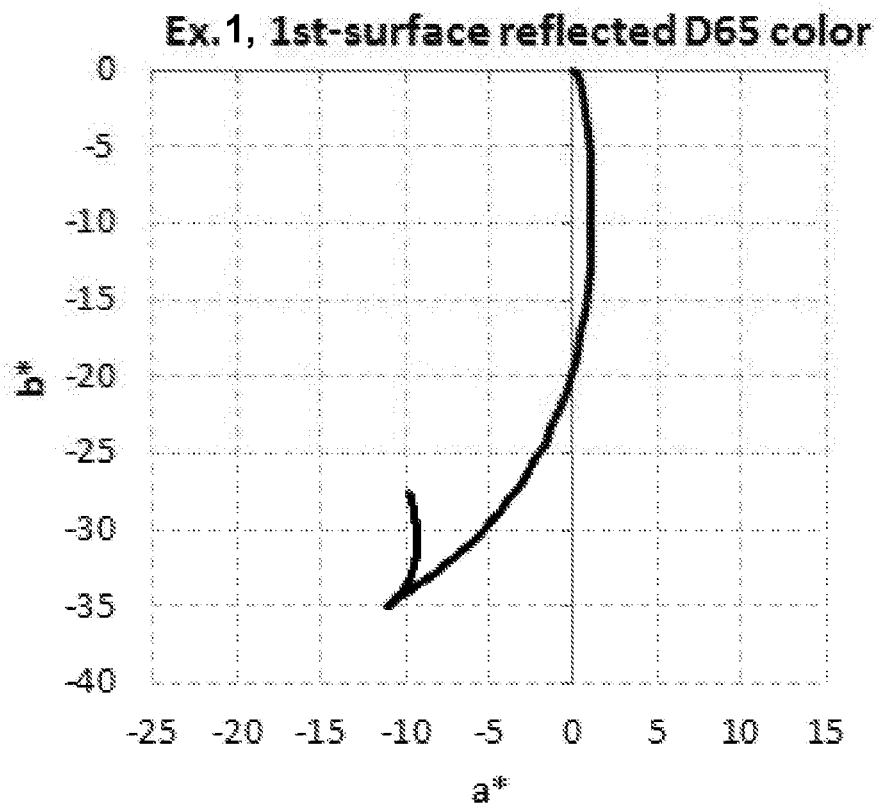
FIG. 23 shows a plot of surface reflected D65 color vs. angle for Example 1.

Example 1 comprises a hardcoated, chemically strengthened glass having a multilayer (non-gradient) structure generating high reflectance in between the substrate and a thick, high-hardness layer, together with a gradient-containing anti-reflective top portion to the hardcoating above the thick, high-hardness layer. This coating generates a 'blue' reflected color, a maximum visible reflectance around 70%, and a photopic average visible reflectance around 35%, at near-normal incidence. The 'blue' color is well controlled and maintained for all viewing angles between 0 and 90 degrees, which is illustrated in FIG. 23. The $1^{st}$-surface reflected color is between −35≤b*≤0 and −12≤a*≤2 for all viewing angles from 0 to 90 degrees.

Table 7 shows the structure of Example 1.

TABLE 7

| Example 1, Structure | | |
|---|---|---|
| Layer | Thickness (nm) | Refractive Index @550 nm |
| 5318 Glass | Substrate | 1.51 |
| AlOxNy | 105 | 2.006 |
| SiO2 | 50 | 1.481 |
| AlOxNy | 95 | 2.006 |
| SiO2 | 50 | 1.481 |
| AlOxNy | 85 | 2.006 |
| SiO2 | 50 | 1.481 |
| AlOxNy | 75 | 2.006 |
| SiO2 | 50 | 1.481 |
| AlOxNy | 65 | 2.006 |
| SiO2 | 45 | 1.481 |
| AlOxNy | 60 | 2.006 |
| SiO2 | 40 | 1.481 |
| AlOxNy | 2000 | 2.006 |
| Linear | 33 | Graded from |

TABLE 7-continued

| Example 1, Structure | | |
|---|---|---|
| Layer | Thickness (nm) | Refractive Index @550 nm |
| Gradient w/ RI slope of = −0.0155/nm | | 2.006 to 1.481 in steps of 1 nm |
| SiO2 | 80 | 1.481 |
| Air | Medium | 1 |

Table 8 shows 1-side reflected color, 2-side transmitted color, photopic average reflectance, and photopic average transmittance for Example 1.

TABLE 8

| Ex. 1: 1st-surface Reflectance | | | |
|---|---|---|---|
| Incident Angle (deg) | Photopic Average % R (D65) | Reflected a* (D65) | Reflected b* (D65) |
| 0 | 35.61 | −9.74 | −27.67 |
| 6 | 35.37 | −9.66 | −27.95 |
| 10 | 34.93 | −9.55 | −28.44 |
| 20 | 32.93 | −9.30 | −30.48 |
| 30 | 29.89 | −9.65 | −32.98 |
| 40 | 26.17 | −10.72 | −34.66 |
| 50 | 22.72 | −10.63 | −34.62 |
| 60 | 21.19 | −7.10 | −31.76 |
| 70 | 24.78 | −1.74 | −24.39 |
| 80 | 41.66 | 1.06 | −11.32 |
| 90 | 100 | 0 | 0 |

| Ex. 1: 2-surface Transmittance | | | |
|---|---|---|---|
| Incident Angle (deg) | Photopic Average % T (D65) | Transmitted a* (D65) | Transmitted b* (D65) |
| 0 | 62.61 | 5.96 | 25.64 |
| 6 | 62.85 | 5.87 | 25.79 |
| 10 | 63.27 | 5.72 | 26.04 |
| 20 | 65.16 | 5.22 | 26.84 |
| 30 | 68.04 | 4.86 | 26.96 |
| 40 | 71.49 | 4.64 | 25.09 |
| 50 | 74.36 | 3.84 | 21.42 |
| 60 | 74.27 | 2.15 | 16.87 |
| 70 | 66.52 | 0.39 | 12.18 |
| 80 | 42.97 | −0.38 | 7.29 |
| 90 | 0 | 0 | 0 |

Figure 17:
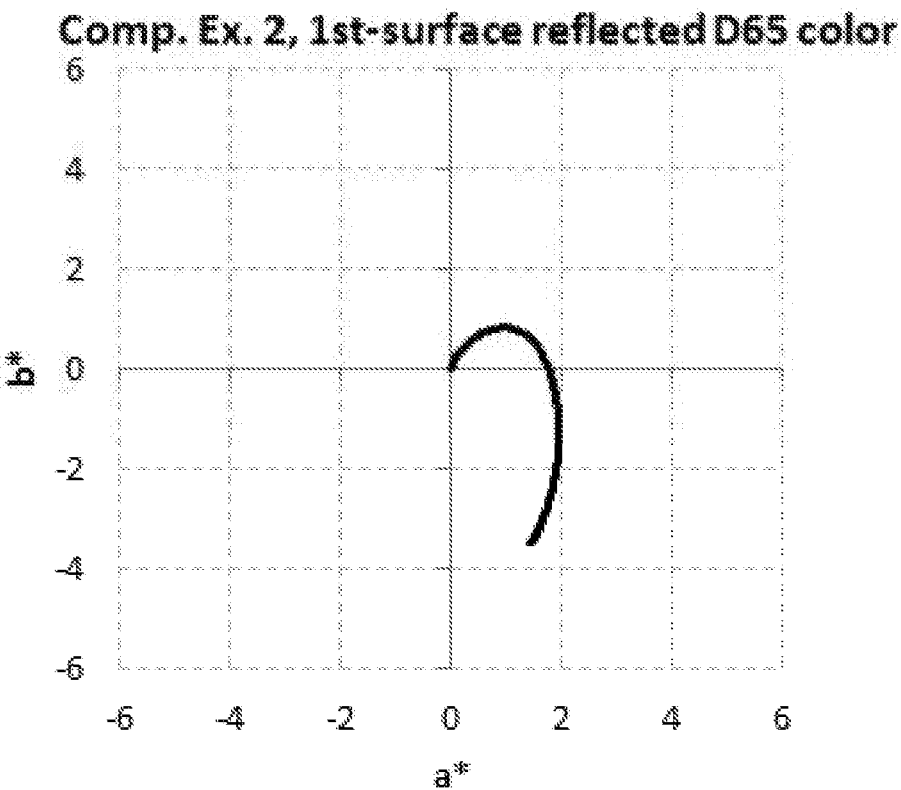
FIG. 17 shows a plot of surface reflected D65 color vs. angle for Comparative Example 2.
Figure 18:
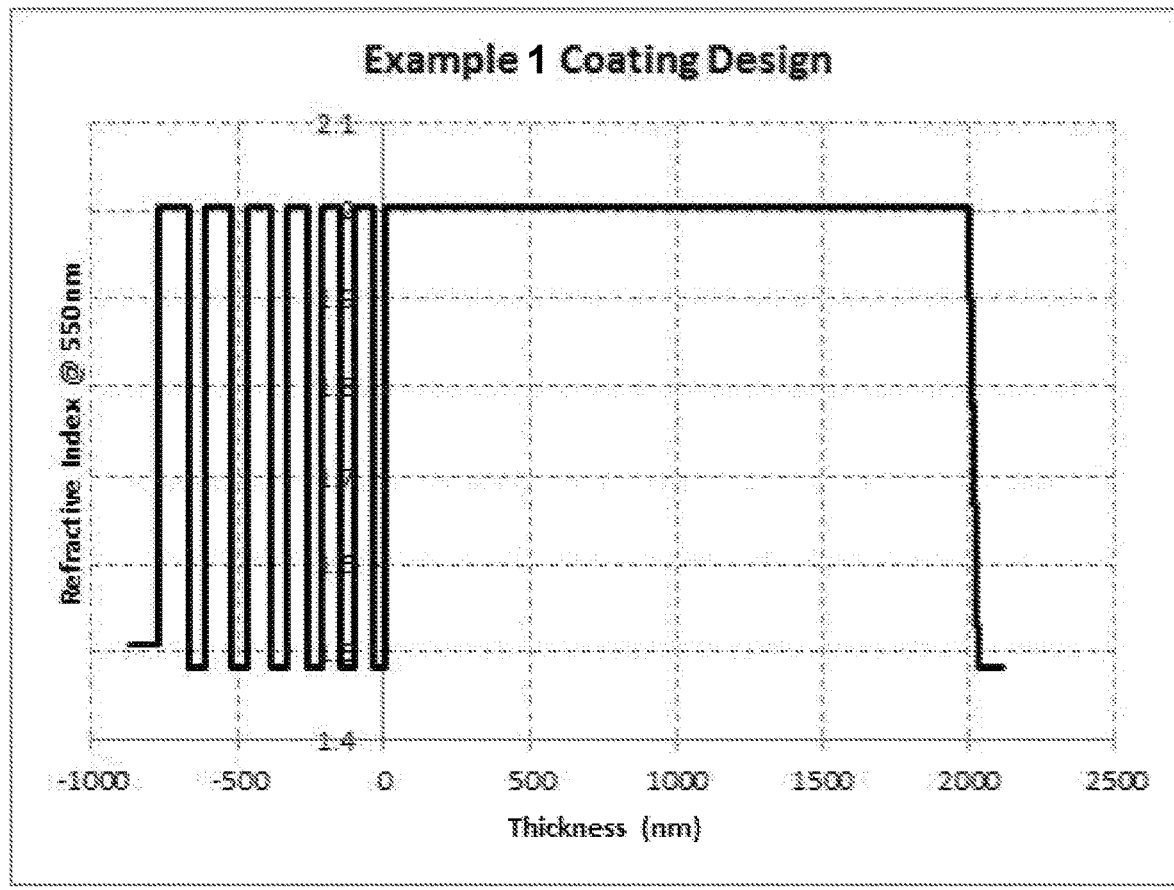
FIG. 18 shows a coating design for Example 1.
Figure 19:
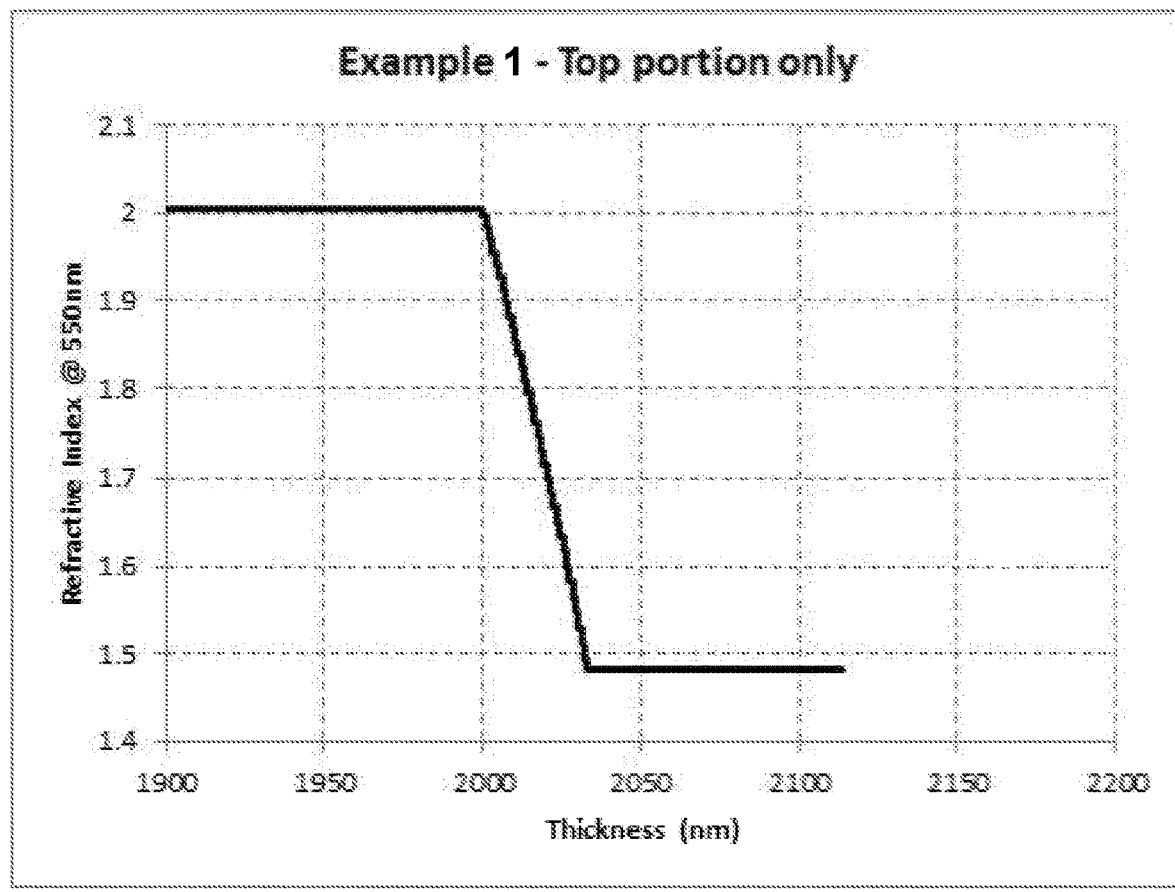
FIG. 19 shows a coating design for Example 1.
Figure 20:
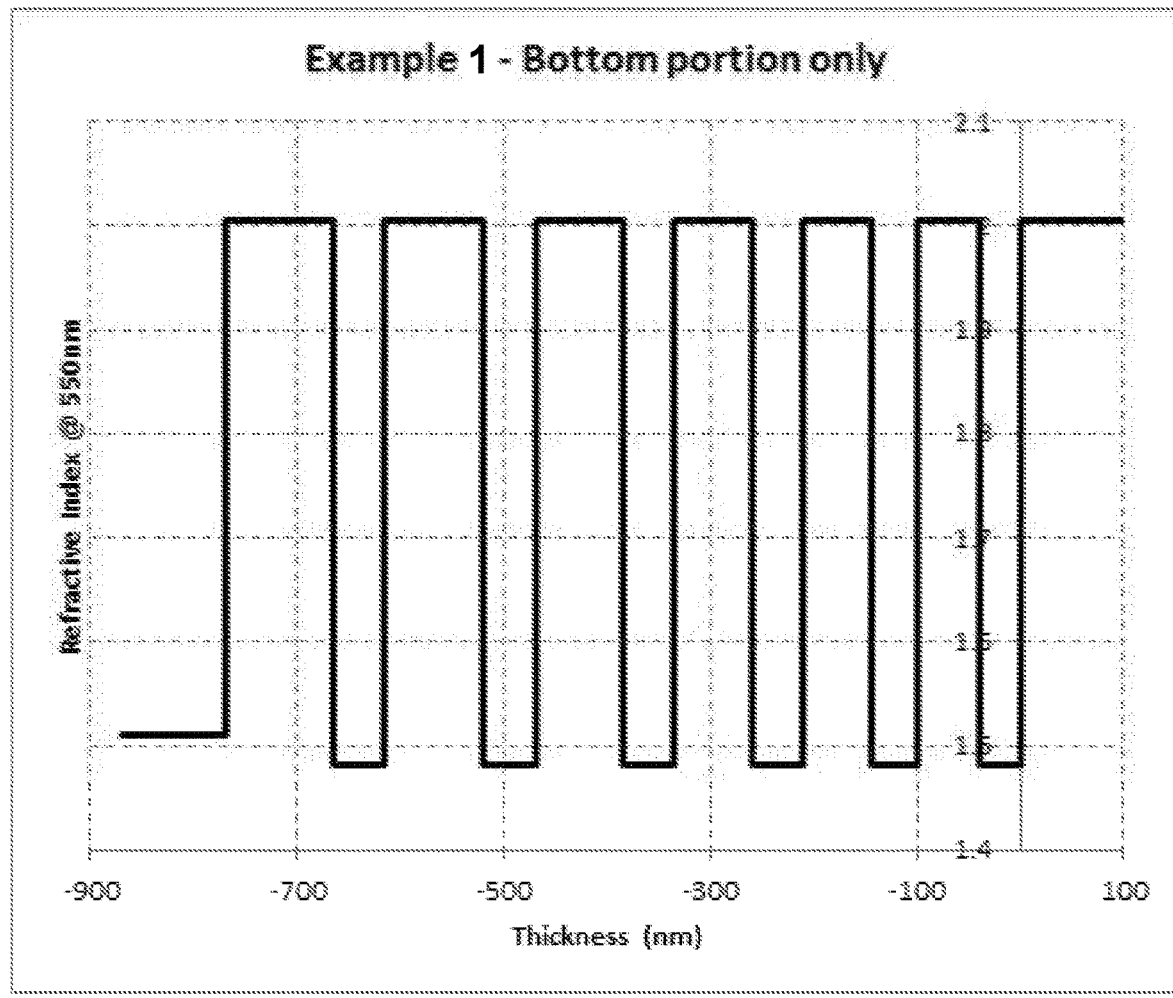
FIG. 20 shows a coating design for Example 1.
Figure 21:
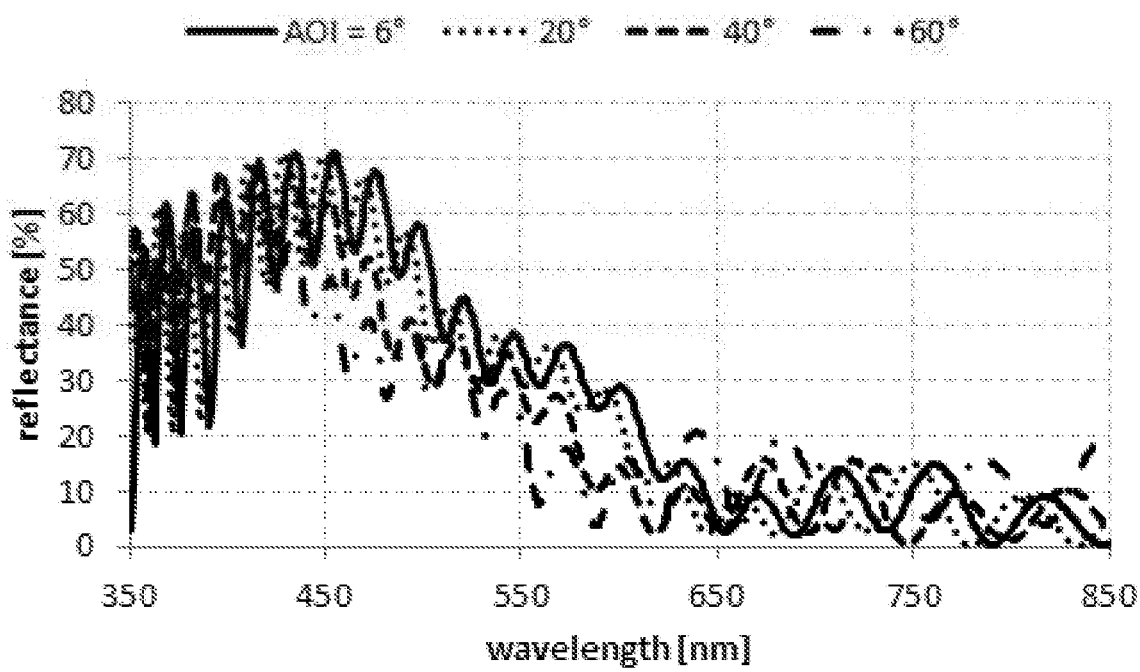
FIG. 21 shows reflectance spectra for Example 1.
Figure 22:
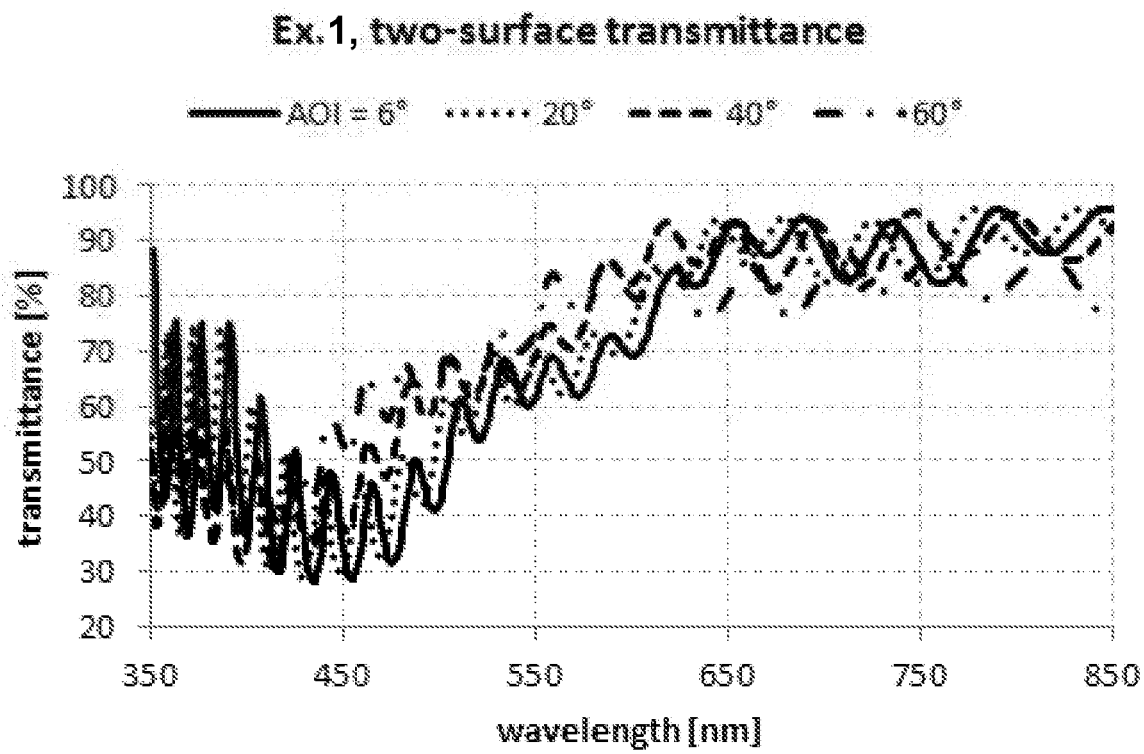
FIG. 22 shows transmittance spectra for Example 1.

FIG. 18 shows the coating design of Example 1 as a plot of Refractive Index vs. position. FIG. 19 shows detail for a part of the coating design of Example 1 as a plot of Refractive Index vs. position. FIG. 20 shows detail for a part of the coating design of Example 1 as a plot of Refractive Index vs. position. FIG. 21 shows reflectance spectra for Example 1. FIG. 22 shows transmittance spectra for Example 1. FIG. 23 shows a plot of surface reflected D65 color vs. angle for Example 1. FIG. 20 is based on incident light passing right to left in FIG. 17. Example 1 exhibits a multilayer interference stack having sharp interfaces from the substrate up to a thick hard coating layer, and a monotonic decrease in refractive index from the thick hard coating layer down to the external user surface.

Example 2

Figure 29:
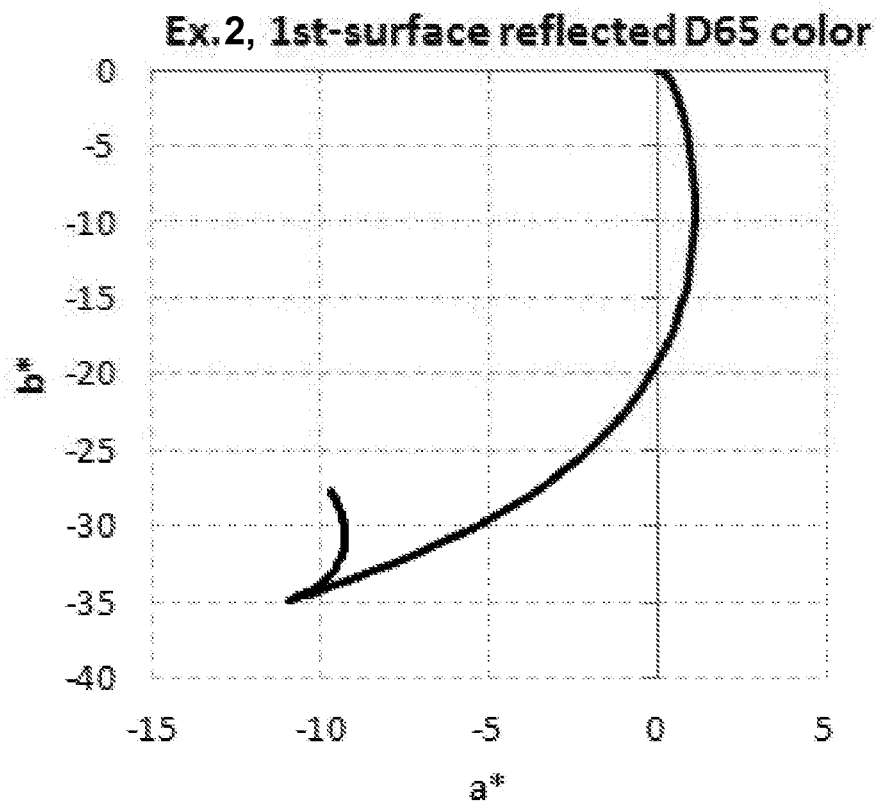
FIG. 29 shows a plot of surface reflected D65 color vs. angle for Example 2.

Example 2 comprises a hardcoated, chemically strengthened glass having a multilayer, gradient-containing structure generating high reflectance in between the substrate and a thick, high-hardness layer, together with a gradient-containing anti-reflective top portion to the hardcoating above the thick, high-hardness layer. Similar to Example 1, this coating generates a 'blue' reflected color, a maximum visible reflectance around 70%, and a photopic average visible reflectance around 35%, at near-normal incidence. The 'blue' color is well controlled and maintained for all viewing angles between 0 and 90 degrees, which is illustrated in FIG. 29. The 1$^{st}$-surface reflected color is between $-35 \leq b^* \leq 0$ and $-12 \leq a^* \leq 2$ for all viewing angles from 0 to 90 degrees.

Table 9 shows the structure of Example 2.

TABLE 9

Example 2, Structure

| Layer | Thickness (nm) | Refractive Index @550 nm |
|---|---|---|
| 5318 Glass | Substrate | 1.51 |
| Linear Gradient w/RI slope of = +0.031/nm | 16 | Graded from 1.51 to 2.006 in steps of 0.5 nm |
| AlOxNy | 82 | 2.006 |
| Linear Gradient w/RI slope of = −0.0318/nm | 16.5 | Graded from 2.006 to 1.481 in steps of 0.5 nm |
| SiO2 | 40 | 1.481 |
| Linear Gradient w/RI slope of = +0.0318/nm | 16.5 | Graded from 1.481 to 2.006 in steps of 0.5 nm |
| AlOxNy | 72 | 2.006 |
| Linear Gradient w/RI slope of = −0.0318/nm | 16.5 | Graded from 2.006 to 1.481 in steps of 0.5 nm |
| SiO2 | 40 | 1.481 |
| Linear Gradient w/RI slope of = +0.0318/nm | 16.5 | Graded from 1.481 to 2.006 in steps of 0.5 nm |
| AlOxNy | 62 | 2.006 |
| Linear Gradient w/RI slope of = −0.0318/nm | 16.5 | Graded from 2.006 to 1.481 in steps of 0.5 nm |
| SiO2 | 40 | 1.481 |
| Linear Gradient w/RI slope of = +0.0318/nm | 16.5 | Graded from 1.481 to 2.006 in steps of 0.5 nm |
| AlOxNy | 52 | 2.006 |
| Linear Gradient w/RI slope of = −0.0318/nm | 16.5 | Graded from 2.006 to 1.481 in steps of 0.5 nm |
| SiO2 | 40 | 1.481 |
| Linear Gradient w/RI slope of = +0.0318/nm | 16.5 | Graded from 1.481 to 2.006 in steps of 0.5 nm |
| AlOxNy | 42 | 2.006 |
| Linear Gradient w/RI slope of = −0.0318/nm | 16.5 | Graded from 2.006 to 1.481 in steps of 0.5 nm |
| SiO2 | 35 | 1.481 |
| Linear Gradient w/RI slope of = +0.0318/nm | 16.5 | Graded from 1.481 to 2.006 in steps of 0.5 nm |
| AlOxNy | 37 | 2.006 |
| Linear Gradient w/RI slope of = −0.0318/nm | 16.5 | Graded from 2.006 to 1.481 in steps of 0.5 nm |
| SiO2 | 30 | 1.481 |
| Linear Gradient w/RI slope of = +0.0318/nm | 16.5 | Graded from 1.481 to 2.006 in steps of 0.5 nm |
| AlOxNy | 2000 | 2.006 |
| Linear Gradient w/RI slope of = −0.0155/nm | 33 | Graded from 2.006 to 1.481 in steps of 1 nm |
| SiO2 | 68 | 1.481 |
| Air | Medium | 1 |

Table 10 shows 1-side reflected color, 2-side transmitted color, photopic average reflectance, and photopic average transmittance for Example 2.

TABLE 10

Example 2, Reflected and Transmitted Color

Ex. 2: 1st-surface Reflectance

| Incident Angle (deg) | Photopic Average % R (D65) | Reflected a* (D65) | Reflected b* (D65) |
|---|---|---|---|
| 0 | 35.61 | −9.74 | −27.67 |
| 6 | 35.37 | −9.66 | −27.95 |
| 10 | 34.93 | −9.55 | −28.44 |

TABLE 10-continued

Example 2, Reflected and Transmitted Color

| 20 | 32.93 | −9.30 | −30.48 |
| 30 | 29.89 | −9.65 | −32.98 |
| 40 | 26.17 | −10.72 | −34.66 |
| 50 | 22.72 | −10.63 | −34.62 |
| 60 | 21.19 | −7.10 | −31.76 |
| 70 | 24.78 | −1.74 | −24.39 |
| 80 | 41.66 | 1.06 | −11.32 |
| 90 | 100 | 0 | 0 |

Ex. 2: 2-surface Transmittance

| Incident Angle (deg) | Photopic Average % T (D65) | Transmitted a* (D65) | Transmitted b* (D65) |
|---|---|---|---|
| 0 | 62.61 | 5.96 | 25.64 |
| 6 | 62.85 | 5.87 | 25.79 |
| 10 | 63.27 | 5.72 | 26.04 |
| 20 | 65.16 | 5.22 | 26.84 |
| 30 | 68.04 | 4.86 | 26.96 |
| 40 | 71.49 | 4.64 | 25.09 |
| 50 | 74.36 | 3.84 | 21.42 |
| 60 | 74.27 | 2.15 | 16.87 |
| 70 | 66.52 | 0.39 | 12.18 |
| 80 | 42.97 | −0.38 | 7.29 |
| 90 | 0 | 0 | 0 |

Figure 24:
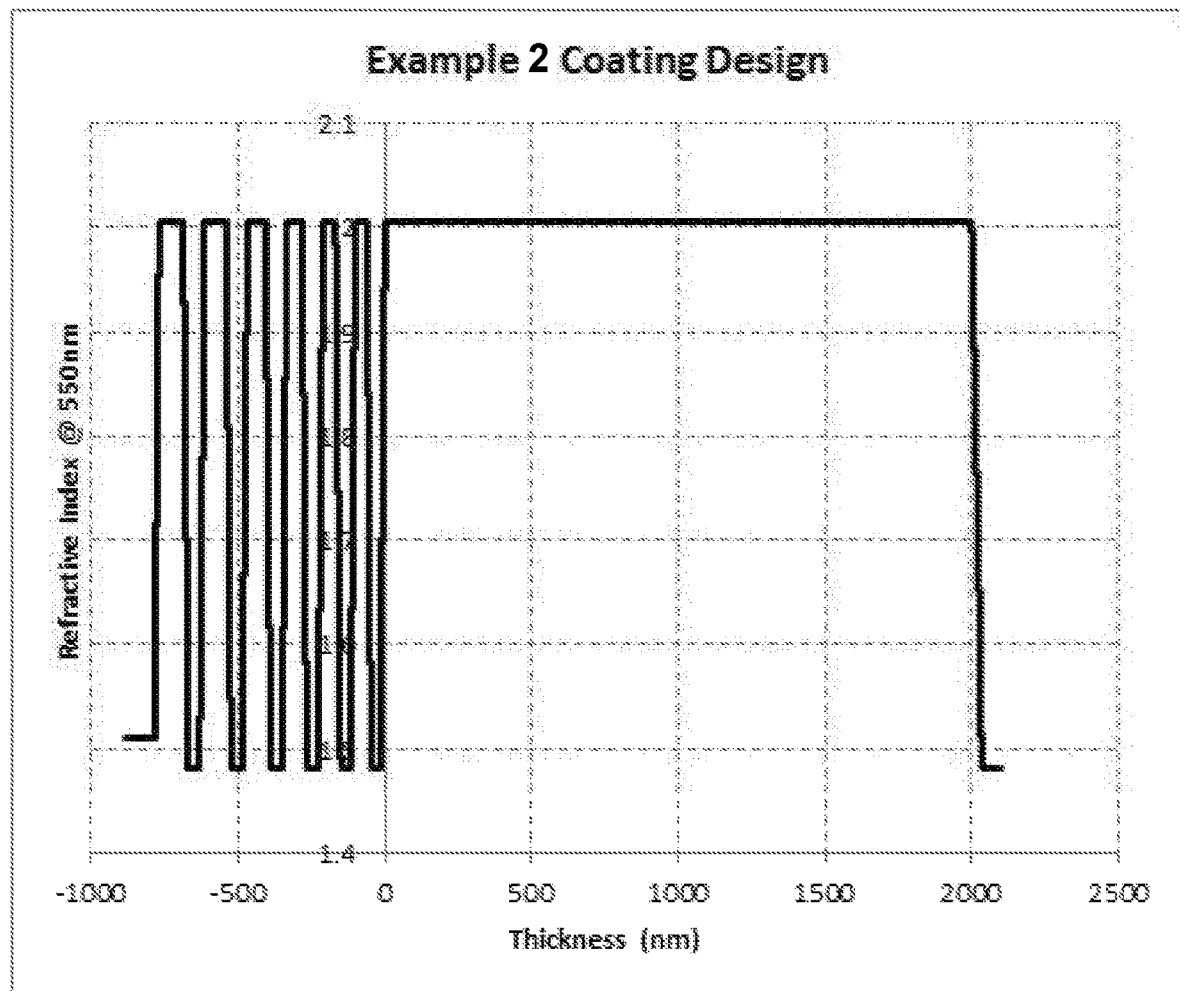
FIG. 24 shows a coating design for Example 2.
Figure 25:
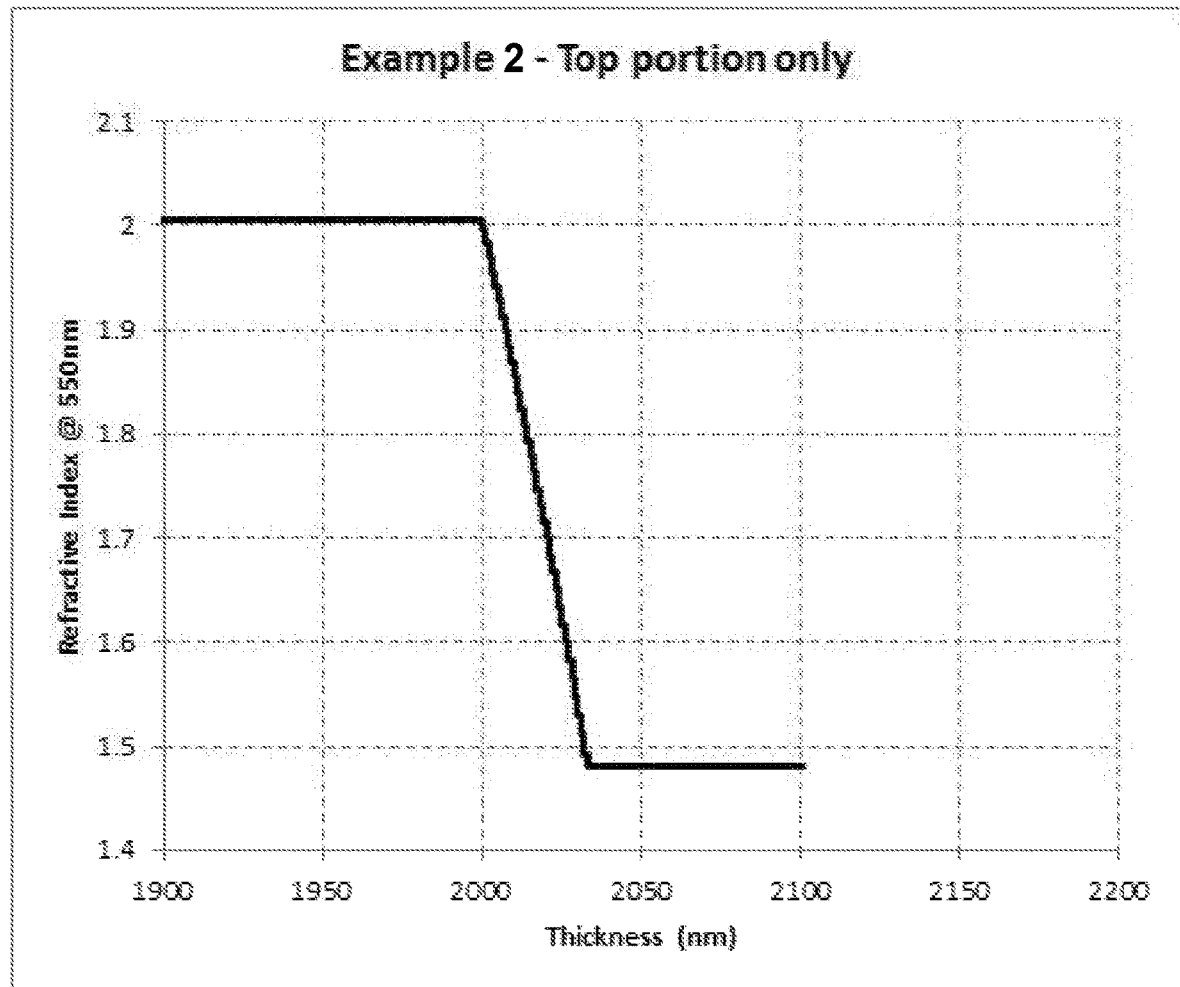
FIG. 25 shows a coating design for Example 2.
Figure 26:
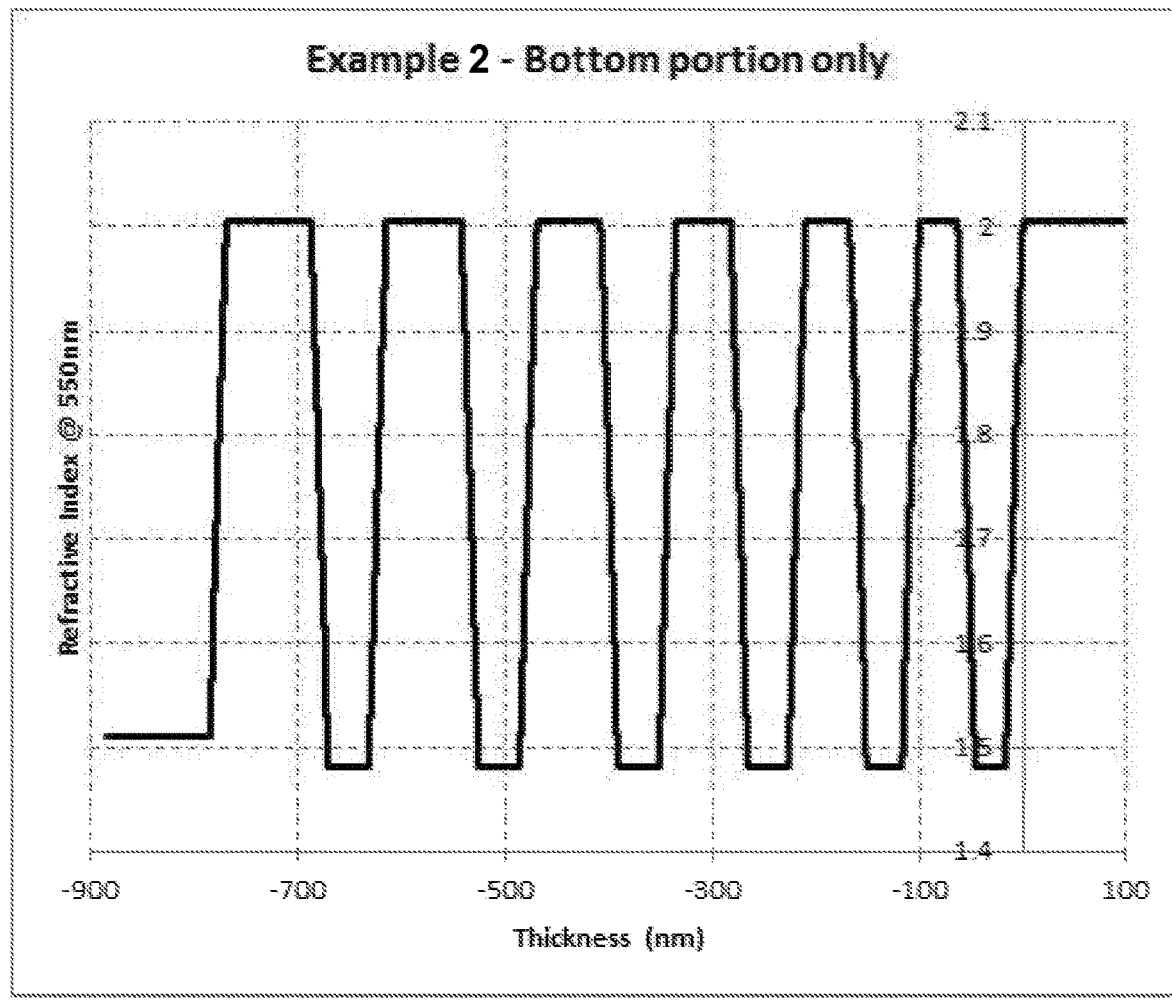
FIG. 26 shows a coating design for Example 2.
Figure 27:
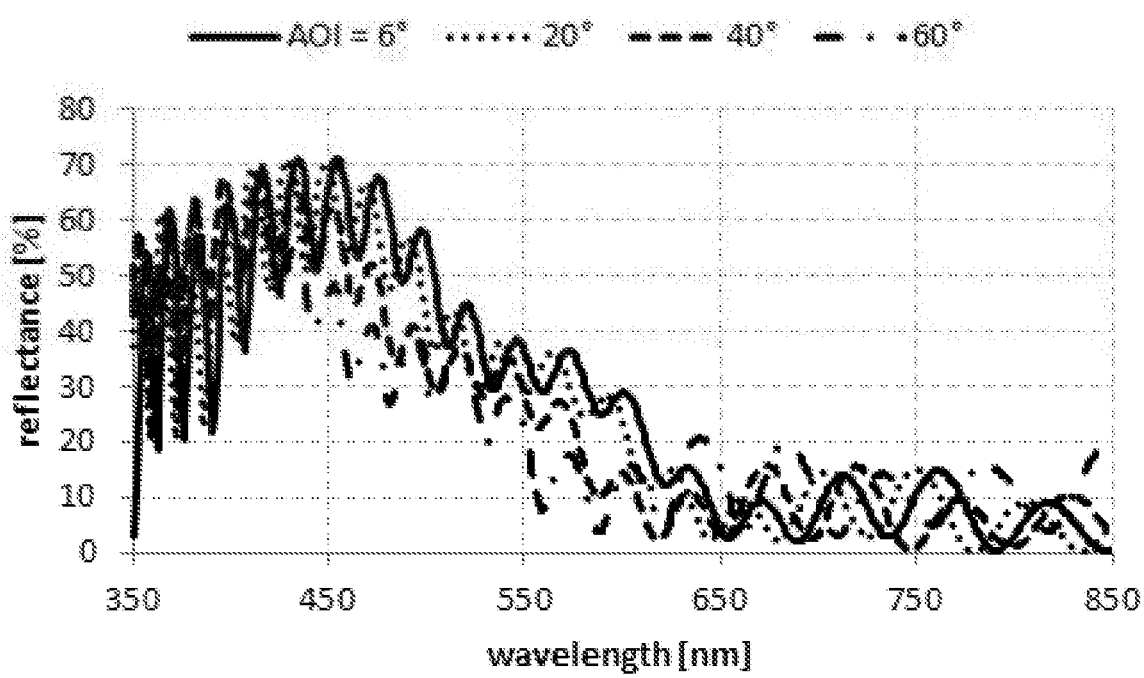
FIG. 27 shows reflectance spectra for Example 2.
Figure 28:
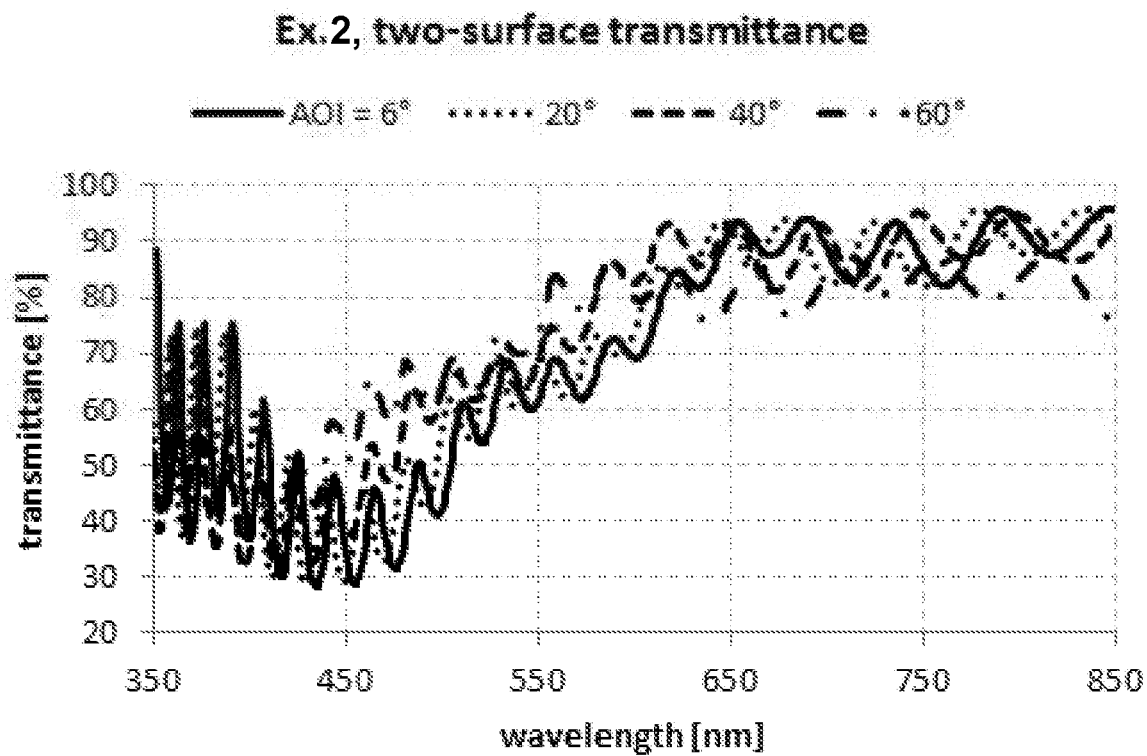
FIG. 28 shows transmittance spectra for Example 2.

FIG. 24 shows the coating design of Example 2 as a plot of Refractive Index vs. position. FIG. 25 shows detail for a part of the coating design of Example 2 as a plot of Refractive Index vs. position. FIG. 26 shows detail for a part of the coating design of Example 2 as a plot of Refractive Index vs. position. FIG. 27 shows reflectance spectra for Example 2. FIG. 28 shows transmittance spectra for Example 2. FIG. 29 shows a plot of surface reflected D65 color vs. angle for Example 2. FIG. 27 and FIG. 29 are based on incident light passing right to left in FIG. 24. Example 2 exhibits a gradient portion having alternating high and low refractive indices, with a moderate refractive index slope (0.31/nm or 0.318/nm) between the high and low refractive indices, from the substrate up to a thick hard coating layer. Example 2 also exhibits a monotonic decrease in refractive index from the thick hard coating layer down to the external user surface.

Example 3

Figure 34:
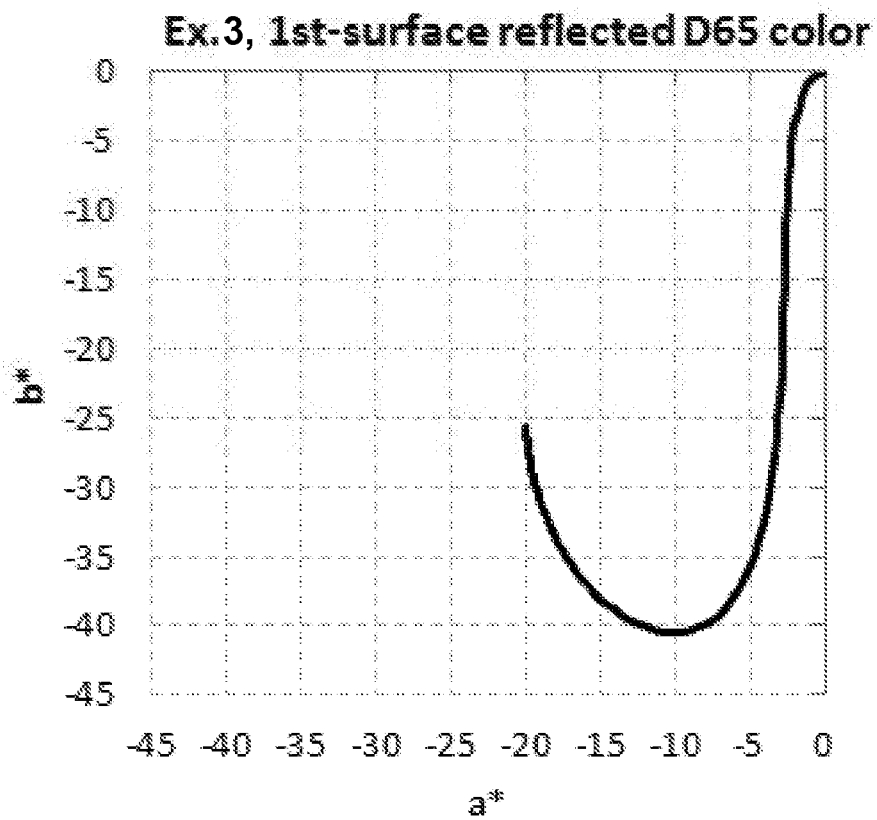
FIG. 34 shows a plot of surface reflected D65 color vs. angle for Example 3.

Example 3 comprises a hardcoated, chemically strengthened glass having a gradient structure generating low reflectance in between the substrate and a thick, high-hardness layer, together with a multilayer, non-gradient top portion generating high reflectance above the thick, high-hardness layer. This coating also generates a 'blue' reflected color, having a maximum visible reflectance around 58%, and a photopic average visible reflectance around 33%, at near-normal incidence. The 'blue' color is well controlled and maintained for all viewing angles between 0 and 90 degrees, which is illustrated in FIG. 34. The 1$^{st}$-surface reflected color is between $-41 \leq b^* \leq 0$ and $-20 \leq a^* \leq 0$ for all viewing angles from 0 to 90 degrees.

Table 11 shows the structure of Example 3.

TABLE 11

Example 3, Structure

| Layer | Thickness (nm) | Refractive Index @550 nm |
|---|---|---|
| 5318 Glass | Substrate | 1.51 |
| Linear Gradient w/ RI slope of = +0.0008/nm | 640 | Graded from 1.51 to 2.006 in steps of 20 nm |
| AlOxNy | 2000 | 2.006 |
| SiO2 | 74.3 | 1.481 |
| AlOxNy | 54.8 | 2.006 |
| SiO2 | 74.3 | 1.481 |
| AlOxNy | 54.8 | 2.006 |
| SiO2 | 5 | 1.481 |
| Air | Medium | 1 |

Table 12 shows 1-side reflected color, 2-side transmitted color, photopic average reflectance, and photopic average transmittance for Example 3.

TABLE 12

Ex. 3: 1st-surface Reflectance

| Incident Angle (deg) | Photopic Average % R (D65) | Reflected a* (D65) | Reflected b* (D65) |
|---|---|---|---|
| 0 | 32.94 | −19.99 | −25.61 |
| 6 | 32.66 | −19.96 | −26.00 |
| 10 | 32.15 | −19.90 | −26.68 |
| 20 | 29.84 | −19.40 | −29.70 |
| 30 | 26.24 | −17.83 | −34.08 |
| 40 | 22.07 | −14.53 | −38.50 |
| 50 | 18.70 | −9.88 | −40.52 |
| 60 | 18.04 | −5.59 | −37.13 |
| 70 | 23.34 | −3.20 | −26.41 |
| 80 | 42.46 | −2.57 | −10.85 |
| 90 | 100 | 0 | 0 |

Ex. 3: 2-surface Transmittance

| Incident Angle (deg) | Photopic Average % T (D65) | Transmitted a* (D65) | Transmitted b* (D65) |
|---|---|---|---|
| 0 | 65.14 | 10.95 | 20.98 |
| 6 | 65.41 | 10.84 | 21.20 |
| 10 | 65.88 | 10.64 | 21.59 |
| 20 | 68.08 | 9.64 | 23.10 |
| 30 | 71.48 | 7.83 | 24.61 |
| 40 | 75.36 | 5.35 | 24.83 |
| 50 | 78.20 | 2.86 | 22.65 |
| 60 | 77.42 | 1.19 | 18.06 |
| 70 | 68.56 | 0.72 | 12.24 |
| 80 | 43.91 | 1.08 | 6.73 |
| 90 | 0 | 0 | 0 |

Figure 30:
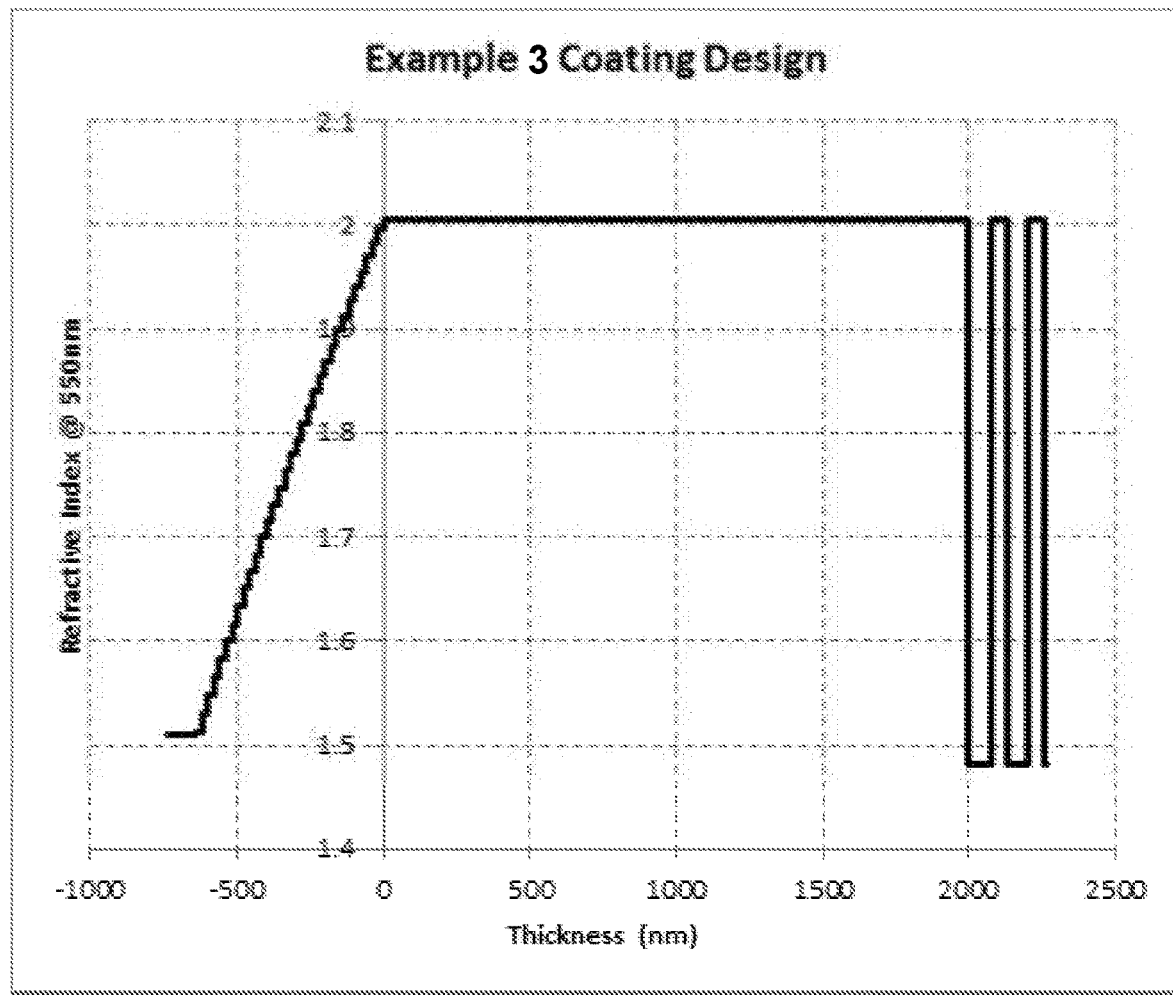
FIG. 30 shows a coating design for Example 3.
Figure 31:
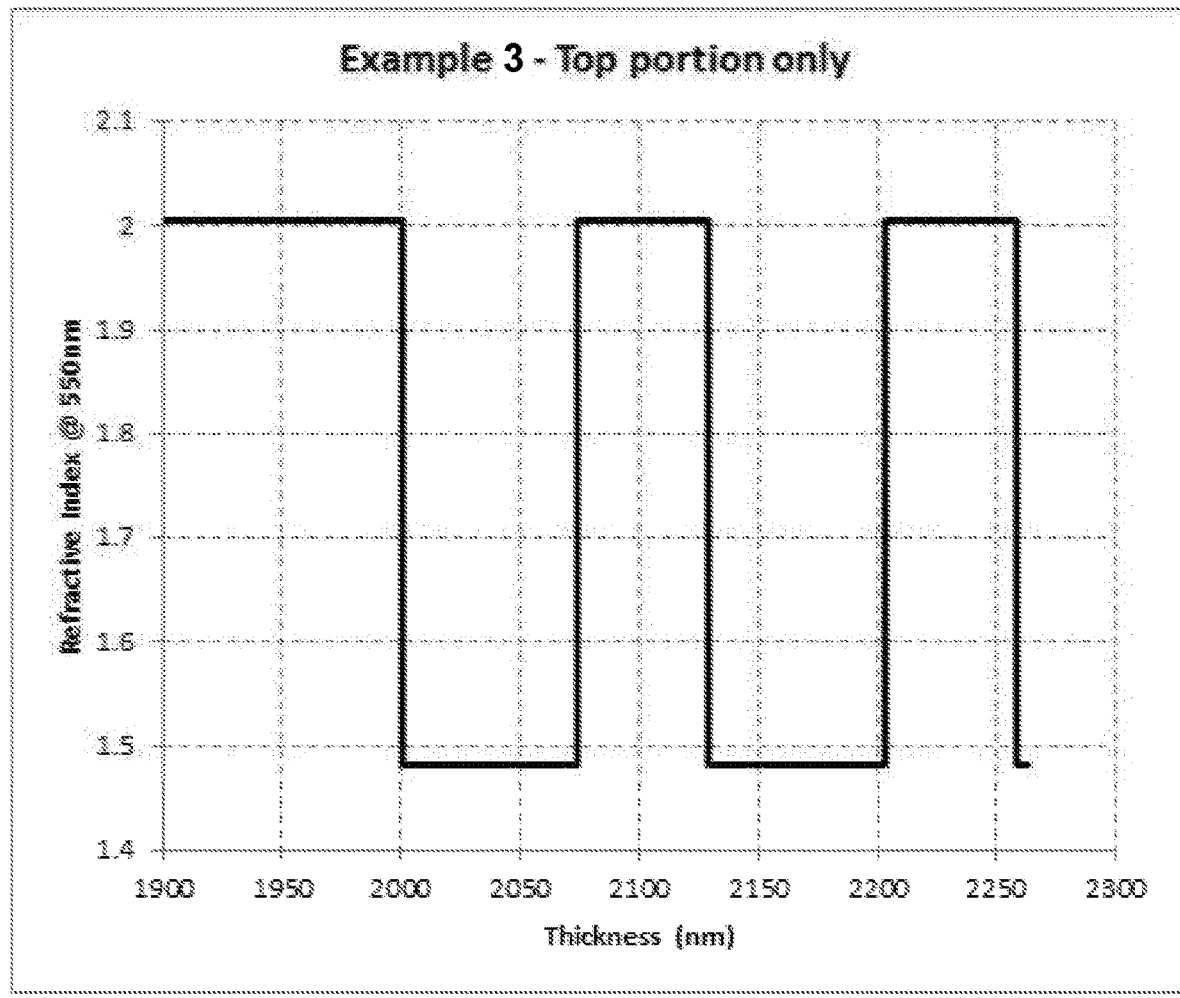
FIG. 31 shows a coating design for Example 3.
Figure 32:
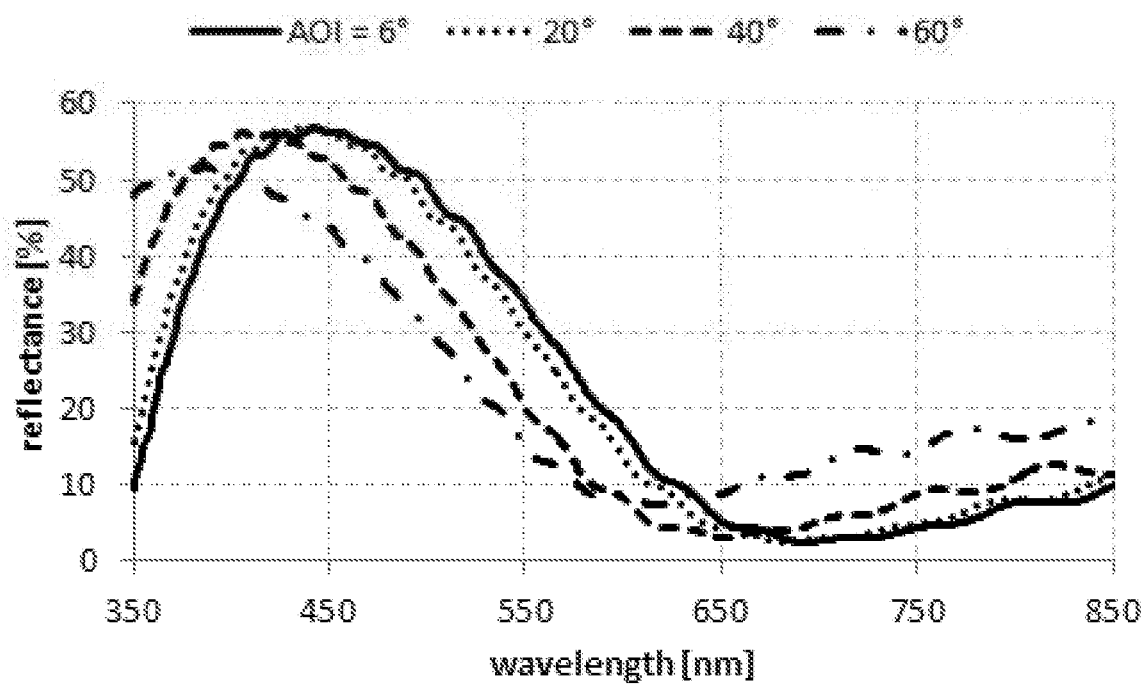
FIG. 32 shows reflectance spectra for Example 3.
Figure 33:
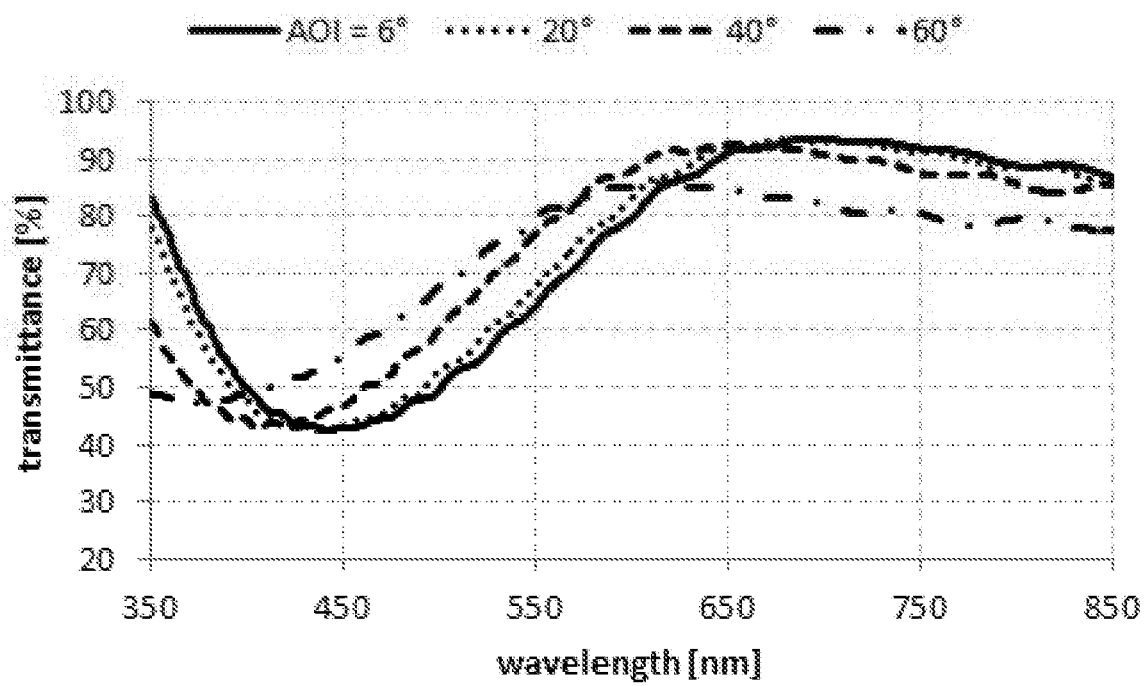
FIG. 33 shows transmittance spectra for Example 3.

FIG. 30 shows the coating design of Example 3 as a plot of Refractive Index vs. position. FIG. 31 shows detail for a part of the coating design of Example 3 as a plot of Refractive Index vs. position. FIG. 32 shows reflectance spectra for Example 3. FIG. 33 shows transmittance spectra for Example 3. FIG. 34 shows a plot of surface reflected D65 color vs. angle for Example 3. FIG. 32 and FIG. 34 are based on incident light passing right to left in FIG. 30. Example 3 exhibits a monotonic increase in refractive index from the substrate up to a thick hard coating layer, and a multilayer interference stack with sharp interfaces from the thick hard coating layer to the external user surface.

Example 4

Example 4 comprises a hardcoated, chemically strengthened glass, where the hardcoat is an all-gradient design. Example 6 was actually fabricated, and evaluated for hardness.

Figure 38:
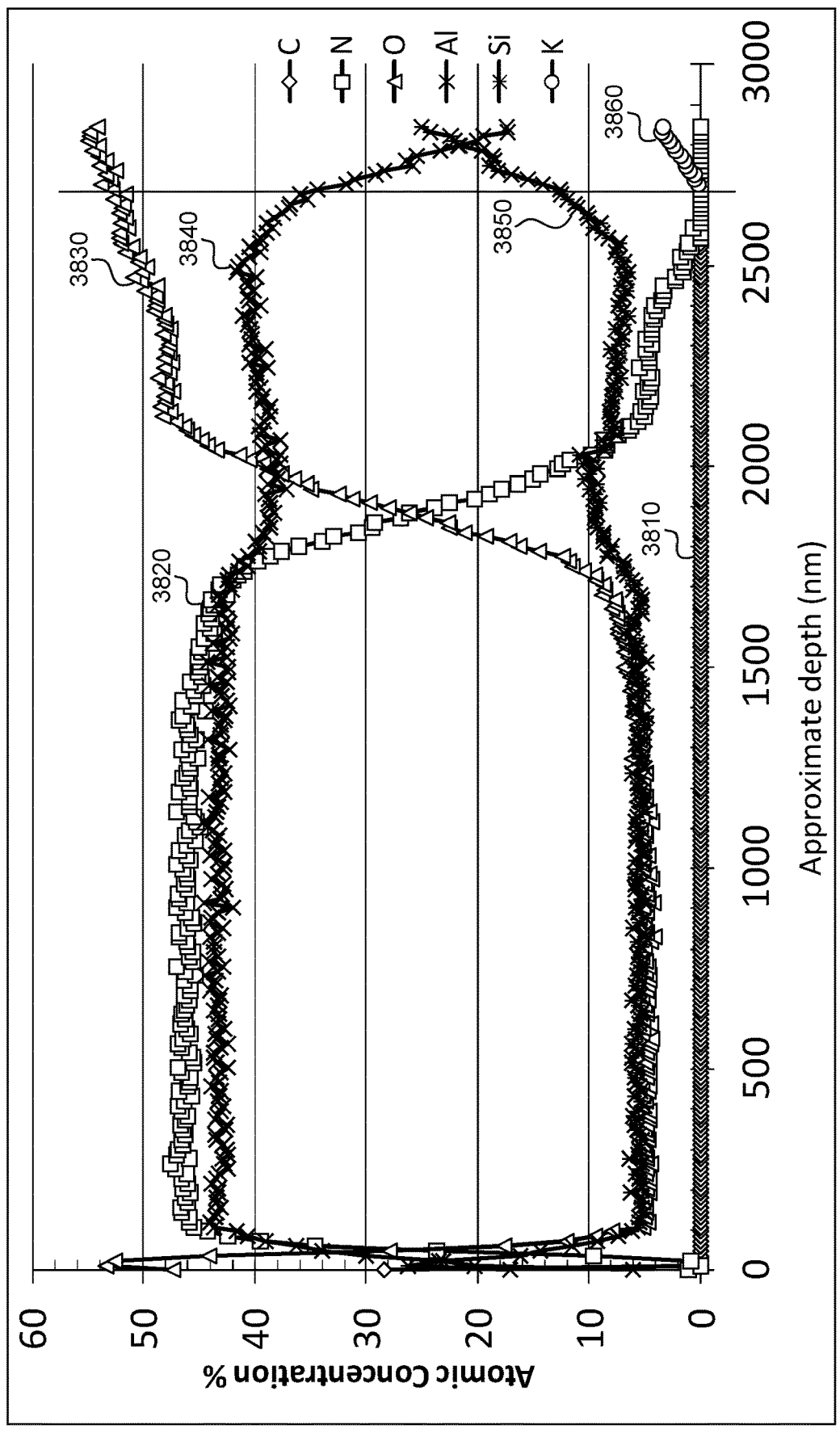
FIG. 38 shows the composition of the hardcoat of Example 4.

FIG. 38 shows the composition of the hardcoat of Example 4, in terms of atomic concentration of different elements. Line 3810 shows elemental carbon content. Line 3820 shows elemental nitrogen content. Line 3830 shows elemental oxygen content. Line 3840 shows elemental aluminum content. Line 3850 shows elemental silicon content. Line 3860 shows elemental potassium content.

Figure 39:
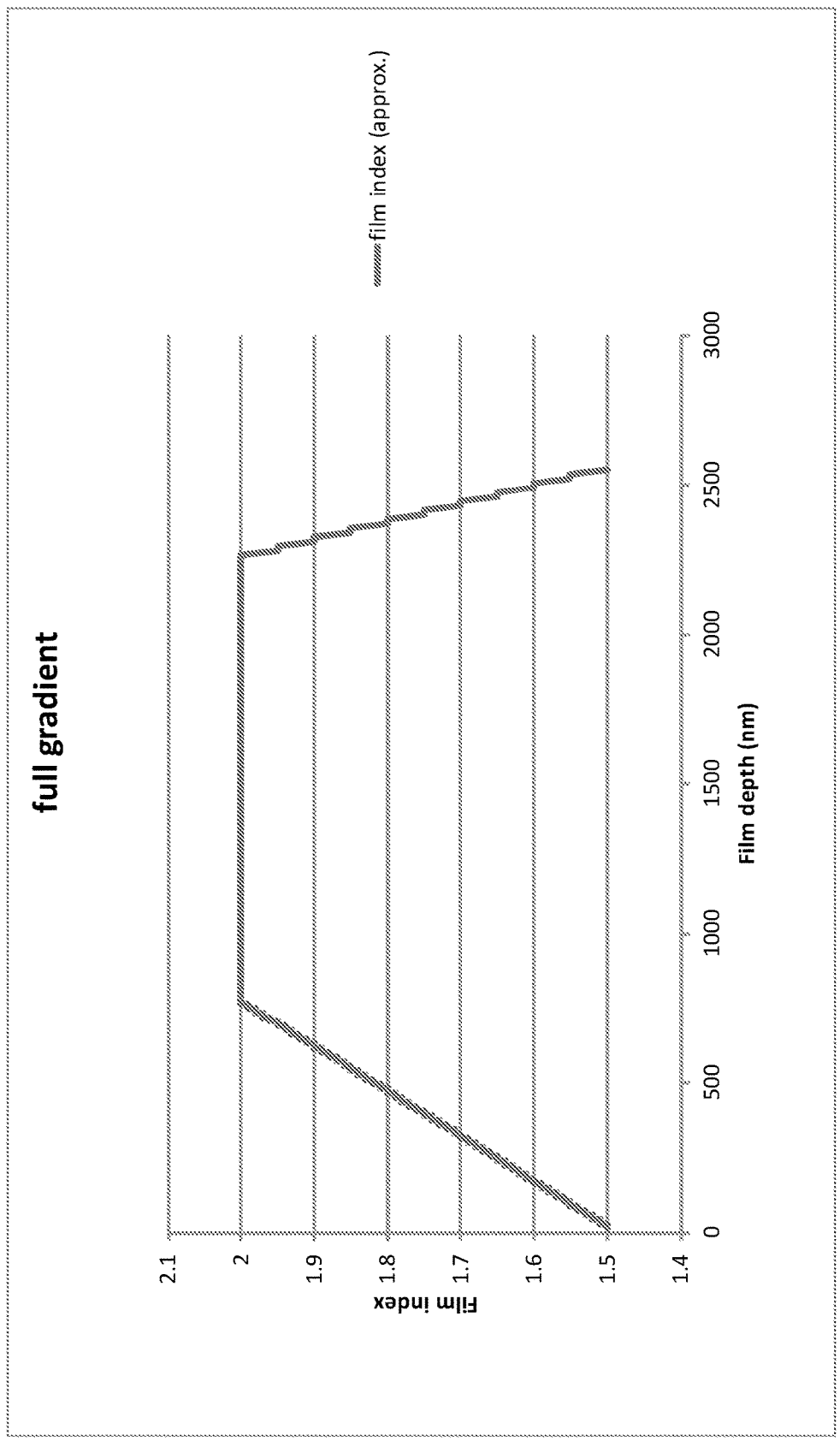
FIG. 39 shows a refractive index profile for the hardcoat of Example 4.

FIG. 39 shows a refractive index profile for the hardcoat of Example 4. FIG. 39 was generated based on data measurement at limited points through the gradient, which confirm the intended refractive index profile that was used to determine the desired atomic concentration of elements at various positions.

The highest absolute value of the slope of the refractive index in Example 4 was 0.0017/nm. The maximum hardness of the article of Example 4 was measured to be 14.9 GPa. Example 4 demonstrates an all-gradient hardcoat having a high hardness.

It will be apparent to those skilled in the art that various modifications and variations can be made without departing from the spirit or scope of the disclosure.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

Directional terms as used herein—for example up, down, right, left, front, back, top, bottom—are made only with reference to the figures as drawn and are not intended to imply absolute orientation.

As used herein, the transitional term "comprising", which is synonymous with "including," "containing," or "characterized by," is inclusive or open-ended and does not exclude additional, unrecited elements or method steps. The transitional phrase "consisting of" excludes any element, step, or ingredient not specified in the list following "consisting of." The transitional phrase "consisting essentially of" limits scope to specified materials or steps "and those that do not materially affect the basic and novel characteristic(s)" set forth in the claims.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The invention claimed is:

1. An article comprising:
a substrate comprising a first major surface; and
an optical coating disposed over the first major surface, the optical coating comprising:
 a second major surface opposite the first major surface,
 a thickness in a direction normal to the second major surface, and
 a first gradient portion,
wherein:
 a refractive index of the optical coating varies along a thickness of the optical coating between the first major surface and the second major surface;
 the difference between the maximum refractive index of the first gradient portion and the minimum refractive index of the first gradient portion is 0.1 or greater;
 the absolute value of the slope of the refractive index of the first gradient portion is 0.1/nm or less everywhere along the thickness of the first gradient portion;
wherein the article exhibits:
 an average single-surface reflectance of 15% to 98% over the wavelength range 400 nm-700 nm, measured at the second major surface; and
 a maximum hardness in the range from about 10 GPa to about 30 GPa, wherein maximum hardness is measured on the second major surface by indenting the second major surface with a Berkovich indenter to form an indent comprising an indentation depth of about 100 nm or more from the surface of the second major surface;
wherein slope is measured along the thickness over a refractive index change of 0.04.

2. The article of claim 1, wherein the difference between the maximum refractive index of the first gradient portion and the minimum refractive index of the first gradient portion is 0.3 or greater.

3. The article of claim 1, wherein the article exhibits an average transmittance of 5% to 90%, measured at the second major surface.

4. The article of claim 1, wherein:
everywhere along the thickness of the first gradient portion, the absolute value of the slope of the refractive index of the optical coating is 0.001/nm to 0.02/nm.

5. The article of claim 1, wherein the optical coating further comprises a high hardness portion, wherein:
 the thickness of the high hardness portion is 200 nm or more;
 the average index of refraction in the high hardness portion is 1.6 or more; and
 the maximum hardness of the high hardness portion is 10 GPa or more, wherein maximum hardness is measured by indenting the thick high hardness portion with a Berkovich indenter to form an indent comprising an indentation depth of about 100 nm or more.

6. The article of claim 5, wherein for 95% or more of the thickness of the high hardness portion, the difference between the maximum refractive index of the high hardness portion and the minimum refractive index of the high hardness portion is 0.05 or less.

7. The article of claim 5, wherein:
everywhere along the thickness of the high hardness portion, the difference between the maximum refractive index of the high hardness portion and the minimum refractive index of the high hardness portion is 0.05 or less.

8. The article of claim 5, wherein the optical coating comprises, in order, along the direction of the thickness from the second major surface toward the first major surface:
 the first gradient portion; and
 the high hardness portion in contact with the first gradient portion;
 wherein, where the high hardness portion contacts the first gradient portion, the difference between the refractive index of the high hardness portion and the maximum refractive index of the first gradient portion is 0.05 or less.

9. The article of claim 5, wherein the optical coating further comprises a second gradient portion disposed between the high hardness portion and the substrate, wherein the second gradient portion is in contact with the high hardness portion, and wherein:
 the difference between the maximum refractive index of the second gradient portion and the minimum refractive index of the second gradient portion is 0.05 or greater;
 everywhere along the thickness of the second gradient portion, the absolute value of the slope of the refractive index of the optical coating is 0.1/nm or less.

10. The article of claim 5, wherein:
 the refractive index of the first gradient portion monotonically increases along the thickness in a direction moving away from the second major surface;
 the optical coating further comprises a multilayer interference stack comprising discrete layers disposed between the high hardness portion and the substrate.

11. The article of claim 5, wherein:
 the refractive index of the first gradient portion monotonically increases along the thickness in a direction moving away from the second major surface;
 the optical coating further comprises a second gradient portion that oscillates across the thickness of the gradient portion as a function of distance from the substrate.

12. The article of claim 5, wherein the optical coating comprises, in order, along the direction of the thickness from the second major surface toward the first major surface:
 a multilayer interference stack comprising discrete layers;
 the high hardness portion in contact with the multilayer interference stack;
 the first gradient portion in contact with the high hardness portion;
 wherein:
 where the high hardness portion contacts the first gradient portion, the difference between the refractive index of the high hardness portion and the maximum refractive index of the first gradient portion is 0.05 or less;
 the refractive index of the first gradient portion monotonically decreases along the thickness in a direction moving away from the second major surface.

13. The article of claim 1, wherein the article exhibits a single side reflected color range for all viewing angles from 0 to 60 degrees, measured at the second major surface, that comprises all a* points and all b* points comprising values of 5 or less.

14. The article of claim 1, wherein the article exhibits a maximum visible reflectance between 30% to 80%.

15. The article of claim 1, wherein the article exhibits an average photopic reflectance between 15% to 50%.

16. The article of claim 1, wherein the article exhibits an average transmittance or average reflectance comprising an average oscillation amplitude of 20 percentage points or less, over the optical wavelength regime.

17. The article of claim 1, wherein optical coating comprises a thickness in the range from about 0.5 µm to about 3 µm.

18. The article of claim 5, wherein the cumulative thickness of any parts of the optical coating between the high hardness portion and the second major surface comprising a RI of 1.6 or less is 200 nm or less.

19. The article of claim 1, wherein the optical coating comprises a compositional gradient, the compositional gradient comprising at least two of Si, Al, N, and O.

20. A method of forming an article comprising:
obtaining a substrate comprising a first major surface and comprising an amorphous substrate or a crystalline substrate;
disposing an optical coating on the first major surface, the optical coating comprising a second major surface opposite the first major surface and a thickness in a direction normal to the second major surface,
creating a refractive index gradient along at least a first gradient portion of the thickness of the optical coating, wherein:
a refractive index of the optical coating varies along a thickness of the optical coating between the first major surface and the second major surface;
the difference between the maximum refractive index of the first gradient portion and the minimum refractive index of the first gradient portion is 0.1 or greater;
the absolute value of the slope of the refractive index of the first gradient portion is 0.1/nm or less everywhere along the thickness of the first gradient portion;
wherein the article exhibits:
an average single-surface reflectance of 15% to 98% over the wavelength range 400 nm-700 nm, measured at the second major surface; and
a maximum hardness in the range from about 10 GPa to about 30 GPa, wherein maximum hardness is measured on the second major surface by indenting the second major surface with a Berkovich indenter to form an indent comprising an indentation depth of about 100 nm or more from the surface of the second major surface;
wherein slope is measured along the thickness over a refractive index change of 0.04.

* * * * *